US012052543B2

(12) United States Patent
Zhang et al.

(10) Patent No.: US 12,052,543 B2
(45) Date of Patent: Jul. 30, 2024

(54) EARPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/438,364

(22) Filed: Feb. 9, 2024

(65) Prior Publication Data

US 2024/0223943 A1 Jul. 4, 2024

Related U.S. Application Data

(63) Continuation of application No. PCT/CN2023/126052, filed on Oct. 23, 2023.

(30) Foreign Application Priority Data

Oct. 28, 2022 (CN) ......................... 202211336918.6
Dec. 1, 2022 (CN) ......................... 202223239628.4
(Continued)

(51) Int. Cl.
*H04R 1/10* (2006.01)
*H04R 1/02* (2006.01)
(Continued)

(52) U.S. Cl.
CPC ............... *H04R 1/342* (2013.01); *H04R 1/02* (2013.01); *H04R 1/1008* (2013.01); *H04R 1/105* (2013.01);
(Continued)

(58) Field of Classification Search
CPC . H04R 1/02; H04R 1/08; H04R 1/083; H04R 1/105; H04R 1/1016; H04R 1/1075;
(Continued)

(56) References Cited

U.S. PATENT DOCUMENTS 11,140,469 B1 10/2021 Miller et al.
11,328,702 B1 5/2022 Xiao et al.
(Continued)

FOREIGN PATENT DOCUMENTS

CN 210225716 U 3/2020
CN 112188337 A 1/2021
(Continued)

OTHER PUBLICATIONS

International Search Report in PCT/CN2023/126052 mailed on Nov. 21, 2023, 10 pages.
(Continued)

*Primary Examiner* — Thang V Tran
(74) *Attorney, Agent, or Firm* — METIS IP LLC

(57) ABSTRACT

Embodiments of the present disclosure provide an earphone including: a sound generation component, including a transducer and a housing accommodating the transducer, the housing being provided with a sound outlet hole and a pressure relief hole, the sound outlet hole being provided on an inner side of the housing facing an auricle, and the pressure relief hole being provided on an other side of the housing; an ear hook configured to place the sound generation component near an ear canal without blocking the ear canal in a wearing state; and a microphone assembly at least
(Continued)

100 including a first microphone and a second microphone provided in the sound generation component or the ear hook, the sound generation component or the ear hook being provided with a first sound receiving hole and a second sound receiving hole corresponding to the first microphone and the second microphone, respectively.

20 Claims, 23 Drawing Sheets

(30) Foreign Application Priority Data

Dec. 30, 2022 (WO) ................ PCT/CN2022/144339
Mar. 2, 2023 (WO) ................ PCT/CN2023/079404
Mar. 2, 2023 (WO) ................ PCT/CN2023/079410
Mar. 24, 2023 (WO) ................ PCT/CN2023/083551

(51) Int. Cl.
*H04R 1/08* (2006.01)
*H04R 1/34* (2006.01)
*H04R 1/40* (2006.01)

(52) U.S. Cl.
CPC ........... *H04R 1/1075* (2013.01); *H04R 1/406* (2013.01); *H04R 2460/11* (2013.01)

(58) Field of Classification Search
CPC .... H04R 1/345; H04R 1/1066; H04R 1/1058; H04R 1/222; H04R 3/005; H04R 5/0335; H04R 25/60; H04R 25/607; H05R 1/1008
See application file for complete search history.

(56) References Cited

U.S. PATENT DOCUMENTS

| | | | | |
|---|---|---|---|---|
| 11,838,705 | B2 | 12/2023 | Zheng et al. | |
| 2007/0009133 | A1 | 1/2007 | Gerkinsmeyer | |
| 2012/0020485 | A1 | 1/2012 | Visser et al. | |
| 2017/0034611 | A1* | 2/2017 | Maruyama | H04R 1/105 |
| 2020/0196062 | A1 | 6/2020 | Zhang | |
| 2021/0067857 | A1* | 3/2021 | Struzik | H04R 1/345 |
| 2022/0095029 | A1* | 3/2022 | Zheng | H04R 1/1091 |
| 2022/0386006 | A1* | 12/2022 | Meyberg Guzman | H04R 25/407 |
| 2023/0061686 | A1* | 3/2023 | Wolfl | H04R 1/2853 |
| 2023/0130211 | A1 | 4/2023 | Li et al. | |
| 2023/0179907 | A1* | 6/2023 | Zhang | H04R 1/1066 381/381 |

FOREIGN PATENT DOCUMENTS

| | | | |
|---|---|---|---|
| CN | 212909891 | U | 4/2021 |
| CN | 113542961 | A | 10/2021 |
| CN | 113573215 | A | 10/2021 |
| CN | 113810812 | A | 12/2021 |
| CN | 113905304 | A | 1/2022 |
| CN | 114286228 | A | 4/2022 |
| CN | 216217487 | U | 4/2022 |
| CN | 216357224 | U | 4/2022 |
| CN | 114760554 | A | 7/2022 |
| CN | 115175069 | A | 10/2022 |
| CN | 115243137 | A | 10/2022 |
| EP | 4181531 | A1 | 5/2023 |
| JP | 2001326986 | A | 11/2001 |
| JP | 2010273108 | A | 12/2010 |
| JP | 2012231371 | A | 11/2012 |
| JP | 2017103604 | A | 6/2017 |

OTHER PUBLICATIONS

Written Opinion in PCT/CN2023/126052 mailed on Nov. 21, 2023, 11 pages.
International Search Report in PCT/CN2023/126052 mailed on Nov. 21, 2023, 8 pages.
Written Opinion in PCT/CN2023/126052 mailed on Nov. 21, 2023, 7 pages.
International Search Report in PCT/CN2023/083551 mailed on Jul. 16, 2023, 6 pages.
Written Opinion in PCT/CN2023/083551 mailed on Jul. 16, 2023, 6 pages.
International Search Report in PCT/CN2023/079410 mailed on Jun. 8, 2023, 6 pages.
Written Opinion in PCT/CN2023/079410 mailed on Jun. 8, 2023, 5 pages.
International Search Report in PCT/CN2023/079404 mailed on Jun. 26, 2023, 6 pages.
Written Opinion in PCT/CN2023/079404 mailed on Jun. 26, 2023, 5 pages.

* cited by examiner

EARPHONES

CROSS-REFERENCE TO RELATED APPLICATION

This application is a Continuation of International Application No. PCT/CN2023/126052, filed on Oct. 23, 2023, which claims priority of Chinese Patent Application No. 202211336918.4, filled on Oct. 28, 2022, the Chinese Patent Application No. 202223239628.6, filled on Dec. 1, 2022, the International Patent Application No. PCT/CN2022/144339, filed on Dec. 30, 2022, the International Patent Application No. PCT/CN2023/079410 filed on Mar. 2, 2023, the International Patent Application No. PCT/CN2023/079404 filed on Mar. 2, 2023, and the International Patent Application No. PCT/CN2023/083551 filed on Mar. 24, 2023, the contents of each of which are incorporated herein by reference.

TECHNICAL FIELD

The present disclosure relates to the field of acoustics, and in particular, to an earphone.

BACKGROUND

With the development of the acoustic output technology, an acoustic device (e.g., an earphone) has been widely used in people's daily life. The acoustic device may be used in cooperation with an electronic device such as a mobile phone or a computer to provide a user with an auditory feast.

In general, a microphone may be disposed on the earphone to pick up the user's voice. The sound pickup effect of the microphone depends on how the microphone is disposed on the earphone. How to improve the sound pickup effect of the microphone while ensuring the sound output effect of the earphone is an urgent problem to be solved.

SUMMARY

Embodiments of the present disclosure provide an earphone including: a sound generation component, including a transducer and a housing accommodating the transducer, the housing being provided with a sound outlet hole and a pressure relief hole, the sound outlet hole being provided on an inner side of the housing facing an auricle of a user, and the pressure relief hole being provided on a side of the housing other than the inner side. The earphone may further include an ear hook configured to place the sound generation component near an ear canal of the user without blocking the ear canal in a wearing state. The earphone may further include a microphone assembly at least including a first microphone and a second microphone, the first microphone or the second microphone being provided in the sound generation component or the ear hook, the sound generation component or the ear hook being provided with a first sound receiving hole and a second sound receiving hole corresponding to the first microphone and the second microphone, respectively. A difference between a distance from a projection of the first sound receiving hole on a user sagittal plane to a projection of the sound outlet hole on the sagittal plane and a distance from the projection of the first sound receiving hole on the sagittal plane to a projection of the pressure relief hole on the sagittal plane may be less than 6 mm, and any one of a distance from a projection of the second sound receiving hole on the sagittal plane to the projection of the sound outlet hole on the sagittal plane or a distance from the projection of the second sound receiving hole on the sagittal plane to the projection of the pressure relief hole on the sagittal plane may not be less than 7 mm.

In some embodiments, an absolute value of a difference between the distance from the projection of the second sound receiving hole on the sagittal plane to the projection of the sound outlet hole on the sagittal plane and the distance from the projection of the second sound receiving hole on the sagittal plane to the projection of the pressure relief hole on the sagittal plane may be less than 6 mm.

In some embodiments, at least a portion of the sound generation component may extend into the concha cavity.

In some embodiments, an extension of a line connecting the projection of the first sound receiving hole on the sagittal plane and the projection of the second sound receiving hole on the sagittal plane has an intersection with a projection of an antihelix of the user on the sagittal plane, and a distance from the projection of the second sound receiving hole on the sagittal plane to the intersection may be a first distance. The first distance may be in a range of 2 mm-10 mm.

In some embodiments, a distance from the projection of the first sound receiving hole on the sagittal plane to the projection of the second sound receiving hole on the sagittal plane may be a second distance. A ratio of the second distance to the first distance may be in a range of 1.8-4.4.

In some embodiments, the second distance may be in a range of 10 mm-50 mm.

In some embodiments, the second sound receiving hole may be located on an outer side of the sound generation component, and a ratio of a distance between the projection of the second sound receiving hole on the sagittal plane and a projection of an upper side of the sound generation component on the sagittal plane to a distance between the projection of the sound outlet hole on the sagittal plane and the projection of the upper side of the sound generation component on the sagittal plane may be in a range of 0.2-0.4. A ratio of a distance between the projection of second sound receiving hole on the sagittal plane and a projection of a rear side of the sound generation component on the sagittal plane to a distance between the projection of the sound outlet hole on the sagittal plane to the projection of the rear side of the sound generation component on the sagittal plane may be in a range of 0.3-0.7.

In some embodiments, a shape of a projection of the sound generation component on the sagittal plane may include a long axis direction and a short axis direction, and a ratio of a distance between the projection of the second sound receiving hole on the sagittal plane and a projection of an upper side of the sound generation component on the sagittal plane in the short axis direction to a size of the projection of the sound generation component in the short axis direction may be not greater than 0.25.

In some embodiments, a ratio of a distance between the projection of the second sound receiving hole on the sagittal plane and a projection of a rear side of the sound generation component on the sagittal plane to a distance from the projection of the pressure relief hole on the sagittal plane to the projection of the rear side of the sound generation component on the sagittal plane may be in a range of 0.70-0.95. The sound generation component may have a thickness direction that is perpendicular to the sagittal plane, a ratio of a distance from the pressure relief hole to the inner side to a size of the sound generation component along the thickness direction may be in a range of 0.40-0.85.

In some embodiments, at least a portion of the sound generation component may cover an antihelix region of the user.

In some embodiments, an extension of a line connecting the projection of the first sound receiving hole on the user sagittal plane and the projection of the second sound receiving hole on the sagittal plane may have an intersection with a projection of an inner contour of the auricle on the sagittal plane, and a distance between the projection of the second sound receiving hole on the sagittal plane and the intersection point may be a first distance. The first distance may be in a range of 2 mm-10 mm.

In some embodiments, a distance between the projection of the first sound receiving hole on the sagittal plane and the projection of the second sound receiving hole on the sagittal plane may be a second distance. A ratio of the second distance to the first distance may be in a range of 1.8-4.4.

In some embodiments, the second distance may be in a range of 10 mm-50 mm.

In some embodiments, the second sound receiving hole may be located on an outer side of the sound generation component, a ratio of a distance between the projection of the second sound receiving hole on the sagittal plane and a projection of an upper side of the sound generation component on the sagittal plane to a distance between the projection of the sound outlet hole on the sagittal plane and the projection of the upper side of the sound generation component on the sagittal plane may be in a range of 0.3-0.6, and a ratio of a distance between the projection of the second sound receiving hole on the sagittal plane and a projection of a rear side of the sound generation component on the sagittal plane to a distance between the projection of the sound outlet hole on the sagittal plane and the projection of the rear side of the sound generation component on the sagittal plane may be in a range of 0.6-0.9.

In some embodiments, a shape of a projection of the sound generation component on the sagittal plane may include a long axis direction and a short axis direction, and a ratio of a distance between the projection of the second sound receiving hole on the sagittal plane and a projection of an upper side of the sound generation component on the sagittal plane in the short axis direction to a size of the projection of the sound generation component in the short axis direction may not be greater than 0.3.

In some embodiments, a ratio of a distance between the projection of the second sound receiving hole on the sagittal plane and a projection of a rear side of the sound generation component on the sagittal plane to a distance between the projection of the pressure relief hole on the sagittal plane and the projection of the rear side of the sound generation component on the sagittal plane may be in a range of 0.85-0.95. The sound generation component may have a thickness direction that is perpendicular to the sagittal plane, and a ratio of a distance between the pressure relief hole and the inner side to a size of the sound generation component along the thickness direction may be in a range of 0.40-0.90.

In some embodiments, the pressure relief hole may be provided on the upper side of the housing.

In some embodiments, a sound pressure output from one of the sound outlet hole and the pressure relief hole that is closer to the first sound receiving hole may be less than a sound pressure output from the other of the sound outlet hole and the pressure relief hole that is farther away from the first sound receiving hole.

In some embodiments, an area of one of the sound outlet hole and the pressure relief hole that is closer to the first sound receiving hole may be less than the area of the other of the sound outlet hole and the pressure relief hole that is farther away from the first sound receiving hole.

In some embodiments, each of the first sound receiving hole and the second sound receiving hole may be provided with an acoustic resistance net, and a sound resistance of the acoustic resistance net provided at one of the sound outlet hole and the pressure relief hole that is closer to the first sound receiving hole may be greater than a sound resistance of the acoustic resistance net provided at the other of the sound outlet hole and the pressure relief hole that is farther away from the first sound receiving hole.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which the same reference numbers represent the same structures, and wherein.

DETAILED DESCRIPTION

Figure 1:
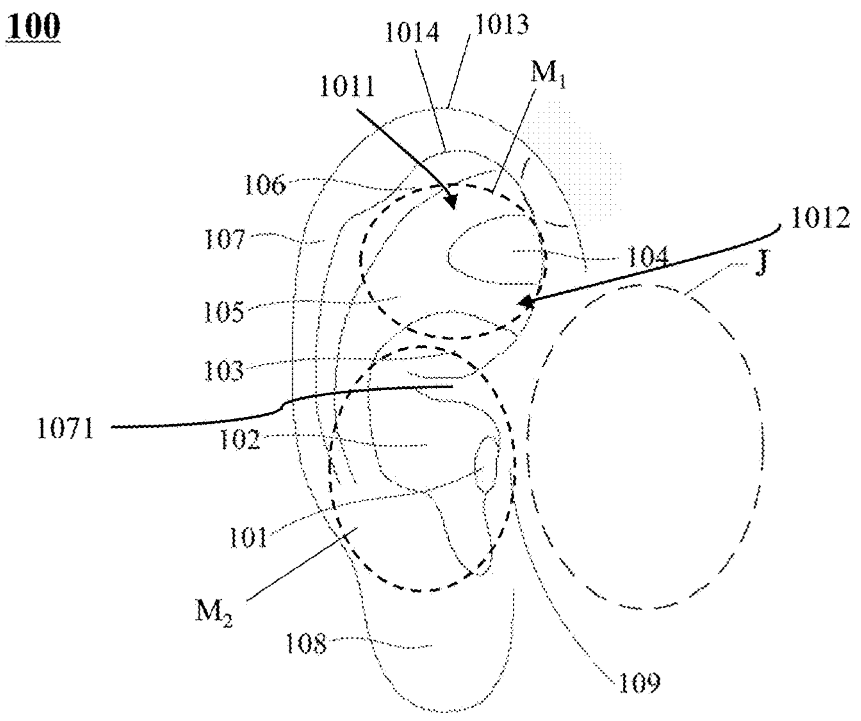
FIG. 1 is a schematic diagram illustrating an exemplary ear according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenarios in accordance with these drawings without creative labor. The present disclosure may be applied to other similar scenarios based on these drawings without creative labor. Unless obviously obtained from the context or the context illustrates otherwise, the same numeral in the drawings refers to the same structure or operation.

It should be understood that the terms “system”, “device”, “unit” and/or “module” as used herein is a way to distinguish between different components, elements, parts, sections, or assemblies at different levels. However, the words may be replaced by other expressions if other words accomplish the same purpose.

As shown in the present disclosure and the claims, unless the context clearly suggests an exception, the words “one,” “a”, “an”, “a kind”, and/or “the” do not refer specifically to the singular, but may also include the plural. It will be further understood that the terms “comprise,” “comprises,” and/or “comprising,” “include,” “includes,” and/or “including,” when used in the present disclosure, specify the presence of stated features, integers, steps, operations, elements, and/or components, but do not preclude the presence or addition of one or more other features, integers, steps, operations, elements, components, and/or groups thereof.

In the description of the present disclosure, it is to be understood that the terms "first", "second", "third", "fourth", etc. are used for descriptive purposes only, and are not to be understood as indicating or implying relative importance or implicitly specifying the number of technical features indicated. Thereby, the limitations "first", "second", "third", and "fourth" may expressly or implicitly include at least one such feature. In the description of the present disclosure, "plurality" means at least two, e.g., two, three, etc., unless otherwise expressly and specifically limited.

In the present disclosure, unless otherwise expressly specified or limited, the terms "connection", "fixing", etc. shall be understood broadly. For example, the term "connection" may be a fixed connection, a detachable connection, or an integral part; may be a mechanical connection, or an electrical connection; may be a direct connection, or an indirect connection through an intermediate medium; may be a connection within two components or an interaction between two components, unless otherwise expressly limited. For those skilled in the art, the above terms in the present disclosure may be understood according to specific situations.

FIG. 1 is a schematic diagram illustrating an exemplary ear according to some embodiments of the present disclosure. As shown in FIG. 1, An ear 100 may include an external ear canal 101, a concha cavity 102, a cymba conchae 103, a triangular fossa 104, an antihelix 105, a scaphoid 106, a helix 107, an earlobe 108, a crus of helix 109, an outer contour 1013, an inner contour 1014, and a crus of helix 1071. It may be noted that, for the convenience of description, an upper antihelix crus 1011, a lower antihelix crus 1012, and the antihelix 105 may be collectively referred to as an antihelix region in the embodiments of the present disclosure. In some embodiments, one or more portions of the ear 100 may support an acoustic device to stabilize the wearing of the acoustic device. In some embodiments, the external ear canal 101, the concha cavity 102, the cymba conchae 103, the triangular fossa 104, and other portions may have a certain depth and volume in a three-dimensional (3D) space, which are used to satisfy a wearing requirement of the acoustic device. For example, the acoustic device (e.g., earbuds) may be worn in the external ear canal 101. In some embodiments, the wearing of the acoustic device may be achieved by using other portions of the ear 100 than the external ear canal 101. For example, the acoustic device may be worn through the cymba conchae 103, the triangular fossa 104, the antihelix 105, the scaphoid 106, the helix 107, or a combination thereof. In some embodiments, to improve a wearing comfort and reliability of the acoustic device, the earlobe 108 and other portions of the user may be used. By using the portions of the ear 100 other than the external ear canal 101 to realize the wearing of the acoustic device and a transmission of a sound, the external ear canal 101 of the user may be "liberated". When the user wears the acoustic device (e.g., the earphone), the acoustic device may not block the external ear canal 101 of the user, and the user may receive both the sound from the acoustic device and the sound from the environment (e.g., a whistling sound, a car bell, a surrounding voice, a traffic command sound, etc.), which may reduce a probability of traffic accidents. In some embodiments, according to the structure of the ear 100, the acoustic device may be designed into a structure adapted to the ear 100, so as to realize the wearing of the sound generation component of the acoustic device at different positions of the ear. For example, when the acoustic device is an earphone, the earphone may include an ear hook and a sound generation component. The sound generation component may be physically coupled with the ear hook, and the ear hook may be adapted to the shape of the auricle to place a whole or portion of the structure of the sound generation component on a front side of the crus of helix 109 (e.g., the region J enclosed by the dashed line in FIG. 1). As another example, when the user wears the earphone, the whole or portion of the structure of the sound generation component may contact an upper portion of the outer ear canal 101 (e.g., one or more portions where the crus of helix 109, the cymba conchae 103, the triangular fossa 104, the antihelix 105, the scaphoid 106, the helix 107, the crus of helix 1071, and other positions are located). As a further example, when the user wears the earphone, the whole or portion of the structure of the sound generation component may be located in a cavity formed by the one or more portions (e.g., the concha cavity 102, the cymba conchae 103, the triangular fossa 104, etc.) of the ear (e.g., the region M1 at least including the cymba conchae 103, and the triangular fossa 104, and the region M2 at least including the concha cavity 102 enclosed by the dashed line in FIG. 1).

Different users may have individual differences, resulting in different shapes, sizes, and other dimensional differences of the ears. For the convenience of description and understanding, unless otherwise specified, the present disclosure mainly takes an ear model with a "standard" shape and size for reference, and further describes how the acoustic device in different embodiments is worn on the ear model. For example, a simulator containing a head and the (left and right) ears based on ANSI: S3.36, S3.25 and IEC: 60318-7 standards, such as a GRAS KEMAR, a HEAD Acoustics, a B&K 4128 series, or a B&K 5128 series, may be taken as a reference for wearing the acoustic device to present a situation that most users normally wear the acoustic device. Taking the GRAS KEMAR as an example, the ear simulator may be any of a GRAS 45AC, a GRAS 45BC, a GRAS 45CC, or a GRAS 43AG, etc. Taking the HEAD Acoustics as an example, the simulator for the ear may be any one of an HMS 11.3, an HMS 11.3 LN, or an HMS II.3LN HEC, etc. It may be noted that a range of data measured in the embodiments of the present disclosure is measured on the basis of the GRAS 45BC KEMAR, but it may be appreciated that there are differences between different head models and ear models, and that there are ±10% fluctuations in the relevant data ranges when other models are used. For example, the ear model for reference may have the following relevant features: a size of a projection of an auricle on a sagittal plane in a vertical axis may be in a range of 49.5 mm-74.3 mm, and the size of the projection of the auricle on the sagittal plane may be in a range of 36.6 mm-55 mm. The projection of the auricle on the sagittal plane refers to the projection of an edge of the auricle on the sagittal plane. The edge of the auricle may at least include an outer contour of the helix, a contour of the earlobe, a contour of a tragus, an intertrack notch, an antitragus tip, a notch between an antitragus and the antihelix, etc. Accordingly, in the present disclosure, the words such as "worn by a user", "in a wearing state" and "in the wearing state" refer to the acoustic device described in the present disclosure being worn in the ear of the aforementioned simulator. Of course, considering that there are individual differences among different users, the structure, the shape, the size, the thickness, etc. of the one or more portions of the ear 100 may be designed differently according to the different shapes and sizes of the ears, and these different designs may be manifested in that feature parameters of the one or more portions of the acoustic device (e.g., the sound generation component, the ear hook, etc., hereinafter) may have different ranges of values, thereby adapting to different ears.

It should be noted that in the fields of medicine, anatomy, etc., three basic sections including the sagittal plane, a coronal plane, and a horizontal plane of a human body may be defined, respectively, and three basic axes including the sagittal axis, a coronal axis, and the vertical axis may also be defined. As used herein, the sagittal plane refers to a section perpendicular to the ground along a front and rear direction of the body, which divides the human body into left and right parts. The coronal plane refers to a section perpendicular to the ground along a left and right direction of the body, which divides the human body into front and rear parts. The horizontal plane refers to a section parallel to the ground along an up-and-down direction of the body, which divides the human body into upper and lower parts. Correspondingly, the sagittal axis (e.g., the sagittal axis S shown in FIG. 11) refers to an axis along the front-and-rear direction of the body and perpendicular to the coronal plane, the coronal axis (e.g., the coronal axis R shown in FIG. 11) refers to the axis along the left-and-right direction of the body and perpendicular to the sagittal plane, and the vertical axis (e.g., the vertical axis T shown in FIG. 11) refers to the axis along the up-and-down direction of the body and perpendicular to the horizontal plane. Furthermore, the front side of the ear as described in the present disclosure refers to the side of the ear along the sagittal axis direction and located on the side of the ear toward a facial region of the human body. In this case, by observing the ear of the above simulator in a direction along the coronal axis of the human body, a schematic diagram illustrating the front side of the ear as shown in FIG. 1 may be obtained.

The description of the above ear 100 is for the purpose of exposition only and is not intended to limit the scope of the present application. For those skilled in the art, various changes and modifications may be made according to the descriptions of the present disclosure. For example, a portion of the acoustic device may cover a portion or a whole structure of the external ear canal 101. These changes and modifications are still within the protection scope of the present disclosure.

Figure 2:
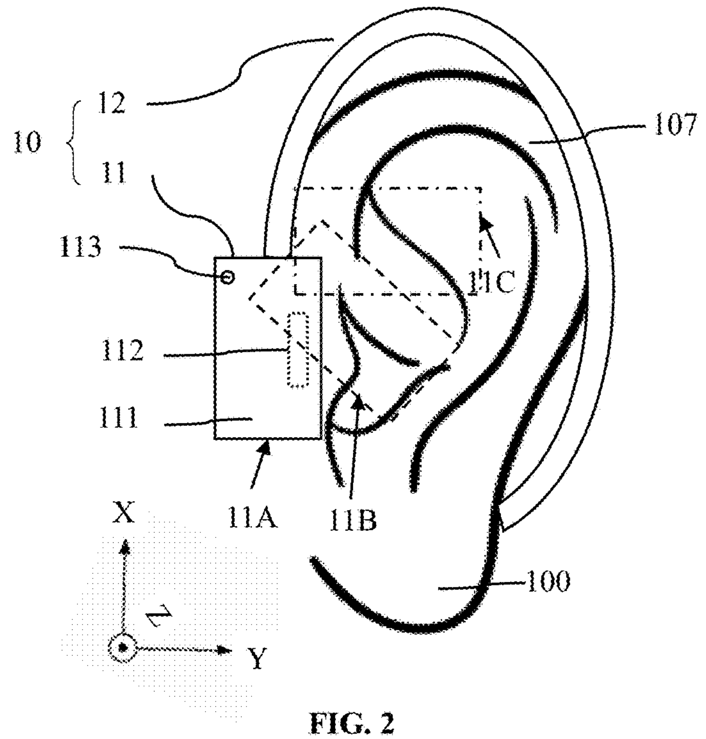
FIG. 2 is a structural diagram illustrating an exemplary earphone according to some embodiments of the present disclosure.

FIG. 2 is a structural diagram illustrating an exemplary earphone according to some embodiments of the present disclosure.

In some embodiments, the earphone 10 may include, but not limited to, an air-conduction earphone, a bone-conduction earphone, etc. In some embodiments, the earphone 10 may be combined with a product such as eyeglasses, an earphone, a head-mounted display device, an AR (augmented reality)/VR (virtual reality) helmet, etc.

As shown in FIG. 2, the earphone 10 may include a sound generation component 11 and an ear hook 12.

The sound generation component 11 may be worn on a user's body, and the sound generation component 11 may generate a sound input into an ear canal of the user. In some embodiments, the sound generation component 11 may include a transducer and a housing 111 for accommodating the transducer. The housing 111 may be coupled to the ear hook 12. The transducer may be configured to convert an electrical signal into a corresponding mechanical vibration to generate the sound. In some embodiments, a sound outlet hole 112 may be provided on a side of the housing facing the auricle of the user. The sound outlet hole 112 may be configured to transmit the sound generated by the transducer out of the housing 111 and into the ear canal so that the user hears the sound. In some embodiments, the transducer (e.g., a diaphragm) may separate the housing 111 to form a front cavity and a rear cavity of the earphone, and the sound outlet hole 112 may communicate with the front cavity and guide the sound generated by the front cavity out of the housing 111 and then transmit the sound to the ear canal. In some embodiments, a portion of the sound guided through the sound outlet hole 112 may be spread to the ear canal so that the user hears the sound, and another portion of the sound, along with the sound reflected by the ear canal, may be transmitted through a gap (e.g., a portion of the concha cavity not covered by the sound generation component) between the sound generation component 11 and the ear and spread outside the earphone 10 and the ear to form a first sound leakage in a far field. One or more pressure relief holes 113 may be opened on other sides of the housing 111 (e.g., the side depart from or away from the ear canal of the user). The one or more pressure relief holes 113 may be farther away from the ear canal than the sound outlet hole 112. The sound spread from the one or more pressure relief holes 113 may generally form a second sound leakage in the far field. The intensity of the aforementioned first sound leakage and the intensity of the aforementioned second sound leakage may be comparable, and the phase of the aforementioned first sound leakage and the phase of the aforementioned second sound leakage are (approximately) opposite to each other, so that the two sound leakages may cancel in the far field, which is conducive to reducing the sound leakage of the earphone 10 in the far field.

Figure 9:
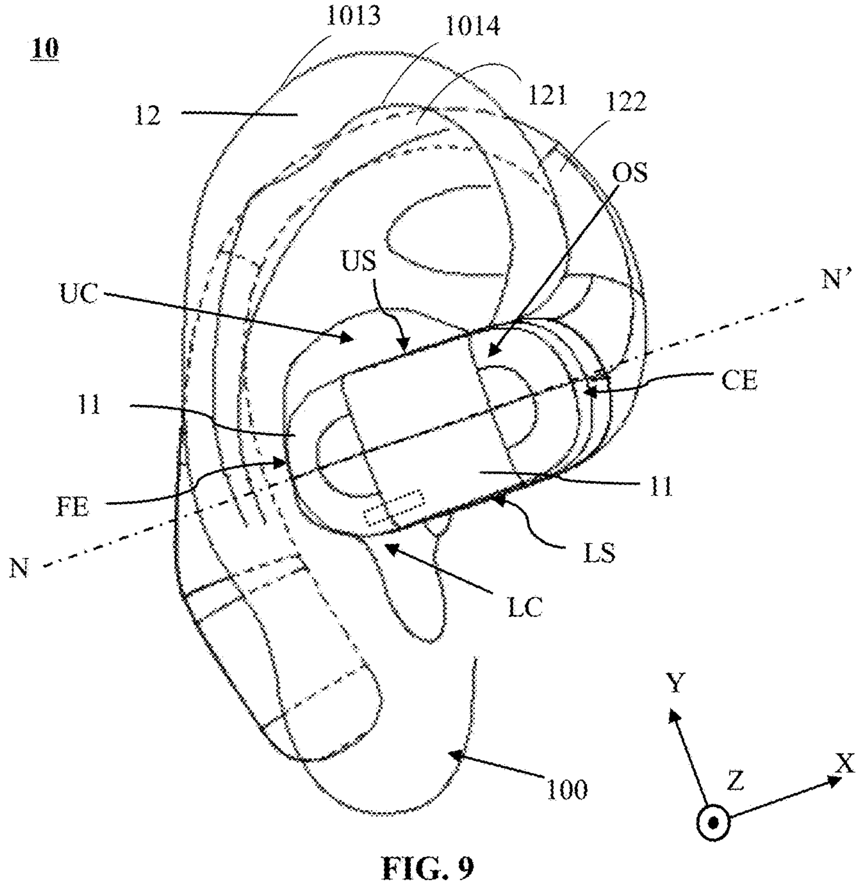
FIG. 9 is a schematic diagram illustrating a wearing state of a sound generation component of an earphone extending into a concha cavity according to some embodiments of the present disclosure.

One end of the ear hook 12 may be connected to the sound generation component 11 and the other end of the ear hook 12 may extend along a junction between the user's ear and head. In some embodiments, the ear hook 12 may be an arc-shaped structure that is adapted to the user's auricle, so that the ear hook 12 is hung on the user's auricle. For example, the ear hook 12 may have the arc-shaped structure adapted to the junction of the user's head and ear, so that the ear hook 12 is hung between the user's ear and head. In some embodiments, the ear hook 12 may also be a clamping structure adapted to the user's auricle, so that the ear hook 12 is clamped at the user's auricle. For example, the ear hook 12 may include a hook portion (the first portion 121 as shown in FIG. 9) and a connection portion (the second portion 122 as shown in FIG. 9) that are connected in sequence. The connection portion may connect the hook portion and the sound generation component 11 to allow the earphone 10 to be curved in a three dimension (3D) space when the earphone 10 is in a non-wearing state (i.e., a natural state). In other words, in the 3D space, the hook portion, the connection portion, and the sound generation component 11 may not be co-planar. Under such an arrangement, when the earphone 10 is in the wearing state, the hook portion may be used to be located between a rear side of the user's ear and the head, and the sound generation component 11 may be used to contact a front side of the user's ear. In such cases, the sound generation component 11 and the hook portion may cooperate to clamp the ear. For example, the connection portion may extend from the head toward the outside of the head and cooperate with the hook portion to provide a pressing force on the front side of the ear for the sound generation component 11. The sound generation component 11 may be abutted against a region where the concha cavity 102, the cymba conchae 103, the triangular fossa 104, the antihelix 105, etc. are located under the pressing force, so as to make the earphone 10 not block the ear canal of the ear when the earphone 10 is in the wearing state.

In some embodiments, to improve the stability of the earphone 10 in the wearing state, the earphone 10 may adopt any one of the following manners or a combination thereof.

First, at least a portion of the ear hook 12 may be provided with a mimetic structure that fits at least one of the rear side of the ear 100 and the head to increase a contact area of the ear hook 12 with the ear 100 and/or the head to increase a resistance preventing the earphone 10 from falling off the ear 100. Second, at least a portion of the ear hook 12 may be provided as an elastic structure to achieve a certain amount of deformity in the wearing state to increase the positive pressure of the ear hook 12 on the ear 100 and/or the head to increase the resistance preventing the earphone 10 from falling off the ear 100. Third, the ear hook 12 may be at least partially provided to abut against the head in the wearing state, so as to form a reaction force that clamps on the ear, so as to cause the sound generation component 11 to be pressed on the front side of the ear, and thereby increase the resistance preventing the earphone 10 from fall off the ear. Fourth, in the wearing state, the sound generation component 11 and the ear hook 12 may be disposed to clamp the region where the antihelix is located, or the region where the concha cavity is located, etc., so as to increase the resistance preventing the earphone 10 from falling off the ear. Fifth, the sound generation component 11 or an auxiliary structure connected thereto may be provided so as to at least partially extend into the cavities such as the concha cavity, the cymba conchae, the triangular fossa, and the scaphoid, etc., so as to increase the resistance preventing the earphone 10 from falling off the ear.

In some embodiments, the ear hook 12 may include, but is not limited to, an ear hook, an elastic band, etc., enabling the earphone 10 to be better fixed to the user and preventing the earphone 10 from falling off in use. In some embodiments, the earphone 10 may not include the ear hook 12, and the sound generation component 11 may be fixed close to the user's ear 100 through suspension or clamping.

In some embodiments, the sound generation component 11 may be, for example, circular, elliptical, runway-shaped, polygonal, U-shaped, V-shaped, semi-circular, or in other regular or irregular shapes so that the sound generation component 11 may be hung directly at the user's ear 100. In some embodiments, the sound generation component 11 may have a long axis direction X and a short axis direction Y which are perpendicular to a thickness direction Z and orthogonal to each other. The long axis direction X may be defined as a direction with the maximum extension dimension in the shapes of two-dimensional (2D) projection planes of the sound generation component 11 (e.g., the projection of the sound generation component 11 on a plane where an outer side of the sound generation component 11 is located, or a projection on a sagittal plane). The short axis direction Y may be defined as a direction perpendicular to the long axis direction X in the shape of the projection of the sound generation component 11 on the sagittal plane. The thickness direction Z may be defined to be perpendicular to the 2D projection plane. For example, the thickness direction Z may be consistent with the direction of the coronal axis, which points to the left and right direction of the body.

In some embodiments, when the user wears the earphone 10, the sound generation component 11 may be fixed at a position near an ear canal 101 of the user without blocking the ear canal 101. In some embodiments, the projection of the earphone 10 on the sagittal plane may not cover the user's ear canal in the wearing state. For example, the projection of the sound generation component 11 on the sagittal plane may fall on the left and right sides of the head and located in front of a tragus on the sagittal axis of the human body (e.g., the position shown by the solid line box 11A in FIG. 2). In this case, the sound generation component 11 may be located at the front side of the tragus of the user, the long-axis of the sound generation component 11 may be in a vertical or approximately vertical state, the projection of the short axis direction Y on the sagittal plane may be in the same direction as the sagittal axis, the projection of the long axis direction X on the sagittal plane may be in the same direction as the vertical axis, and the thickness direction Z may be perpendicular to the sagittal plane. As another example, the projection of the sound generation component 11 on the sagittal plane may fall on the antihelix 105 (e.g., at the location shown by a dotted line box 11C in FIG. 2). In this case, the sound generation component 11 may be at least partially located at the antihelix 105, the long-axis of the sound generation component 11 may be horizontal or approximately horizontal, the projection of the long axis direction X of the sound generation component 11 on the sagittal plane may be in the same direction as the sagittal axis, the projection of the short axis direction Y on the sagittal plane may be in the same direction as the vertical axis, and the thickness direction Z may be perpendicular to the sagittal plane. In this way, it is possible to avoid the sound generation component 11 from covering the ear canal, thereby freeing the user's ears; and it is also possible to increase the contact area between the sound generation component 11 and the ear 100, thereby improving a wearing comfort of the earphone 10.

In some embodiments, in the wearing state, the projection of the earphone 10 on the sagittal plane may also cover, or at least partially cover, the user's ear canal, e.g., the projection of the sound generation component 11 on the sagittal plane may fall within the concha cavity 102 (e.g., the position of the dotted line box 11B in FIG. 2), and be in contact with the crus of helix 1071 and/or the helix 107. In this case, the sound generation component 11, in an inclined state, may be at least partially located in the concha cavity 102. The projection of the short axis direction Y of the sound generation component 11 on the sagittal plane may have an angle with the direction of the sagittal axis, i.e., the short axis direction Y may also be set obliquely. The projection of the long axis direction X on the sagittal plane may have an angle with the direction of the sagittal axis, i.e., the long axis direction X may also be set obliquely. The thickness direction Z may be perpendicular to the sagittal plane. At this time, as the concha cavity 102 may have a certain volume and depth, an inner side IS of the earphone 10 has a certain spacing from the concha cavity, and the ear canal may be in flow communication with an outside world through a gap between the inner side IS and the concha cavity, thereby freeing the user's ears. At the same time, the sound generation component 11 and the concha cavity may cooperate to form an auxiliary cavity (e.g., a cavity structure as mentioned later) that is in flow communication with the ear canal. In some embodiments, the sound outlet hole 112 may be at least partially disposed in the aforementioned auxiliary cavity. The sound exported from the sound outlet hole 112 may be limited by the aforementioned auxiliary cavity, i.e., the aforementioned auxiliary cavity may be capable of clustering the sound, allowing more sound to be propagated into the ear canal, thereby increasing the volume and quality of the sound heard by the user in the near field, and improving an acoustic effect of the earphone 10.

In some embodiments, in the wearing state, the sound generation component 11 may have the inner side IS (also referred to as the inner side of the housing 111) that faces the ear along the thickness direction Z, an outer side OS (also referred to as an outer side of the housing 111) that departs from the ear, and a connection side connecting the inner side IS and the outer side OS. It may be noted that in the wearing state, when viewed along the coronal axis direction (i.e., the thickness direction Z), the sound generation component 11 may be provided in a shape of a circle, an oval, a rounded square, a rounded rectangle, etc. When the sound generation component 11 is in the shape of the circle, the ellipse, etc., the above-mentioned connection side refers to an arc-shaped side of the sound generation component 11. When the sound generation component 11 is in the shape of the rounded square, the rounded rectangle, etc., the above-mentioned connection side may include a lower side LS (also referred to as a lower side of the housing 111), an upper side US (also referred to as an upper side of the housing 111), and a rear side RS (also referred to as a rear side of the housing 111) undermentioned. The upper side US and the lower side LS refer to a side of the sound generation component 11 in the wearing state short axis direction Y departs from the external ear canal 101 along the short axis direction Y and a side of the sound generation component 11 in the wearing state short axis direction Y faces the external ear canal 101 along the short axis direction Y, respectively. The rear side RS refers to a side of the sound generation component 11 in the wearing state long axis direction X faces the rear side of the head along the long axis direction X. In some embodiments, the front side of the sound generation component 11 may be coupled to the ear hook 12. Specifically, a connection end CE of the sound generation component 11 may be coupled to the second portion 122 of the ear hook 12 (shown in FIG. 9). In the present disclosure, the front side of the sound generation component 11 refers to the connection end CE. For ease of description, the present disclosure takes the sound generation component 11 being in the shape of the rounded rectangle as an example. A length of the sound generation component 11 in the long axis direction X may be greater than a width of the sound generation component 11 in the short axis direction Y. In some embodiments, the rear side RS of the earphone may be curved to improve aesthetics and the wearing comfort of the earphone.

In some embodiments, to transmit the sound generated by the sound generation component 11 out of the housing 111 and then toward the ear canal so that the sound is heard by the user, the sound outlet hole 112 may be provided on the inner side IS of the sound generation component 11. The pressure relief hole 113 may be provided on other sides (e.g., the outer side OS, the upper side US, or the lower side LS, etc.) of the housing 111 such that the sound generated by the sound generation component 11 may be guided out of the housing 111 and then interfered and canceled with the sound leaked from the sound outlet hole 112 in the far field. In some embodiments, the pressure relief hole 113 may be located farther away from the ear canal than the sound outlet hole 112 to attenuate an antiphase cancellation of the sound output through the pressure relief hole 113 with the sound output through the sound outlet hole 112 at a listening position (e.g., the ear canal), thereby improving the sound volume at the listening position. Accordingly, in some embodiments, the pressure relief hole 113 may be disposed at the upper side US of the sound generation component 11.

The description of the above earphone 10 is for exposition only and is not intended to limit the scope of the present disclosure. For those skilled in the art, various changes and modifications may be made according to the description of the present disclosure. For example, the earphone 10 may also include a battery component, a Bluetooth component, etc., or a combination thereof. The battery assembly may be used to power the earphone 10. The Bluetooth component may be used to wirelessly connect the earphone 10 to other devices (e.g., cell phones, computers, etc.). These changes and modifications are still within the protection scope of the present disclosure.

Figure 3:
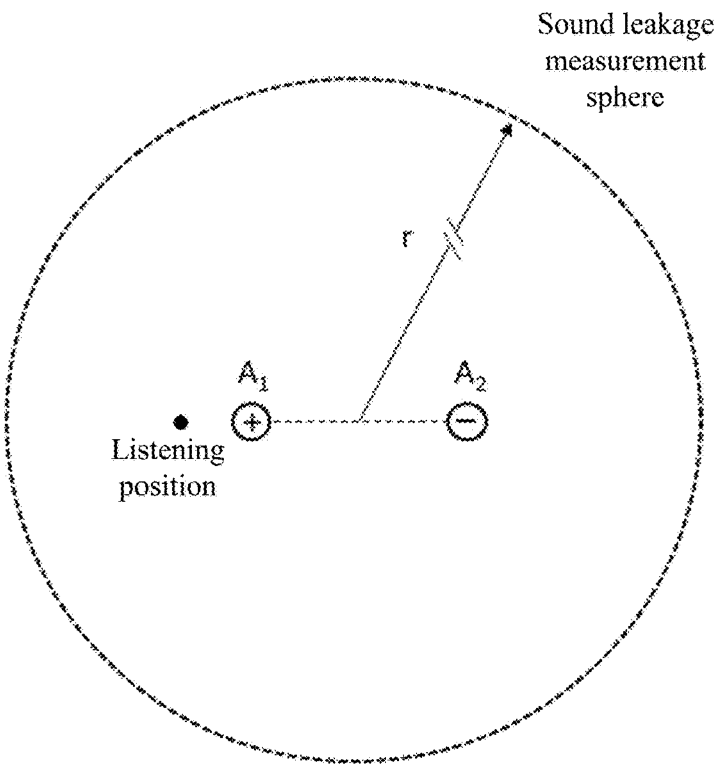
FIG. 3 is a schematic diagram illustrating two point sound sources and a listening position according to some embodiments of the present disclosure.

FIG. 3 is a schematic diagram illustrating two point sound sources and a listening position according to some embodiments of the present disclosure. In some embodiments, in conjunction with FIG. 3, a sound may be transmitted outside the earphone 10 through the sound outlet hole 112, which is viewed as a monopole sound source (or the point source) A1 that generates a first sound. The sound may be transmitted outside the earphone 10 through the pressure relief hole 113, which is viewed as the monopole sound source (or the point source) A2 that generates a second sound. The second sound and the first sound may have opposite or approximately opposite phases, so that they may be canceled out in the far field, that is, the second sound and the first sound may form an "acoustic dipole" to reduce a sound leakage. In some embodiments, in a wearing state, a line connecting the two monopole sound sources may point to an ear canal (noted as the "listening position") so that the user hears a sufficiently loud sound. A sound pressure level at the listening position (noted as $P_{near}$) may be used to indicate the intensity of the sound heard by the user (i.e., a near-field listening sound pressure). Further, the sound pressure level at a sphere centered at the user's listening position (or a sphere centered at the center of the dipole sound source (e.g., A1 and A2 as shown in FIG. 3) with a radius r) may be obtained (denoted as $P_{fair}$), which is used to indicate the intensity of the sound leakage radiated by the earphone 10 to the far field (i.e., a far-field sound leakage pressure). The $P_{far}$ may be obtained in various statistical manners, such as taking an average of the sound pressures at various points on the sphere, or obtaining a distribution of the sound pressure at various points on the sphere and performing an area integration, etc.

It should be known that a measurement manner of the sound leakage in the present disclosure is only an exemplary illustration of the principle and effect, which is not a limitation. The measurement manner of the sound leakage may be reasonably adjusted according to actual situations. For example, the center of the dipole sound source may be used as the center of the circle, and sound pressure amplitudes of two or more points evenly sampled according to a certain spatial angle in the far-field may be averaged. In some embodiments, the measurement manner of the sound leakage may be selecting a position near the source as the listening position, taking the sound pressure amplitude measured at the listening position as a value of the listening sound. In some embodiments, the listening position may or may not be on a line connecting two point sound sources. The manner of measuring and calculating the listening sound may also be reasonably adjusted according to the actual situation, e.g., by averaging the sound pressure amplitudes taken from other one or more points in the near-field position. As another example, one point sound source may be taken as the center of the circle, two or more points in the near field may be uniformly selected according to a certain spatial angle, and the sound pressure amplitudes at the two or more points may be averaged. In some embodiments, a distance between the near field listening position and the point source may be much less than a distance between the point source and the sphere for determining a far field sound leakage.

Obviously, the sound pressure Pear transmitted to the user's ear by the earphone 10 may be great enough to increase the listening effect; and the sound pressure $P_{far}$ in the far field may be small enough to increase the sound leakage reduction effect. Therefore, a sound leakage index α may be taken as an index for evaluating a sound leakage reduction capability of the earphone 10:

$$\alpha = \frac{|P_{far}|^2}{|P_{ear}|^2}. \quad (1)$$

According to Equation (1), the smaller the sound leakage index, the stronger the ability of the earphone to reduce the leakage, and the smaller the leakage in the far field in the case of the same near field listening volume at the listening position.

Figure 4:
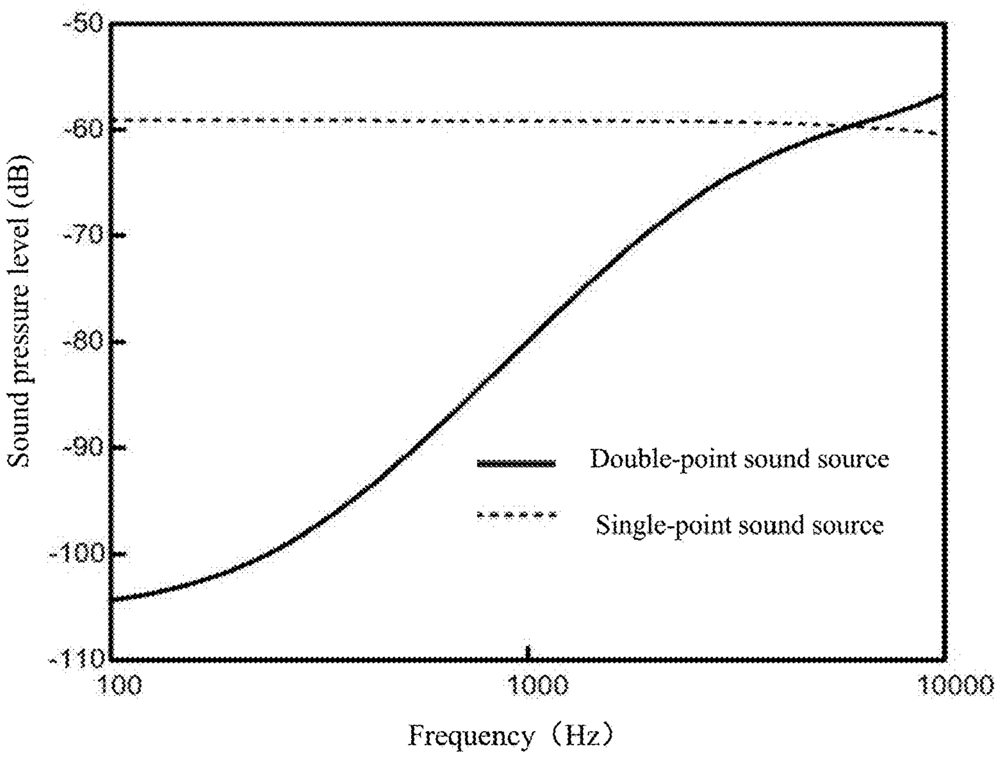
FIG. 4 is a schematic diagram illustrating sound leakage indexes at different frequencies of a single-point sound source and a two-point sound source according to some embodiments of the present disclosure.

FIG. 4 is a schematic diagram illustrating sound leakage indexes at different frequencies of a single-point sound source and a two-point sound source according to some embodiments of the present disclosure. The two-point sound source (also referred to as a dipole sound source) in FIG. 4 may be a typical two-point sound source, i.e., a distance between two point sound sources may be fixed, and the two point sound sources may have the same amplitude and opposite phases. It should be understood that the typical two-point sound source is only for principle and effect descriptions. Parameters of each point sound source may be adjusted according to the actual needs to make it different from the typical two-point sound source. As shown in FIG. 4, when the distance is constant, the sound leakage generated by the two-point sound source may increase with an increase of a frequency, and a sound leakage reduction ability may decrease with the increase of the frequency. When the frequency is greater than a specific frequency value (e.g., around 8000 Hz as shown in FIG. 4) the sound leakage generated by the two-point sound source may be greater than the sound leakage generated by the single point sound source. This frequency (e.g., 8000 Hz) may be the maximum limit of the sound leakage ability of the two-point source.

Figure 5:
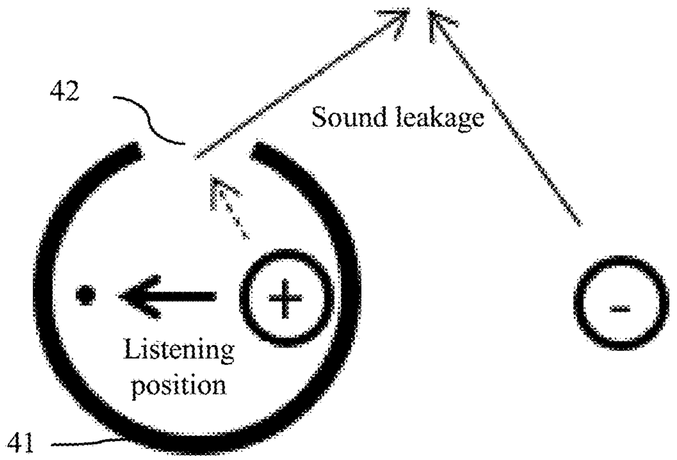
FIG. 5 is a schematic diagram illustrating an exemplary distribution of a cavity structure provided around one sound source of a dipole sound source according to some embodiments of the present disclosure.

In some embodiments, to increase a listening volume, particularly the listening volume at low and middle frequencies, while still keeping the effect of a far-field sound leakage cancellation, a cavity structure may be disposed around one of the two sound sources of the two-point sound source. FIG. 5 is a schematic diagram illustrating an exemplary distribution of a cavity structure provided around one sound source of dipole sound source according to some embodiments of the present disclosure.

As shown in FIG. 5, when a cavity structure 41 is disposed between the dipole sound sources, one of the two sound sources and a listening position may be inside the cavity structure 41, and the other sound source may be outside the cavity structure 41. A sound exported from the sound source inside the cavity structure 41 may be limited by the cavity structure 41, i.e., the cavity structure 41 may be able to gather the sound so that more sound propagates to the listening position, thereby improving the volume and quality of the sound at the listening position. In the present disclosure, the "cavity structure" may be understood as a semi-enclosed structure surrounded by a side wall of the sound generation component 11 together with a concha cavity structure. The semi-enclosed structure may not completely seal an inside of the cavity structure from an external environment, which has a leakage structure 42 (e.g., an opening, a gap, a pipe, etc.) that is acoustically connected to the external environment. An exemplary leakage structure may include, but is not limited to, the opening, the gap, the pipe, etc., or any combination thereof.

In some embodiments, the cavity structure 41 may contain the listening position and at least one sound source. Here, the "contain" may mean that at least one of the listening position and the sound source is inside the cavity, or at least one of the listening position and the sound source is at an edge inside the cavity. In some embodiments, the listening position may be an entrance of an ear canal or an acoustic reference point of an ear.

Figure 6A:
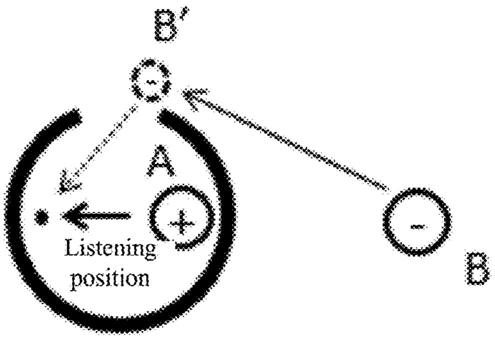
FIG. 6A is a schematic diagram illustrating a listening principle of a dipole sound source and a cavity structure constructed around one sound source of the dipole sound source according to some embodiments of the present disclosure.
Figure 6B:
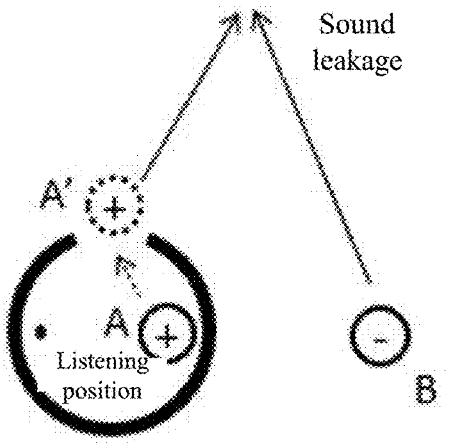
FIG. 6B is a schematic diagram illustrating a sound leakage principle of a dipole sound source and a cavity structure constructed around one sound source of the dipole sound source according to some embodiments of the present disclosure.

FIG. 6A is a schematic diagram illustrating a listening principle of a dipole sound source and a cavity structure constructed around one sound source of the dipole sound source according to some embodiments of the present disclosure. FIG. 6B is a schematic diagram illustrating a sound leakage principle of a dipole sound source and a cavity structure constructed around one sound source of the dipole sound source according to some embodiments of the present disclosure.

For a near-field listening, as shown in FIG. 6A, a cavity structure may be constructed around one sound source of the dipole sound source. As the one sound source A is enclosed by the cavity structure, most of the sound radiated from the sound source A may reach a listening position through a direct radiation or a reflection. In contrast, when there is no cavity structure, most of the sound radiated from the sound source may not reach the listening position. Therefore, the cavity structure may significantly increase the volume of the sound reaching the listening position. At the same time, only a small portion of a sound with an opposite phase radiated from a sound source B outside the cavity structure may enter the cavity structure through a leakage structure of the cavity structure. This may be equivalent to a generation of a secondary sound source B' at the leakage structure, whose intensity is significantly less than the intensity of the sound source B, and significantly less than the intensity of the sound source A. The sound generated by the secondary source B' may have a weak effect of antiphase cancellation on the source A in the cavity, resulting in a significant increase in the listening volume at the listening position.

For the sound leakage, as shown in FIG. 6B, the sound source A radiates a sound to the outside through the leakage structure of the cavity may be equivalent to generating a secondary sound source A' at the leakage structure. As almost all of the sound radiated by sound source A is output from the leakage structure, and a size of the structure of the cavity is much smaller than a spatial scale at which the leakage sound is evaluated (the difference is at least an order of magnitude), the intensity of the secondary sound source A' may be considered as comparable to that of the sound source A. For the external space, the cancellation effects between sounds generated by the secondary sound source A' and the sound source B may be comparable. That is, the cavity structure still maintains a comparable sound leakage reduction effect.

It may be understood that the above leakage structure with one opening is only an example, and the leakage structure of the cavity structure may include one or more openings, which also achieves a superior listening index. The listening index refers to a reciprocal 1/α of the leakage index α. Taking the structure with two openings as an example, the situations of an equal opening and an equal opening ratio may be analyzed separately below. Taking the structure with only one opening as a comparison, the "equal opening" here refers to setting two openings each with the same dimension as the opening in the structure with only one opening, and the "equal opening ratio" refers to setting two openings, a total area of which may be the same area as that of the structure with only one opening. The equal opening may be equivalent to doubling a relative opening (i.e., a ratio of an opening area S of the leakage structure on the cavity structure to an area S0 of the cavity structure that is subjected to a direct action of the contained sound source) corresponding to the structure with only one opening, and the overall listening index may be reduced as described before. In the case of the equal opening ratio, even though S/S0 is the same as the structure with only one opening, the distances from the two openings to the external sound source may be different, thus resulting in different listening indexes.

Figure 7A:
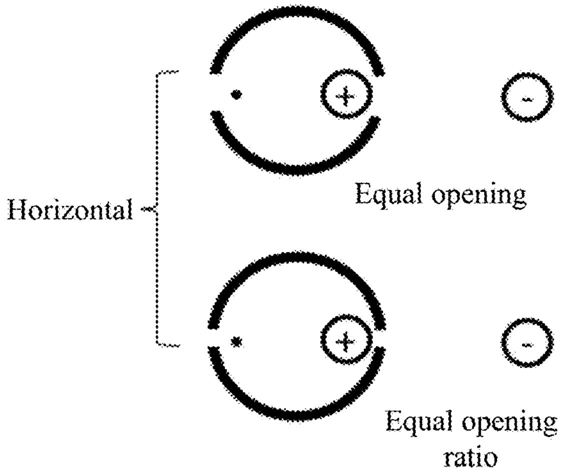
FIG. 7A is a schematic diagram illustrating a cavity structure with two horizontal openings according to some embodiments of the present disclosure.
Figure 7B:
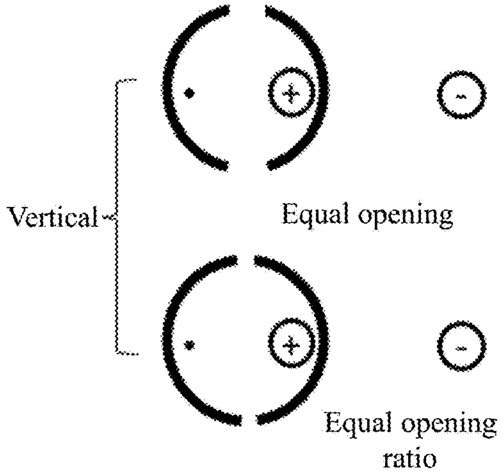
FIG. 7B is a schematic diagram illustrating a cavity structure with two vertical openings according to some embodiments of the present disclosure.

FIG. 7A is a schematic diagram illustrating a cavity structure with two horizontal openings according to some embodiments of the present disclosure. FIG. 7B is a schematic diagram illustrating a cavity structure with two vertical openings according to some embodiments of the present disclosure. As shown in FIG. 7A, when a connection line of the two openings is parallel to a connection line of the two sound sources (i.e., two horizontal openings), the distances from the two openings to the external sound source may be the maximum and minimum, respectively; as shown in FIG. 7B, when the connection lines are perpendicular to each other (i.e., two vertical openings), the distances from the two openings to the external sound source may be equal, and a middle value may be obtained.

Figure 8:
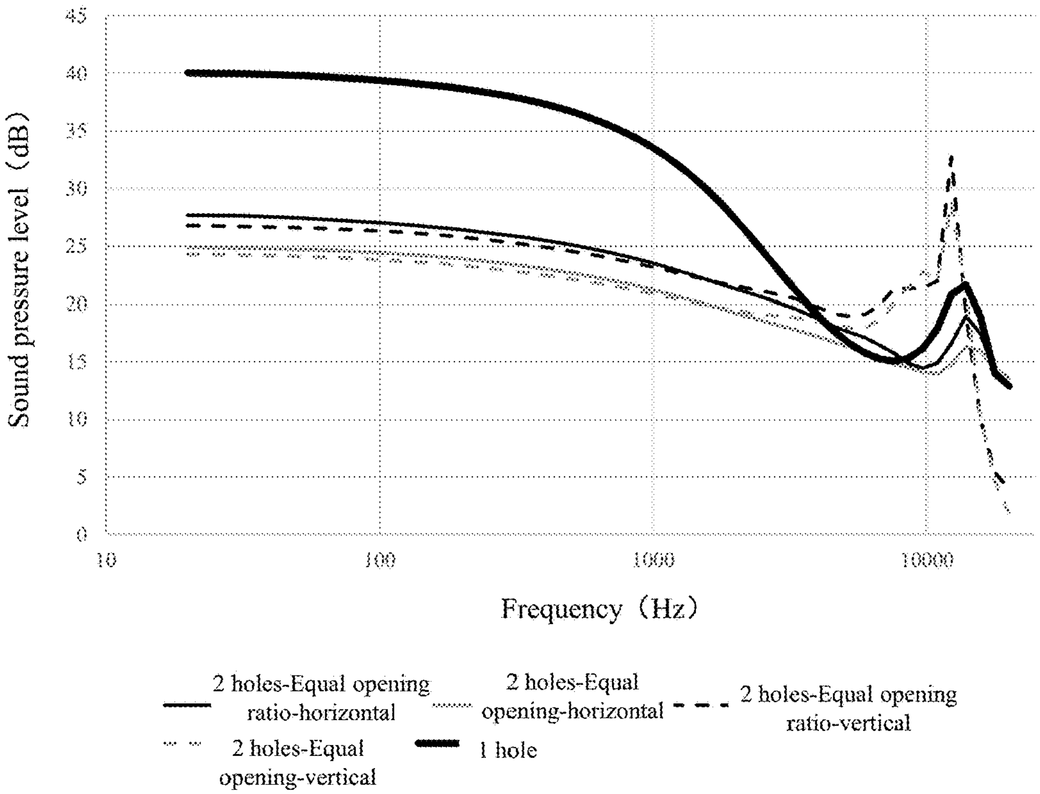
FIG. 8 is a schematic diagram illustrating listening index curves of a cavity structure with two openings and a cavity structure with one opening according to some embodiments of the present disclosure.

FIG. 8 is a schematic diagram illustrating listening index curves of a cavity structure with two openings and a cavity structure with one opening according to some embodiments of the present disclosure. As shown in FIG. 8, compared to the cavity structure with one opening, the overall listening index of the cavity structure with the equal opening may decrease. For the cavity structure with the equal opening ratio, the distances from the two openings to the external sound source may be different, thus also resulting in different listening indexes. Combined with FIGS. 7A, 7B, and 8, regardless of whether the opening is horizontal or vertical, the listening index of the leakage structure with the equal opening ratio may be higher than that of the leakage structure with the equal opening. This is because the relative opening S/S0 of the leakage structure with the equal opening ratio is twice smaller than that of the leakage structure with the equal opening, so the listening index may be greater. Combined with FIGS. 7A, 7B, and 8, regardless of the leakage structure with the equal opening or the leakage structure with the equal opening ratio, the listening index of the leakage structure with horizontal openings may be greater. This is because a distance from one of the openings in the leakage structure with horizontal openings to an external sound source may be smaller than a distance between the two sound sources, so that the secondary sound source and the external sound source may be closer to each other than the original two sound sources, and therefore the listening index is higher, thereby improving the sound leakage reduction effect. Therefore, to improve the sound leakage reduction effect, a distance from at least one of the openings to the external sound source may be smaller than the distance between the two sound sources.

In addition, as shown in FIG. 8, the cavity structure with two openings may better increase a resonant frequency of an air sound within the cavity structure compared to the cavity structure with one opening, resulting in a better listening index of the entire device in a high frequency band (e.g., sounds with frequencies near 10,000 Hz) compared to the cavity structure with only one opening. The high frequency band refers to a more sensitive frequency band for the human ear and therefore has a greater need for the sound leakage reduction. Therefore, to improve the sound leakage reduction effect in the high frequency band, the cavity structure with more than one opening may be selected.

Figure 10:
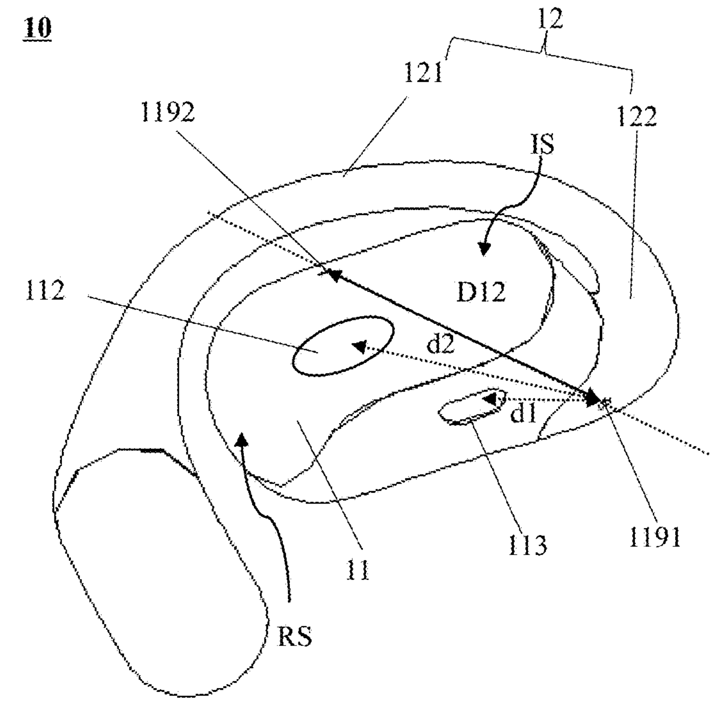
FIG. 10 is a schematic diagram illustrating an exemplary structure of an earphone according to some embodiments of the present disclosure.

FIG. 9 is a schematic diagram illustrating a wearing state of a sound generation component of an earphone extending into a concha cavity according to some embodiments of the present disclosure; and FIG. 10 is a schematic diagram illustrating an exemplary structure of an earphone according to some embodiments of the present disclosure.

Referring to FIG. 9, the earphone 10 may include the sound generation component 11 and the ear hook 12. In some embodiments, the sound generation component 11 of the earphone 10 may include a transducer and a housing for accommodating the transducer. In some embodiments, differentiated by frequency, a type of the transducer may include a low frequency (e.g., 30 Hz-150 Hz) speaker, a low-middle frequency (e.g., 150 Hz-500 Hz) speaker, a middle-high frequency (e.g., 500 Hz-5 kHz) speaker, a high frequency (e.g., 5 kHz-16 kHz) speaker, or a full frequency (e.g., 30 Hz-16 kHz) speaker, or any combination thereof. The low frequency, high frequency here may represent a frequency range only, which have different dividing modes in different application scenarios. For example, a crossover point may be determined, with the low frequency indicating a range of frequencies below the crossover point, and the high frequency indicating frequencies above the crossover point. The crossover point may be any value within an audible range of the human ear, for example, 500 Hz, 600 Hz, 700 Hz, 800 Hz, 1000 Hz, etc.

In some embodiments, the transducer may include a diaphragm. When the diaphragm vibrates, the sound may be emitted from a rear side and a front side of the diaphragm respectively. In some embodiments, a front cavity (not shown) for transmitting the sounds may be provided at the front side of the diaphragm in the housing. The front cavity and the sound outlet hole may be acoustically coupled, and the sound from the front side of the vibration diaphragm may be emitted from the front cavity through the sound outlet hole. A rear cavity (not shown) for transmitting the sounds may be provided at the rear side of the diaphragm in the housing. The rear cavity may be acoustically coupled to a pressure relief hole, and the sound from the rear side of the diaphragm may be emitted from the rear cavity through the pressure relief hole.

In the wearing state, the end FE (also referred to as the free end FE) of the sound generation component 11 may extend into the concha cavity. Optionally, the sound generation component 11 and the ear hook 12 may be provided to jointly clamp an ear region from the front and rear sides of the ear region corresponding to the concha cavity, thereby increasing the resistance preventing the earphone 10 from falling off the ear region, and improving a stability of the earphone 10 in the wearing state. For example, the end FE of the sound generation component may be pressed in the concha cavity in the thickness direction Z. As another example, the end FE may abut against within the concha cavity in the long axis direction X and/or in the short axis direction Y (e.g., against an inner wall of the concha cavity that corresponds to the end FE). It should be noted that the end FE of the sound generation component 11 refers to an end portion of the sound generation component 11 provided opposite to the connection end CE of the ear hook 12, and the end FE may also be referred to as a free end FE. The end FE of the sound generation component 11 may be disposed at the rear side RS of the sound generation component 11. The sound generation component 11 may have a regular or irregular structure, which is exemplarily illustrated herein to further illustrate the end FE of the sound generation component 11. For example, when the sound generation component 11 has a rectangular structure, an end wall of the sound generation component 11 may be a plane, and in this case, the end FE of the sound generation component 11 may be an end sidewall of the sound generation component 11 that is disposed opposite to a fixed end of the sound generation component 11 connected to the ear hook 12. For example, if the sound generation component 11 has a sphere, an ellipsoid, or an irregular structure, the end FE of the sound generation component 11 may be a specific region away from the fixed end obtained by cutting the sound generation component 11 along a Y-Z plane (a plane formed by the short axis direction Y and the thickness direction Z).

Referring to FIG. 9, an example of the ear hook 12 is illustrated herein. In some embodiments, the ear hook 12 may include a first portion 121 and a second portion 122 connected in sequence. The first portion 121 may be hooked between a rear inner side of an auricle and the head of a user, and the second portion 122 may extend toward a front outer side of the auricle (the side of the auricle that departs from the head in a direction of a coronal axis) and connects the sound generation component 11, such that the sound generation component 11 is worn near the user's ear canal without blocking an opening of the ear canal. In some embodiments, the sound outlet hole may be disposed on the sidewall of the housing of the sound generation component 11 facing the auricle, thereby transmitting the sound generated by the transducer out of the housing toward the opening of the user's ear canal. In some embodiments, when the user wears the earphone 10, at least a portion of the sound generation component 11 may extend into the user's concha cavity (e.g., the position of the sound generation component 11 with respect to the ear as shown by the dotted line box 11B in FIG. 2). In this way, the sound generation component 11 and the concha cavity 102 may form the cavity structure described above, which increases a listening volume at the listening position (e.g., at the opening of the ear canal), especially at low and middle frequencies, while still maintaining a better far-field sound leakage canceling effect.

Referring to FIG. 10, in some embodiments, the earphone 10 may also include a microphone for collecting acoustic signals (e.g., a user voice, an environment sound, etc.). The microphone may be disposed in the ear hook 12 or the sound generation component 11, with the sound generation component 11 or the ear hook 12 provided with a sound receiving hole that is acoustically communicated with the microphone. In some embodiments, the earphone 10 may include a microphone assembly, and to make the sound received by the microphone assembly directional such that the user voice received by the microphone assembly is clearer, the microphone assembly may include a first microphone and a second microphone. The first microphone and the second microphone may respectively collect the sound signals at their corresponding positions, such as a user voice, an environment sound, etc. In some embodiments, the first microphone and the second microphone may both be disposed in the sound generation component 11. In some embodiments, the first microphone and the second microphone may both be provided in the ear hook 12. In some embodiments, one of the first microphone and the second microphone may be disposed in the ear hook 12, and the other may be disposed in the sound generation component 11. The following is illustrated by way of example in conjunction with FIG. 10. As shown in FIG. 10, the first microphone (not shown in FIG. 10) may be disposed in the ear hook 12. The ear hook may include a first sound receiving hole 1911 that is in acoustic communication with the first microphone. The second microphone (not shown in FIG. 10) may be disposed in the sound generation component 11. The sound generation component 11 may include a second sound receiving hole 1192 that is in acoustical communication with the second microphone. When the user wears the earphone, both the first sound receiving hole 1191 and the second sound receiving hole 1192 may not be blocked so as to receive sound information when the user is speaking or the sound information from the outside world. In some embodiments, the first sound receiving hole 1191 and the second sound receiving hole 1192 may have a double-hole structure, for example, there may be two first sound receiving holes 1191. The first microphone may correspond to the two first sound receiving holes 1191, and the two first sound receiving holes 1191 may be in flow communication inside the ear hook or the sound generation component. When a pressure fluctuation caused by airflow velocity exists in the external environment, by setting the first sound receiving holes 1191 and the second sound receiving holes 1192 into double-hole structures, the pressure outside the first sound receiving hole 1191 and the second sound receiving hole 1192 (the outer surface of the ear hook 12 or the sound generation component 11 where the sound receiving hole is located) may be balanced, and then the pressure may be transferred to an inner side of the first sound receiving hole 1191 and an inner side of the second sound receiving hole 1192. As the center axes of the inner sides of the first sound receiving hole 1191 and the second sound receiving hole 1192 are perpendicular to the direction of airflow, the pressure fluctuation may be reduced, which in turn makes a wind noise caused by the pressure fluctuation correspondingly reduced. Therefore, the first microphone, the second microphone, the first sound receiving hole 1191 in acoustical communication with the first microphone, and the second sound receiving hole 1192 in acoustical communication with the second microphone may be configured such that a wind noise reduction effect may be achieved. In some embodiments, the first sound receiving hole 1191 and the second sound receiving hole 1192 may be round holes, square holes, oval holes, diamond holes, and other regular and irregular holes. Shapes of the first sound receiving hole 1191 and the second sound receiving hole 1192 may be the same or different.

Referring to FIG. 10, in some embodiments, the housing 111 of the sound generation component 11 may be provided with the sound outlet hole 112 and the pressure relief hole 113. The sound outlet hole 112 may be provided on the inner side IS of the sound generation component 11, and the pressure relief hole 113 may be provided on the lower side LS of the sound generation component 11. In some embodiments, the pressure relief hole 113 may also be disposed on any one of the upper side, the front side, the rear side, and the outer side of the sound generation component. In some embodiments, a distance between the first sound receiving hole 1191 and the pressure relief hole 113 may satisfy a specific relationship with a distance between the first sound receiving hole 1191 and the sound outlet hole 112 to avoid the sounds exported from the sound outlet hole 112 and the pressure relief hole 113 generating echoes at the first sound receiving hole 1191 and the second sound receiving hole 1192.

Referring to FIG. 10, in some embodiments, the distance between the first sound receiving hole 1191 and the pressure relief hole 113 may be denoted as d1, and the distance between the first sound receiving hole 1191 and the sound outlet hole 112 may be denoted as d2. In some embodiments, as the first sound receiving hole 1191, the pressure relief hole 113, and the sound outlet hole 112 are located on different planes, a measurement of a spatial distance may have a high degree of difficulty with a great error. Thus, the distance between the three holes may be expressed as distances between the projections of the first sound receiving hole 1191, the pressure relief hole 113, and the sound outlet hole 112 on the sagittal plane. That is, d1 may also be expressed as the distance between the projection of the first sound receiving hole 1191 on the sagittal plane and the projection of the pressure relief hole 113 on the sagittal plane; and d2 may be expressed as the distance between the projection of the first sound receiving hole 1191 on the sagittal plane and the projection of the sound outlet hole 112 on the sagittal plane. In some embodiments, for the first sound receiving hole 1191 for a primary sound reception, the first sound receiving hole 1191 may be provided near an acoustic zero point (e.g., a region where the sound leakages of the sound outlet hole 112 and the pressure relief hole 113 cancel each other) to minimize interference of the speaker on the first microphone. Specifically, in some embodiments, an absolute value of the difference between d1 and d2 may be less than 6 mm to make the first sound receiving hole 1191 near the acoustic zero point. The smaller the absolute value of the difference between d1 and d2, the more adequately the sound leakages of the sound outlet hole 112 and the pressure relief hole 113 cancel each other. In some embodiments, the absolute value of the difference between d1 and d2 may be less than 4 mm. In some embodiments, the absolute value of the difference between d1 and d2 may be less than 2 mm to further minimize the interference of the speaker on the first microphone.

In some embodiments, the sound received by the second microphone may be primarily intended to de-noise the sound received by the first microphone, and thus the position of the second microphone and the corresponding second sound receiving hole 1192 may not be limited to a position in the region where the sound leakages of the sound outlet hole 112 and the pressure relief hole 113 cancel each other. In some embodiments, the positions of the second microphone and the corresponding second sound receiving hole 1192 may be determined by considering other factors (e.g., difficulty of design and manufacturing, etc.). For example, the second sound receiving hole 1192 may be provided at a position on the housing 111 that is convenient for making an opening, with a relatively great distance from the ear 100, so as to minimize the difficulty of manufacturing while reducing the sound received by the second sound receiving hole 1192 that is reflected by the ear, thereby enhancing the sound reception effect. On the other hand, to avoid that the sound output from the sound outlet hole 112 and/or the pressure relief hole 113 is drowned out by the sound emitted from the speaker, and to reduce the interference of the speaker on the second microphone, the second microphone may maintain certain distances with the sound outlet hole 112 and the pressure relief hole 113. In some embodiments, the distance from the projection of the second sound receiving hole 1192 to any one of the projection of the sound outlet hole 112 and the projection of the pressure relief hole 113 on the sagittal plane may be not less than 7 mm. To further reduce the interference of the speaker on the second microphone, the distance from the projection of the second sound receiving hole 1192 to any one of the projection of the sound outlet hole 112 and the projection of the pressure relief hole 113 on the sagittal plane may be not less than 7.1 mm.

In some embodiments, to reduce the interference of the seconds emitted from the sound outlet hole 112 and the pressure relief hole 113 on the second microphone, the second sound receiving hole 1192 may further be disposed near the acoustic zero point (e.g., the region where the sound leakages of the sound outlet hole 112 and the pressure relief hole 113 cancel each other). Specifically, in some embodiments, to provide the second sound receiving hole 1192 near the acoustic zero point, the absolute value of the difference between the distance from the projection of the second sound receiving hole 1192 on the sagittal plane to the projection of the sound outlet hole 112 on the sagittal plane and the distance from the second sound receiving hole 1192 on the sagittal plane to the projection of the sound relief hole 113 on the sagittal plane may be less than 6 mm. The smaller the absolute value of the difference between the distance from the projection of the second sound receiving hole 1192 on the sagittal plane to the projection of the sound outlet hole 112 on the sagittal plane and the distance from the second sound receiving hole 1192 on the sagittal plane to the projection of the sound relief hole 113 on the sagittal plane is, the more adequate the sound leakages of the sound outlet hole 112 and the sound relief hole 113 cancel each other. In some embodiments, the absolute value of the difference between the distance from the projection of the second sound receiving hole 1192 on the sagittal plane to the projection of the sound outlet hole 112 on the sagittal plane and the distance from the second sound receiving hole 1192 on the sagittal plane to the projection of the sound relief hole 113 on the sagittal plane may be smaller than 5 mm. In some embodiments, the absolute value of the difference between the distance from the projection of the second sound receiving hole 1192 on the sagittal plane to the projection of the sound outlet hole 112 on the sagittal plane and the distance from the second sound receiving hole 1192 on the sagittal plane to the projection of the sound relief hole 113 on the sagittal plane may be less than 4 mm to further reduce the interference of the speaker on the second microphone.

Figure 11:
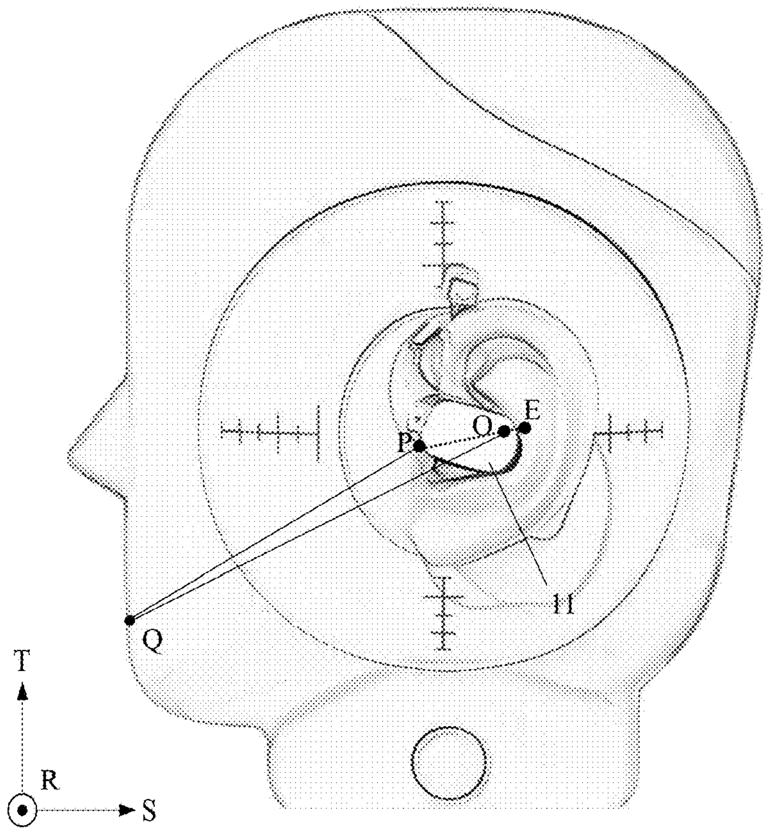
FIG. 11 is a schematic diagram illustrating an exemplary wearing state of an earphone according to some embodiments of the present disclosure.

FIG. 11 is a schematic diagram illustrating an exemplary wearing state of an earphone according to some embodiments of the present disclosure.

Referring to FIGS. 10 and 11, in some embodiments, when the earphone 10 is in the wearing state, at least a portion of the sound generation component 11 may extend into a concha cavity of a user. In some embodiments, a line connecting the first sound receiving hole 1191 and the second sound receiving hole 1192 may point to a user's mouth such that the first microphone and the second microphone may have better sound reception effects. In some embodiments, the first sound receiving hole 1191 may be at a position on the earphone 10 that is closest to the mouth in the wearing state, thereby improving the sound reception effect of the first microphone when receiving the sound emitted from the user's mouth. In addition, the first sound receiving hole 1191 and the second sound receiving hole 1192 may be close to the user's mouth. Therefore, the sound emitted from the user's mouth may be the near-field sound for both the first microphone and the second microphone. In addition, the distance from the first sound receiving hole 1191 to the user's mouth and the distance from the second sound receiving hole 1192 to the user's mouth may be different such that the sound emitted from the user's mouth received by the first microphone may be different from the sound emitted from the user's mouth received by the second microphone (e.g., different in amplitude or phase). A noise from the environment may be considered as the far field sound for both the first microphone and the second microphone, and the noises received by the first microphone and the second microphone may be approximately the same (e.g., with the approximately same amplitude or phase).

Then the signal received by the second microphone may be subtracted from the signal received by the first microphone and then amplified such that a good vocal effect after noise elimination may be obtained. Based on this, a certain spacing needs to be set between the first sound receiving hole 1191 and the second sound receiving hole 1192 to allow subsequent signal processing. When the earphone 10 is in the wearing state, at least a portion of the sound generation component 11 may extend into the concha cavity, under the premise of ensuring that the first sound receiving hole 1191 is set at a position close to the user's mouth and ensuring a specific spacing between the first sound receiving hole 1191 and the second sound receiving hole 1192, the second sound receiving hole 1192 may be relatively close to an antihelix. As a result, when the sound waves generated by a user's speech or external sound waves are transmitted to the antihelix, the antihelix may have a reflection effect on the sound waves, especially on the sound waves in a frequency range of 3 kHz-8 kHz, which may cause the sound waves received by the second microphone to be louder than the sound waves received by the first microphone, affecting the subsequent noise reduction and sound reception effects. Accordingly, in some embodiments, the distance between the first sound receiving hole 1191 and the second sound receiving hole 1192, as well as the distance between the second sound receiving hole 1192 and an edge of the user's antihelix may be adjusted to ensure the noise reduction and sound reception effects of the earphone 10.

As shown in FIG. 11, when the earphone 10 is in the wearing state, the first sound receiving hole 1191 may have a first projection point P on the sagittal plane of the user (e.g., the T-S plane shown in FIG. 11), and the second sound receiving hole 1192 may have a second projection point O on the sagittal plane. In some embodiments, an extension of a line connecting the first projection point P of the first sound receiving hole 1191 on the sagittal plane and the second projection point O of the second sound receiving hole 1192 on the sagittal plane may have an intersection point E with the projection of the antihelix of the user on the sagittal plane. In some embodiments, to facilitate a clearer description of a position relationship of the first sound receiving hole 1191, the second sound receiving hole 1192, and the antihelix of the user's auricle, the distance between the second sound receiving hole 1192 and the antihelix of the user's auricle may be reflected by a first distance OA between the second projection point O of the projection of the second sound receiving hole 1192 on the sagittal plane and the intersection point E. The distance between the first sound receiving hole 1191 and the second sound receiving hole 1192 on the sagittal plane may be reflected by a second distance OP between the first projection point P of the first sound receiving hole 1191 on the sagittal plane and the second projection point O of the second sound receiving hole 1192 on the sagittal plane. It may be noted that in the present disclosure, the first projection point P refers to a center of the projection of the first sound receiving hole 1191 on the sagittal plane, and similarly, the second projection point O refers to the center of the projection of the second sound receiving hole 1192 on the sagittal plane. When the sizes of the first sound receiving hole 1191 and the second sound receiving hole 1192 are relatively small (e.g., with diameters of less than 2 mm), each of the projections of the first sound receiving hole 1191 and the second sound receiving hole 1192 on the sagittal plane may be approximated as a point.

Considering that when the second sound receiving hole 1192 is relatively close to the antihelix, the antihelix may have a reflection effect on the sound waves generated by the user's speech or the external sound waves when the sound waves are transmitted to the antihelix, especially for the sound waves in the frequency range of 3 kHz-8 kHz. As a result, the sound received by the second microphone may be louder than the sound received by the first microphone, which affects the subsequent noise reduction effect and the sound reception effect. In addition, as a size of the sound generation component 11 is limited, it is necessary to ensure that there is a relatively great distance between the first sound receiving hole 1191 and the second sound receiving hole 1192. When the second sound receiving hole 1192 is far away from the antihelix, the distance between the first sound receiving hole 1191 and the second sound receiving hole 1192 may become smaller, which affects subsequent signal processing. Based on this, in some embodiments, to ensure that there is a sufficient difference between the sound emitted from the user's mouth received by the first microphone and the second microphone, and at the same time to reduce the sound enhancement effect of the antihelix on the sound at the second sound receiving hole 1192, a first distance between the second projection point O of the second sound receiving hole 1192 on the sagittal plane and the intersection E may be between 2 mm and 10 mm. To reduce the sound enhancement effect of the antihelix on the sound at the second sound receiving hole 1192, and to improve the sound reception effects of the first microphone and the second microphone, the distance between the second sound receiving hole 1192 and the antihelix may be increased. In some embodiments, the first distance between the second projection point O and the intersection E may be between 4 mm and 10 mm. To further reduce the reflection effect of the antihelix on the sound waves, and to further improve the sound reception effects of the first microphone and the second microphone, the distance between the second sound receiving hole 1192 and the antihelix may be further increased. In some embodiments, the first distance between the second projection point O and the intersection E may be between 6 mm and 10 mm. When the second sound receiving hole 1192 is provided at a position farther away from the antihelix, the reflection effect of the antihelix on sound waves may not affect the second sound receiving hole 1192. In some embodiments, the first distance between the second projection point O and the intersection E may be between 8 mm and 10 mm.

The concha cavity refers to a concave fossa region below the crus of helix, that is, an edge of the concha cavity consists of at least a sidewall below the crus of helix, the contour of a tragus, an intertrack notch, an antitragus tip, a notch between an antitragus and the antihelix, and the contour of the antihelix corresponding to the concha cavity. Based on this, in some embodiments, to ensure that the first microphone and the second microphone in the earphone 10 have good sound reception effect and noise reduction effect, a ratio of the second distance OP between the first projection point P and the second projection point O to the first distance OE between the second projection point O and the intersection E may be in a range of 1.8-4.4. To reduce the influence of the antihelix on the second microphone, the distance between the second sound receiving hole 1192 and the antihelix may be increased, and the distance between the first sound receiving hole 1191 and the second sound receiving hole 1192 may be increased so as to facilitate a subsequent signal processing. In some embodiments, the ratio of the second distance OP between the first projection point P to the second projection point O to the first distance OE between the second projection point O and the intersection point E may be in a range of 2.5-3.8. In some embodiments, when a wearing position of the earphone 10 remains unchanged, to further minimize the influence of the antihelix on the second microphone, the distance between the second sound receiving hole 1192 and the antihelix may be increased, and the distance between the first sound receiving hole 1191 and the second sound receiving hole 1192 may be increased to facilitate a subsequent signal processing. In some embodiments, the ratio of the second distance OP between the first projection point P and the second projection point O to the first distance OE between the second projection point O and the intersection point E may be in a range of 2.8-3.5. Based on the considerations of reducing the influence of the antihelix on the second microphone and facilitating the processing of the subsequent signals, the distance between the second sound receiving hole 1192 and the antihelix may be further increased, at the distance between the first sound receiving hole 1191 and the second sound receiving hole 1192 may be further increased. In some embodiments, the ratio of the second distance OP between the first projection point P and the second projection point O to the first distance OE between the second projection point O and the intersection point E may be in a range of 3.0-3.3.

When the distance between the first sound receiving hole 1191 and the second sound receiving hole 1192 is too small, the amplitude differences and phase differences between the low-frequency sound signals received by the first microphone and the second microphone may be too small, making it difficult for subsequent processing of the low-frequency signals. Therefore, the distance between the first sound receiving hole 1191 and the second sound receiving hole 1192 may not be too small.

In some embodiments, to ensure that the first microphone and the second microphone have good sound reception effects and to facilitate the subsequent signal processing, the distance between the first sound receiving hole 1191 and the second sound receiving hole 1192 may be no less than 10 mm. To ensure the portability of the earphone 10 and the comfort of the user when wearing the earphone 10, the size of the sound generation component 11 may not be too great, and correspondingly, the distance between the first sound receiving hole 1191 and the second sound receiving hole 1192 may be limited by the size of the sound generation component 11. In some embodiments, the distance between the first sound receiving hole 1191 and the second sound receiving hole 1192 may not be greater than 50 mm. In some embodiments, considering the size limit of the sound generation component 11 itself and to make the first microphone and the second microphone 11 have better sound reception effect to facilitate the subsequent signal processing, the distance between the first microphone and the second sound receiving hole 1192 may be in a range of 10 mm-50 mm. The distance between the first sound receiving hole 1191 and the second sound receiving hole 1192 described herein refers to a straight-line distance between a center of an opening of each of the first sound receiving hole 1191 and the second sound receiving hole 1192 on the outer surface of the sound generation component 11 or the ear hook 12 (e.g., the distance D12 as shown in FIG. 10). Considering that a too great size of the sound generation component 11 affects the stability and comfort of carrying and wearing the earphone 10, while ensuring that the first microphone and the second microphone have good sound reception effects and facilitating the subsequent signal processing, the distance between the first sound receiving hole 1191 and the second sound receiving hole 1192 may be appropriately reduced, so that the size of the sound generation component 11 is relatively small. In some embodiments, the distance between the first sound receiving hole 1191 and the second sound receiving hole 1192 may be in a range of 20 mm-47 mm. In some embodiments, to make the sound signals received by the first microphone and the second microphone sufficiently different and to make the sound generation component 11 have a suitable size, the distance between the first sound receiving hole 1191 and the second sound receiving hole 1192 may be in a range of 27 mm-32 mm. Specifically, the distance between the first sound receiving hole 1191 and the second sound receiving hole 1192 may be 26 mm.

In some embodiments, the distance between the first sound receiving hole 1191 and the second sound receiving hole 1192 may be represented by the distance between the first projection point P of the first sound receiving hole 1191 on the sagittal plane and the second projection point O of the second sound receiving hole 1192 on the sagittal plane. That is, the second distance between the first projection point P of the first sound receiving hole 1191 on the sagittal plane and the second projection point O of the second sound receiving hole 1192 on the sagittal plane may be in a range of 10 mm-50 mm. It may be understood that when the line connecting the first sound receiving hole 1191 and the second sound receiving hole 1192 is not parallel to the sagittal plane, the distance between the first sound receiving hole 1191 and the second sound receiving hole 1192 may have certain difference from the distance between the first projection point P and the second projection point O. Specifically, the distance between the first sound receiving hole 1191 and the second sound receiving hole 1192 may be greater than the distance between the first projection point P and the second projection point O. Referring to the distance between the first sound receiving hole 1191 and the second sound receiving hole 1192 as described above, considering the limit of the size of the sound generation component 11 itself and to make the first microphone and the second microphone have a better sound reception effect and to facilitate the subsequent signal processing, in some embodiments, the second distance between the first projection point P of the first sound receiving hole 1191 on the sagittal plane and the second projection point O of the second sound receiving hole 1192 on the sagittal plane may be in the range of 8 mm-48 mm. In some embodiments, further considering the size limit of the sound generation component 11, the second distance between the first projection point P of the first sound receiving hole 1191 on the sagittal plane and the second projection point O of the second sound receiving hole 1192 on the sagittal plane may be in a range of 18 mm-45 mm. In some embodiments, to further improve the reception effects of the first microphone and the second microphone, the second distance between the first projection point P of the first sound receiving hole 1191 on the sagittal plane and the second projection point O of the second sound receiving hole 1192 on the sagittal plane may be in a range of 25 mm-30 mm.

Referring to FIG. 10, in some embodiments, the first sound receiving hole 1191 may be disposed on the second portion 122 of the ear hook 12 (the portion of the ear hook 12 close to the sound generation component 11). Specifically, in some embodiments, the first sound receiving hole 1191 may be disposed near a connection of the second portion 122 of the ear hook 12 and the sound generation component 11. For example, the first sound receiving hole 1191 may be disposed on the second portion 122 of the ear hook 12 or on the sound generation component 11. In the present disclosure, the first sound receiving hole 1191 being provided near the connection between the second portion 122 of the ear hook 12 and the sound generation component 11 refers to that the minimum distance between the first sound receiving hole 1191 and the connection is not greater than 4 mm. In some embodiments, a position relationship between the first sound receiving hole 1191 and the second portion 122 of the ear hook as well as the sound generation component 11 may be represented by a distance between the projection of the first sound receiving hole 1191 on the sagittal plane and the projection of the connection on the sagittal plane. For example, in some embodiments, the minimum distance between the projection of the first sound receiving hole 1191 on the sagittal plane and the projection of the connection on the sagittal plane may not be greater than 4 mm. When the user wears the earphone, the sound generation component 11 may be closer to the user's mouth, and to improve the reception effect of the first microphone, in some embodiments, the minimum distance between the projection of the first sound receiving hole 1191 on the sagittal plane and the projection of the connection on the sagittal plane may not be greater than 3 mm. In some embodiments, the first sound receiving hole 1191 may also be disposed at the connection between the sound generation component 11 and the second portion 122 of the ear hook. At this time, the first sound receiving hole 1191 may be closer to the user's mouth, and the first microphone may have a better reception effect. In some embodiments, the sound generation component 11 and the second portion 122 of the ear hook may be independent structures, and they may be connected through splicing, embedding, inserting, etc. The connection between the second portion 122 of the ear hook and the sound generation component 11 may be a connection gap between the two. The projection of the connection of the sound generation component 11 with the second component 122 of the ear hook 12 on the sagittal plane may refer to the projection of the connection gap on the sagittal plane. In some embodiments, by disposing the first sound receiving hole 1191 near the connection between the sound generation component 11 and the second portion 122 of the ear hook 12 (e.g., the first sound receiving hole 1191 may be disposed on the second portion of the ear hook 122), the first sound receiving hole 1191 may be close to the user without occupying an internal cavity space of the sound generation component 11, which facilitates an installation of the transducer and routing of an internal wiring, thereby effectively improving production efficiency.

It may also be noted that in some embodiments, when the first sound receiving hole 1191 and the second sound receiving hole 1192 are small in size, each of the first sound receiving hole 1191 and the second sound receiving hole 1192 may be approximated as a point. In some embodiments, when the sizes of the first sound receiving hole 1191 and the second sound receiving hole 1192 are relatively great, the distance between the first sound receiving hole 1191 and the connection between the sound generation component 11 and the second portion 122 of the ear hook may be understood as the minimum distance between the center of the first sound receiving hole 1191 and the connection between the sound generation component 11 and the second portion 122 of the ear hook. Correspondingly, when the size of the first sound receiving hole 1191 is relatively small, the projection of the first sound receiving hole 1191 on the sagittal plane may be approximated regarded as a point, and the minimum distance between the projection of the first sound receiving hole 1191 on the sagittal plane and the projection of the connection between the sound generation component 11 and the second portion 122 of the ear hook on the sagittal plane may refer to the minimum distance between the projection point of the first sound receiving hole 1191 on the sagittal plane and the projection of the connection on the sagittal plane. When the first sound receiving hole 1191 is of a relatively great size, the minimum distance between the projection of the first sound receiving hole 1191 on the sagittal plane and the projection of the connection between the sound generation component 11 and the second portion 122 of the ear hook on the sagittal plane refers to the minimum distance between the centroid of the projection of the first sound receiving hole 1191 on the sagittal plane and the projection of the connection on the sagittal plane. Similarly, the distance between the sound receiving hole and a side (e.g., the inner side, the upper side) of the sound generation component 11 described elsewhere in the present disclosure may be understood as the minimum distance from the center of the sound receiving hole to the side of the sound generation component 11.

It may be understood that the positions of the first sound receiving hole 1191 and the second sound receiving hole 1192 shown in FIG. 10 are illustrative only. In some embodiments, the first sound receiving hole 1191 and/or the second sound receiving hole 1192 may be provided in other unblocked positions. For example, in some embodiments, the first sound receiving hole 1191 and the second sound receiving hole 1192 may be disposed on an outer side OS of the sound generation component 11. For example, in some embodiments, the first sound receiving hole 1191 may be provided on the outer side OS of the sound generation component 11 and the second sound receiving hole 1192 may be provided on an upper side US of the sound generation component 11. It may be noted that in the present disclosure, the inner side IS of the sound generation component 11 may refer to a side of the earphone 10 that is closest to the user's head in the wearing state (referring to the inner side IS in FIG. 20A and FIG. 20B). The upper side US of the sound generation component 11 may refer to a side of the earphone 10 farthest from the ground in the wearing state (referring to the upper side US in FIG. 20A and FIG. 20B). Accordingly, the side opposite to the inner side IS may be regarded as the outer side OS of the sound generation component 10 (referring to the outer side OS in FIG. 20A), and the side opposite to the upper side US may be regarded as the lower side LS of the sound generation component 10 (referring to the lower side LS in FIG. 20B). In some embodiments, each of the upper side US, the lower side LS, the inner side IS, and the outer side OS of the sound generation component 11 may be planar and/or non-planar. The specific distribution positions of the first sound receiving hole 1191 and the second sound receiving hole 1192 are described below combined with FIGS. 12-21B.

Figure 12:
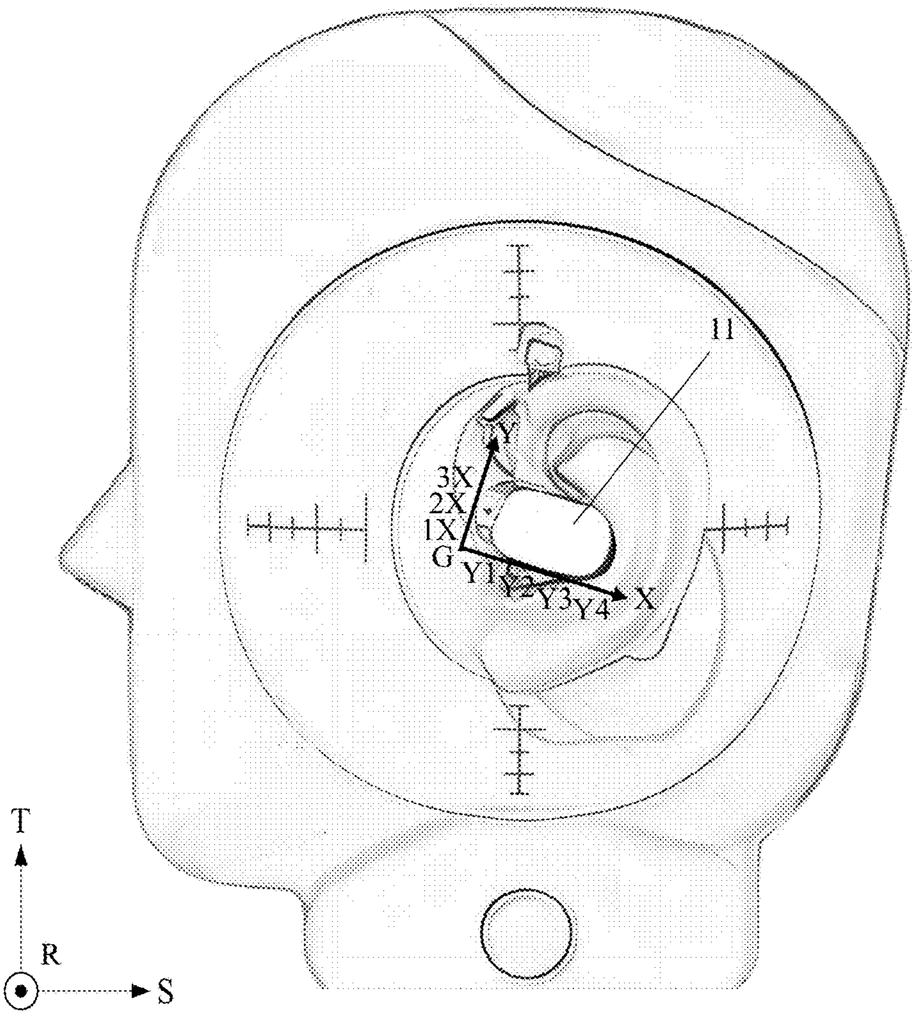
FIG. 12 is a schematic diagram illustrating an exemplary wearing state of an earphone according to some other embodiments of the present disclosure.
Figure 13:
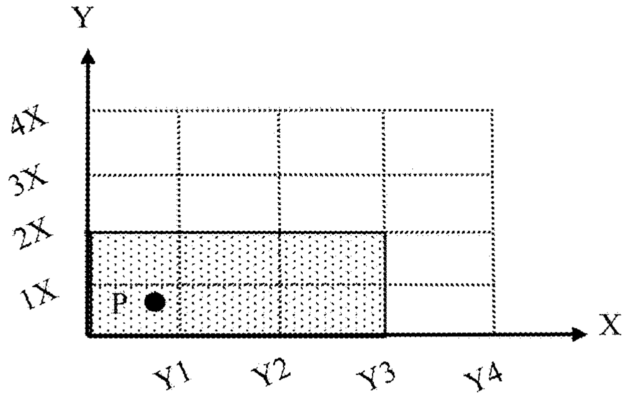
FIG. 13 is a schematic diagram illustrating an exemplary coordinate system established based on a projection of a sound generation component on a sagittal plane according to some embodiments of the present disclosure.

FIG. 12 is a schematic diagram illustrating an exemplary wearing state of an earphone according to some other embodiments of the present disclosure, and FIG. 13 is a schematic diagram illustrating an exemplary coordinate system established based on a projection of a sound generation component on a sagittal plane according to some embodiments of the present disclosure.

Referring to FIG. 12, a shape of the projection of the sound generation component 11 on a sagittal plane may include a long axis direction X and a short axis direction Y. Referring to FIG. 13, a coordinate system may be established with the long axis direction X and the short axis direction Y, and a relative position of the first sound receiving hole 1191 with respect to the sound generation component 11 may be represented by the coordinates in the coordinate system. The Y-axis may be a tangent line parallel to the short axis direction Y and tangent to the projection of the front side of the sound generation component 11 on the sagittal plane, and the X-axis may be a tangent line parallel to the long axis direction X and tangent to the projection of the lower side LS of the sound generation component 11 on the sagittal plane. In some embodiments, the position of the Y-axis may be determined in the following manner: determining the projection of the sound generation component 11 on the sagittal plane; identifying a tangent line (referred to as "tangent line I") that is parallel to the short axis direction Y and tangent to the projection of a rear side RS of the sound generation component 11 on the sagittal plane; determining a center of the projection of a diaphragm or a magnetic circuit assembly in the sound generation component 11 on the sagittal plane; determining a symmetric line of the tangent line I with respect to the center, and taking the symmetric line as a straight line in which the Y axis is located.

Referring to FIG. 13, on the Y-axis, 1X may represent a line Y=1, 2X may represent a line Y=2, 3X may represent a line Y=3, 4X may represent a line Y=4, etc. Similarly, on the X axis, Y1 may represent a line X=1, Y2 may represent a line X=2, Y3 may represent a line X=3, etc. In some embodiments, the coordinates of points in the coordinate system may be represented as YX. For example, on the line Y=2, the line Y=2 may be parallel to the X-axis. As the value of Y=2 remains unchanged, the coordinates of the points on the line may be unified and represented as 2X. When X takes different values, different positions may be obtained, such as a position 21, a position 22, a position 23, etc. As shown in FIGS. 12 and 13, in some embodiments, the sound generation component 11 may be divided into 4 equal portions in the long axis direction X, and divided into 4 equal portions in the short axis direction Y. In some embodiments, the sound generation component 11 may further be divided into other counts of equal portions in the long axis direction X and the short axis direction Y. Taking the coordinate system as a reference, sound reception effects of the first sound receiving hole 1191 at different positions are described below.

Figure 14:
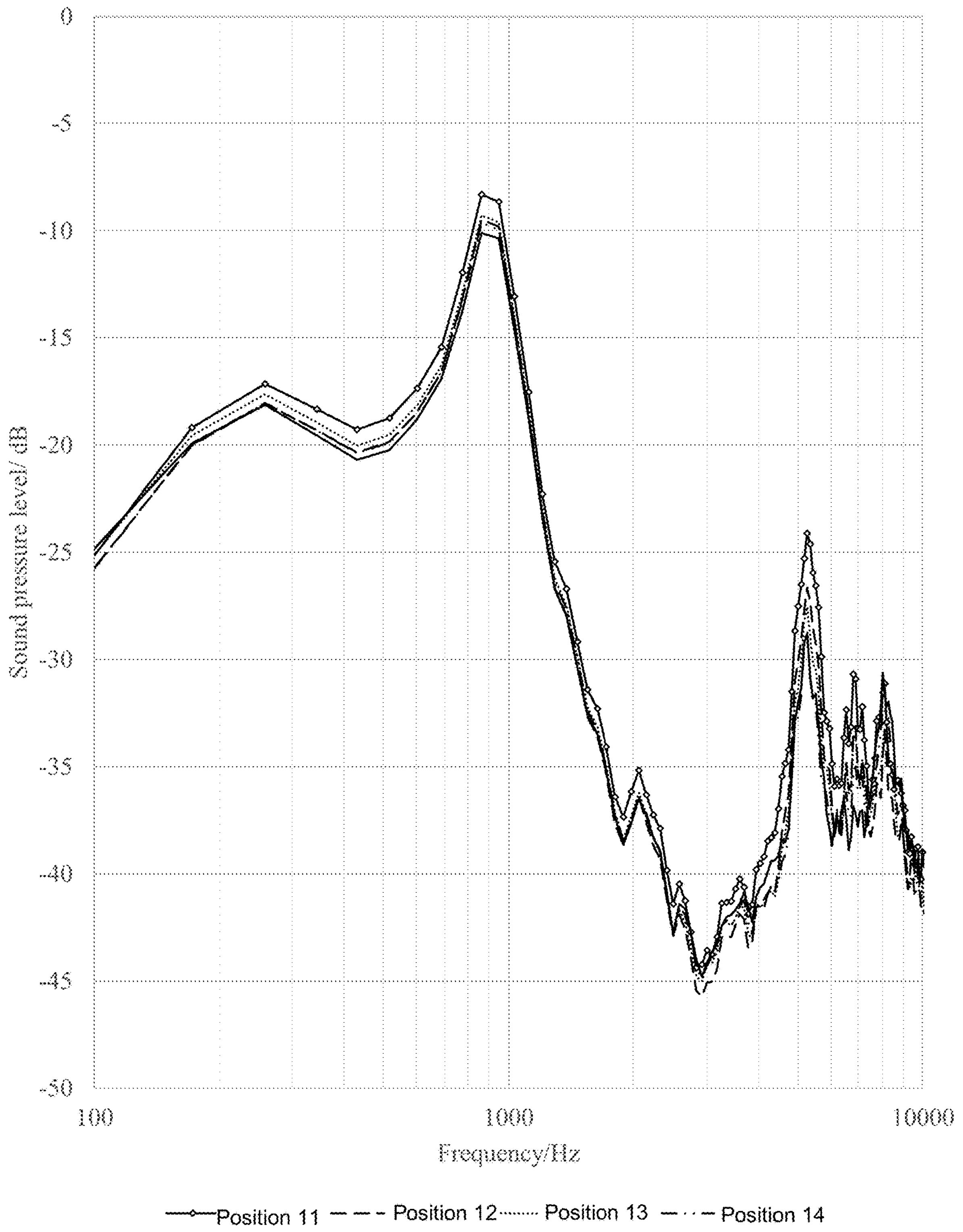
FIG. 14 is a schematic diagram illustrating sound receiving curves of first sound receiving holes located at different positions according to some embodiments of the present disclosure.

FIG. 14 is a schematic diagram illustrating sound receiving curves of the first sound receiving holes located at different positions according to some embodiments of the present disclosure. As shown in FIG. 14, when Y=1, a coordinate on a straight line Y=1 along the X-axis direction may be uniformly represented as 1X, and when X takes different values, corresponding positions may be determined, such as a position 11, a position 12, a position 13, a position 14, etc. As shown in FIG. 14, to ensure a good sound reception effect of the first microphone while ensuring that the second sound receiving hole 1192 has a specific distance from the first sound receiving hole 1191 and that the second sound receiving hole 1192 is as far away from the antihelix as possible, a ratio of the distance between the first projection point P of the first sound receiving hole 1191 on the sagittal plane and a projection of a front side of the sound generation component 11 on the sagittal plane in the long axis direction X to a size of the projection of the sound generation component 11 on the sagittal plane along the long axis direction X may not be greater than 0.75, i.e., when the sound generation component 11 is divided into 4 equal portions along the long axis direction X, the first projection point P may be located in a region where X≤3. To make the first sound receiving hole 1191 close to the user's mouth to improve the reception effect of the first microphone, in some embodiments, a ratio of the distance between the first projection point P of the first sound receiving hole 1191 on the sagittal plane and the projection of the front side of the sound generation component 11 along the long axis direction X to the size of the projection of the sound generation component 11 along the long axis direction X may not be greater than 0.5. In some embodiments, to make the first sound receiving sound receiving hole 1191 closer to the user's mouth to improve the reception effect of the first microphone, the ratio of the distance between the first projection point P of the first sound receiving hole 1191 on the sagittal plane and the projection of the front side of the sound generation component 11 on the sagittal plane along the long axis direction X to the dimension of the projection of the sound generation component 11 on the sagittal plane along the long axis direction X may not be greater than 0.3. In some embodiments, to make the first sound receiving hole 1191 closer to the user's mouth to improve the reception effect of the first microphone, the ratio of the distance between the first projection point P of the first sound receiving hole 1191 on the sagittal plane and the projection of the front side of the sound generation component 11 on the sagittal plane along the long axis direction X to the dimension of the projection of the sound generation component 11 on the sagittal plane along the long axis direction X may not be greater than 0.2. By disposing the first sound receiving hole 1191 at a position close to the front side of the sound generation component 11, the position of the second sound receiving hole 1192 may have more options, such that the first sound receiving hole 1191 may have a specific distance from the second sound receiving hole 1192, and the second sound receiving hole 1192 may be far away from the antihelix as much as possible. Accordingly, in some embodiments, the ratio of the distance between the first projection point P of the first sound receiving hole 1191 on the sagittal plane and the projection of the front side of the sound generation component 11 on the sagittal plane along the long axis direction X to the dimension of the projection of the sound generation component 11 on the sagittal plane along the long axis direction X may not be greater than 0.1. In some embodiments, the first sound receiving hole 1191 may also be disposed on the front side of the sound generation component 11. At this time, the first sound receiving hole 1191 may be closer to the user's mouth in the horizontal direction, and the first microphone may have a better reception effect. It may be noted that, for the convenience of understanding, the distance between the first projection point P of the first sound receiving hole 1191 on the sagittal plane and the projection of the front side of the sound generation component 11 on the sagittal plane along the long axis direction X may refer to a distance between the first projection point P and the Y-axis, i.e., a distance between the first projection point P and a tangent line along the short axis direction Y and tangent to the projection of the front side of the sound generation component 11 on the sagittal plane.

Figure 15:
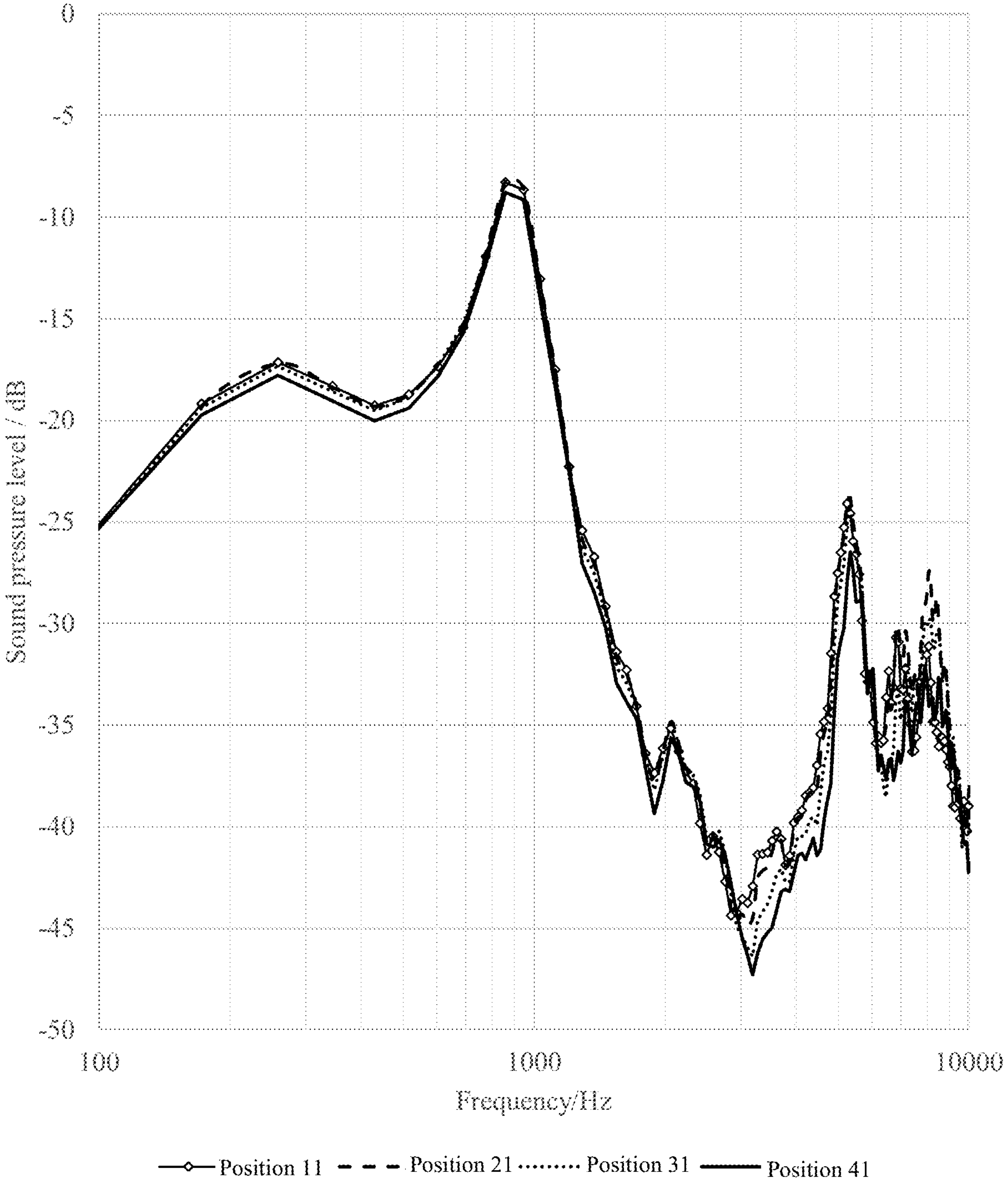
FIG. 15 is a schematic diagram illustrating sound receiving curves of first sound receiving holes located at different positions according to some other embodiments of the present disclosure.

FIG. 15 is a schematic diagram illustrating sound receiving curves of first sound receiving holes located at different positions according to some other embodiments of the present disclosure. As shown in FIG. 15, when X=1, coordinates along the Y-axis direction on the line X=1 may be uniformly represented as Y1, and when Y takes on different values, the corresponding position may be determined, such as a position 11, a position 21, a position 31, a position 41, etc. FIG. 15 shows the sound reception situations of the first microphone at the position 11, the position 21, the position 31, the position 41, respectively. According to FIG. 15, the smaller the coordinate of the Y-axis on Y1, the closer the first microphone to the user's mouth, the better the sound reception effect.

Based on this, in some embodiments, to make the first microphone have a relatively good reception effect, a ratio of a distance between the first projection point P of the first sound receiving hole 1191 on the sagittal plane and the projection of the lower side LS of the sound generation component 11 on the sagittal plane along a short axis direction Y to the size of the projection of the sound generation component 11 on the sagittal plane along the short axis direction Y may not be greater than 1. Considering that when the first sound receiving hole 1191 and the second sound receiving hole 1192 are located on the sound generation component 11, if the first sound receiving hole 1191 is disposed at a position on the upper side US or the front side (the connection end CE) of the sound generation component with the maximum distance relative to the long axis direction X, the line connecting the first sound receiving hole 1191 and the second sound receiving hole 1192 may not be directed to the user's mouth, and the sound reception effect may be affected. In some embodiments, the ratio of the distance between the first projection point P of the first sound receiving hole 1191 on the sagittal plane and the projection of the lower side LS of the sound generation component 11 on the sagittal plane along the short axis direction Y to the size of the projection of the sound generation component 11 on the sagittal plane along the short axis direction Y may not be greater than 0.5, i.e., when the sound generation component 11 is divided into 4 equal portions along the short axis direction Y, the first projection point P may be located in a region where Y≤2. In some embodiments, to make the first sound receiving hole 1191 closer to the user's mouth and to improve the reception effect of the first microphone, in some embodiments, the ratio of the distance between the first projection point P of the first sound receiving hole 1191 on the sagittal plane and the projection of the lower side LS of the sound generation component 11 on the sagittal plane along the short axis direction Y to the size of the projection of the sound generation component 11 on the sagittal plane along the short axis direction Y may not be greater than 0.4. In some embodiments, the ratio of the distance between the first projection point P of the first sound receiving hole 1191 on the sagittal plane and the projection of the lower side LS of the sound generation component 11 on the sagittal plane along the short axis direction Y to the size of the projection of the sound generation component 11 on the sagittal plane along the short axis direction Y may not be greater than 0.3. By providing the first sound receiving hole 1191 close to the lower side LS of the sound generation component, the position of the second sound receiving hole 1192 may have more options such that the second sound receiving hole 1192 has a specific distance from the first sound receiving hole 1191 and the line connecting the first sound receiving hole 1191 and the second sound receiving hole 1192 is more accurately directed to the user's mouth. Based on the above considerations, in some embodiments, the ratio of the distance between the first projection point P of the first sound receiving hole 1191 on the sagittal plane and the projection of the lower side LS of the sound generation component 11 on the sagittal plane along the short axis direction Y to the size of the projection of the sound generation component 11 on the sagittal plane along the short axis direction Y may not be greater than 0.1. In some embodiments, the first sound receiving hole 1911 may be disposed on the lower side LS of the sound generation component 11. At this time, the first sound receiving hole 1191 may be closer to the user's mouth in the vertical direction, and the sound reception effect of the first microphone may be improved. It may be noted that, for the convenience of understanding, the distance between the first projection point P of the first sound receiving hole 1191 on the sagittal plane and the projection of the lower side LS of the sound generation component 11 on the sagittal plane along the short axis direction Y may refer to the distance between the first projection point P and the X axis, i.e., the distance between the first projection point P and a tangent line along the long axis direction X and tangent to the projection of the lower side LS of the sound generation component 11 on the sagittal plane.

When the position of the first sound receiving hole 1191 is disposed close to the lower side LS of the sound generation component 11, the position of the second sound receiving hole 1192 may be disposed close to the upper side US of the sound generation component 11 to increase the distance between the first sound receiving hole 1191 and the second sound receiving hole 1192, which increases the difference between the signals received by the first sound receiving hole 1191 and the second sound receiving hole 1192, and makes the line connecting the first sound receiving hole 1191 and the second sound receiving hole 1192 point to the user's mouth, thereby improving the sound reception effect. In some embodiments, a ratio of the distance between the second projection point O of the second sound receiving hole 1192 on the sagittal plane and the projection of the upper side US of the sound generation component 11 on the sagittal plane along the short axis direction Y to the size of the size of the projection of the sound generation component 11 on the sagittal plane along the short axis direction Y may not be greater than 0.25. That is, when the sound generation component 11 is divided into 4 equal portions along the short axis direction Y, the second projection point O may be located in a region where Y≥3. In some embodiments, to make the second sound receiving hole 1192 farther away from the user's mouth than the first sound receiving hole 1191 such that a sufficient spacing may be maintained between the first sound receiving hole 1191 and the second sound receiving hole 1192 and the line connecting the first sound receiving hole 1191 and the second sound receiving hole 1192 may point more accurately to the user's mouth, thereby improving the sound reception effect, in some embodiments, the ratio of the distance between the second projection point O of the second sound receiving hole 1192 on the sagittal plane and the projection of the upper side US of the sound generation component 11 on the sagittal plane along the short axis direction Y to the size of the size of the projection of the sound generation component 11 on the sagittal plane along the short axis direction Y may not be greater than 0.2. In some embodiments, the second sound receiving hole 1912 may be disposed on the upper side US of the sound generation component 11. At this time, the second sound receiving hole 1192 may have a greater distance from the first sound receiving hole 1191 in the vertical direction, the line connecting the first sound receiving hole 1191 and the second sound receiving hole 1192 may be more accurately pointed to the user's mouth, and the sound reception effect may be improved.

Figure 16:
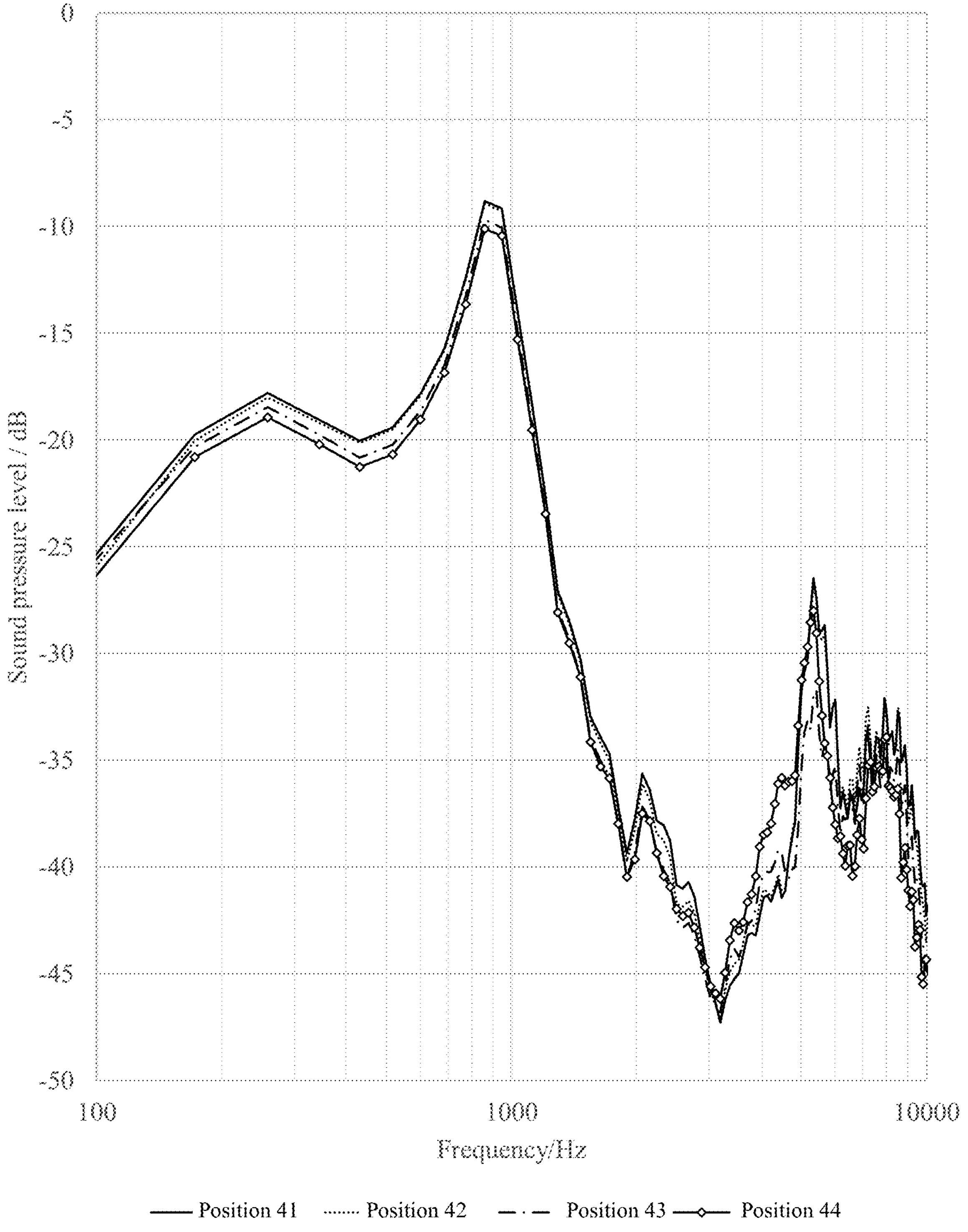
FIG. 16 is a schematic diagram illustrating sound receiving curves of second sound receiving holes located at different positions according to some other embodiments of the present disclosure.

FIG. 16 is a schematic diagram illustrating sound receiving curves of second sound receiving holes located at different positions according to some other embodiments of the present disclosure. As shown in FIG. 16, when Y=4, coordinates on the straight line Y=4 along the X-axis direction may be uniformly represented as 4X, and when X takes different values, the corresponding position may be determined, for example, a position 41, a position 42, a position 43, a position 44, etc. FIG. 11 shows sound reception situations at positions 41, 42, 43, and 44, respectively. According to FIG. 16, on 4X, as X increases, a distance between the second sound receiving hole 1192 and the user's antihelix becomes smaller and the second sound receiving hole 1192 may be more affected by reflections of the antihelix. For example, when X is great, a sound reception of the second microphone in a frequency band after 3 kHz significantly increases, which results in different changing laws of the sound receiving curve of the second microphone before and after 3 kHz. That is, if the second sound receiving hole 1192 is disposed at a position close to the antihelix, the sound reception effect of the second sound receiving hole 1192 after 3 kHz may be stronger than the sound reception effect of the first sound receiving hole 1191, which results in poorer sound pickup effects of the first microphone and the second microphone to the user's mouth.

Figure 17:
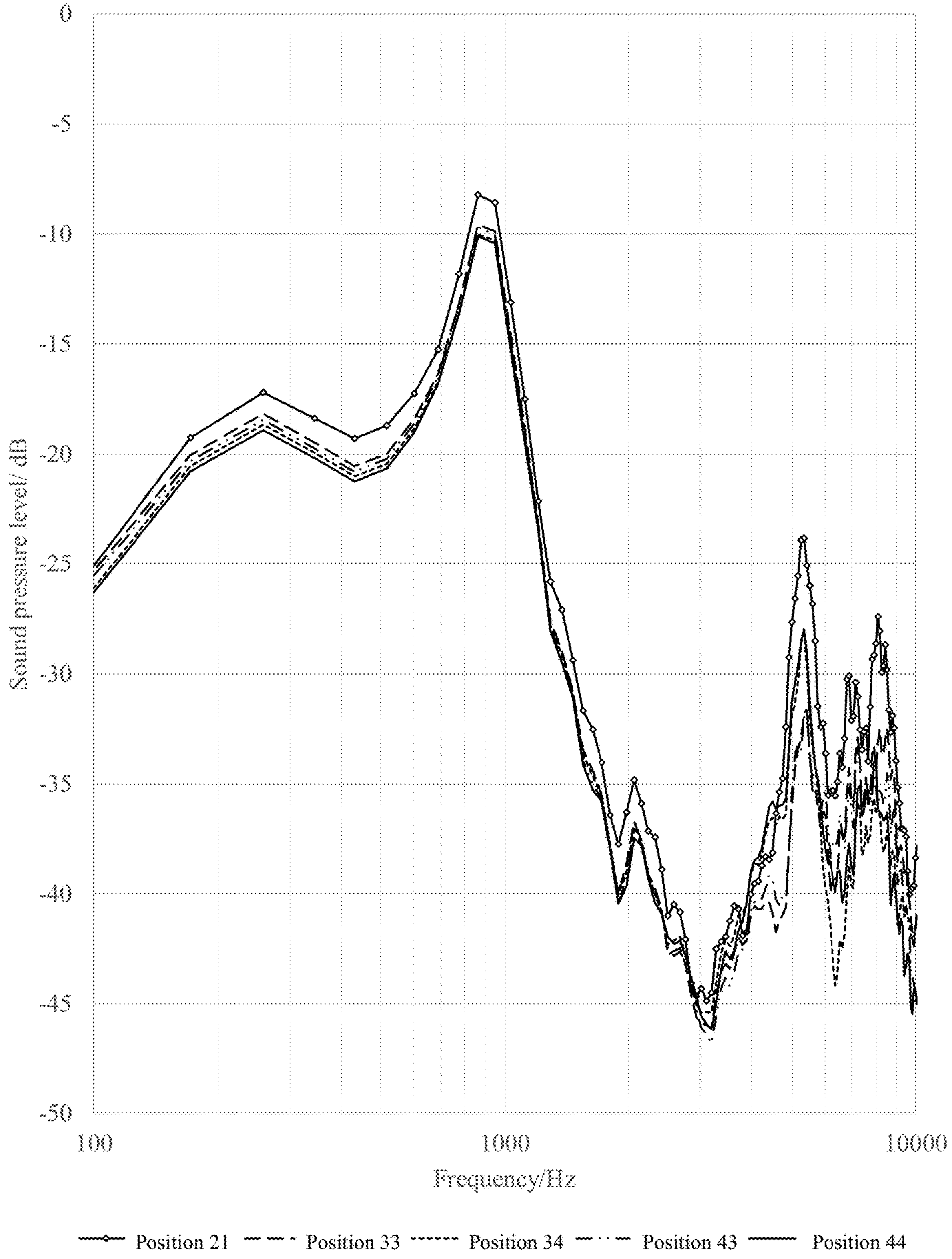
FIG. 17 is a schematic diagram illustrating sound receiving curves of sound receiving holes located at different positions according to some other embodiments of the present disclosure.

FIG. 17 is a schematic diagram illustrating sound receiving curves of sound receiving holes located at different positions according to some embodiments of the present disclosure. As shown in FIG. 17, the sound reception effect of the microphone at position 21 may be better than the sound reception situations of the microphones at position 33, position 34, position 43, and position 44. In some embodiments, the first sound receiving hole 1191 may be provided at the position 21 and the second sound receiving hole 1192 may be provided at the position 33, the position 34, the position 43, or the position 44. At this time, the first sound receiving hole 1191 may have a better sound reception effect than the second sound receiving hole 1192 in a whole frequency band. When the second sound receiving hole 1192 is disposed at the position 33 or the position 34, the sound reception effect of the second sound receiving hole 1192 may be relatively good, and the sound receiving curve of the second sound receiving hole 1192 may be more consistent with the sound receiving curve of the first sound receiving hole 1191. Signals of the first microphone and the second microphone may be processed to obtain the sound from the user's mouth in a wider frequency band. When the second sound receiving hole 1192 is disposed at the position 43 or the position 44, the distance between the second sound receiving hole 1192 and the first sound receiving hole 1191 may be relatively great, which facilitates a noise reduction. The signals of the first microphone and the second microphone may be processed to obtain a clearer sound from the user's mouth in a low-frequency range.

Figure 18:
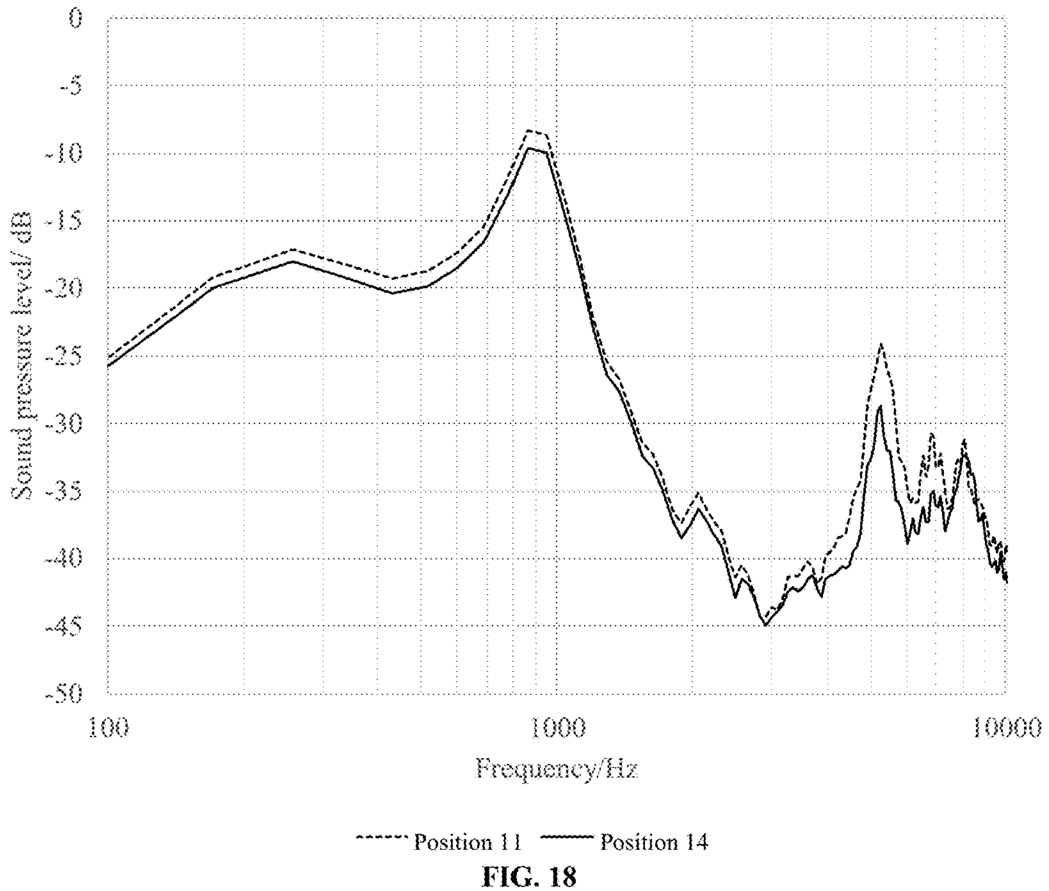
FIG. 18 is a schematic diagram illustrating sound receiving curves of sound receiving holes located at different positions according to some other embodiments of the present disclosure.

FIG. 18 is a schematic diagram illustrating sound receiving curves of sound receiving holes located at different positions according to some other embodiments of the present disclosure. FIG. 18 shows the sound reception situations of the microphone at position 11 and position 14. The sound reception effect of the microphone at the position 11 is better than the sound reception effect of the microphone at the position 14 in the whole frequency band. In some embodiments, the first sound receiving hole 1191 may be disposed at the position 11, and the second sound receiving hole 1192 may be disposed at the position 14. In such cases, the sound reception effects of both the first sound receiving hole 1191 and the second sound receiving hole 1192 may be relatively good. The signals of the first microphone and the second microphone may be processed to obtain the sound from the user's mouth in a wider frequency band.

Figure 19:
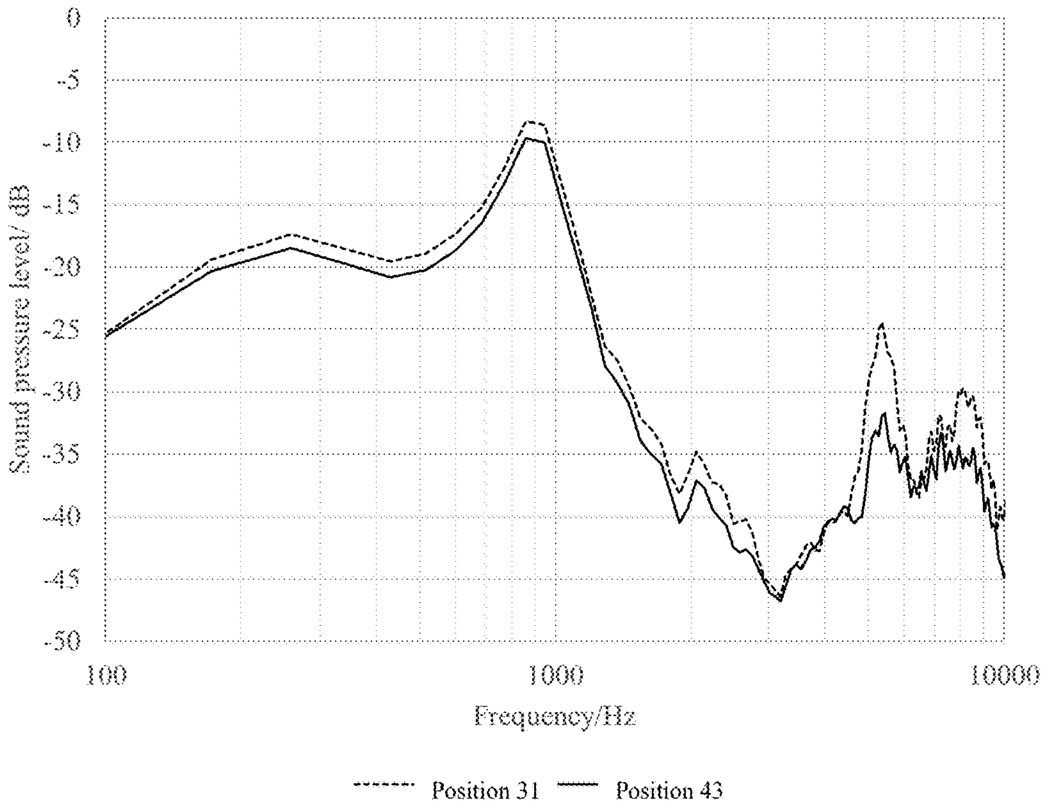
FIG. 19 is a schematic diagram illustrating sound receiving curves of sound receiving holes located at different positions according to some other embodiments of the present disclosure.

FIG. 19 is a schematic diagram illustrating sound receiving curves of sound receiving holes located at different positions according to some other embodiments of the present disclosure. FIG. 19 shows the sound reception situations of the microphone at the position 31, and the position 43. The sound reception effect of the microphone at the position 31 is better than the sound reception effect of the microphone at the position 43 in the whole frequency band. In some embodiments, the first sound receiving hole 1191 may be disposed at the position 31, and the second sound receiving hole 1192 may be disposed at the position 43. In this way, both the first sound receiving hole 1191 and the second sound receiving hole 1192 may have good sound reception effects. Signals of the first microphone and the second microphone may be processed to obtain the sound from the user's mouth in a wider frequency band.

In some embodiments, the projection of the sound generation component 11 on the sagittal plane may be runway-shaped. Extension lines of two side edges of the runway-shaped projection close to the mouth (i.e., the projections of the lower side LS and the front side of the sound generation component 11) may have an intersection, which is defined as a fourth projection point (e.g., the intersection G of the X and Y axes shown in FIG. 12, an origin of the X-Y coordinate system shown in FIG. 13). To make the first sound receiving hole 1191 as close as possible to the user's mouth, the distance between the first projection point P of the first sound receiving hole 1191 on the sagittal plane and the fourth projection point G needs to satisfy a preset condition. The greater the distance, the larger the distance from the first projection point P to the intersection point G shown in FIG. 12 or the origin of the X-Y coordinate system shown in FIG. 13, and correspondingly, the farther the distance between the first sound receiving hole 1191 and the user's mouth, and the worse the sound reception effect of the first microphone. Based on this, in some embodiments, to ensure the sound reception effect of the first microphone, the distance between the first projection point P and the fourth projection point G may be not greater than 5 mm. To improve the sound reception effect of the first microphone, the first sound receiving hole 1191 may be provided at a position on the sound generation component 11 close to the user's mouth. In some embodiments, the distance between the first projection point P and the fourth projection point G may be not greater than 3 mm. In some embodiments, the distance between the first projection point P and the fourth projection point G may be not greater than 1 mm. The first sound receiving hole 1191 may be provided in a position closer to the user's mouth to further improve the sound reception effect of the first microphone. It may be noted that the projection of the sound generation component 11 on the sagittal plane is not limited to the above-described runway shape, but may also be of other regular (e.g., rectangular, elliptical, circular, etc.) or irregular shapes, as long as the shape satisfies that the first sound receiving hole 1191 is set close to the user's mouth or close to the origin of the X-Y coordinate system.

Figure 20A:
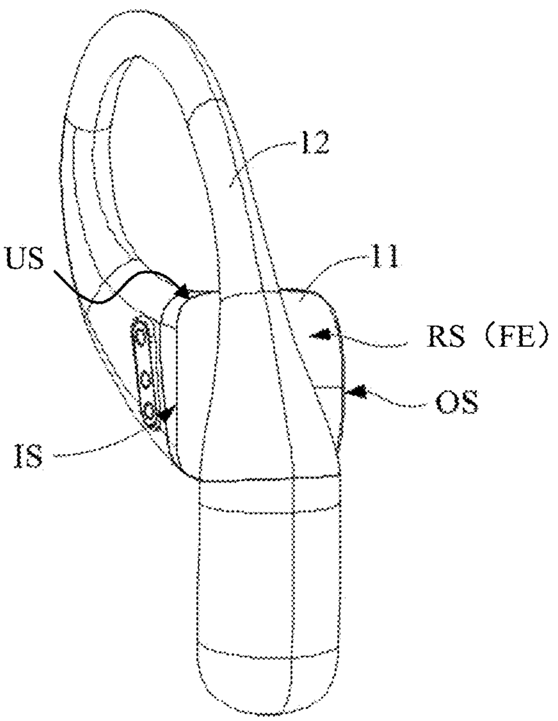
FIGS. 20A and 20B are schematic diagrams illustrating an exemplary structure of an earphone according to some other embodiments of the present disclosure.
Figure 20B:
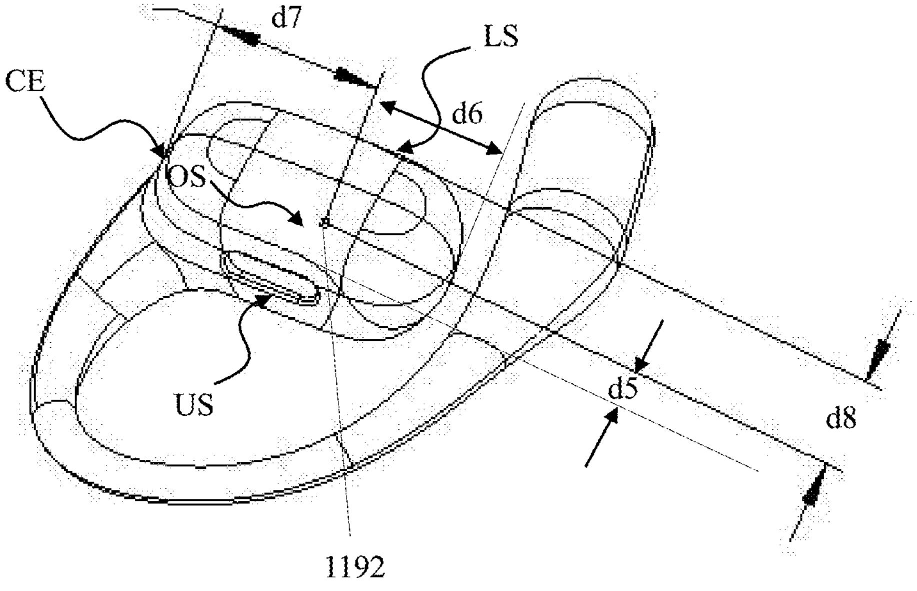
Figure 21A:
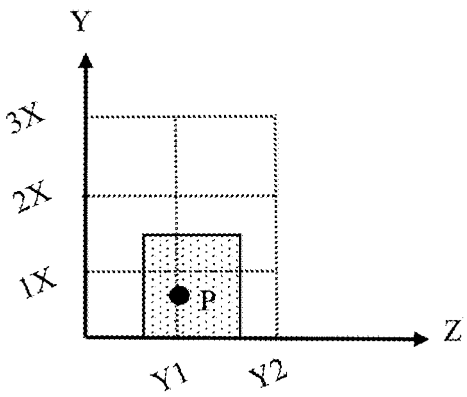
FIGS. 21A and 21B are schematic diagrams illustrating an exemplary coordinate system established based on a sound generation component according to some other embodiments of the present disclosure.
Figure 21B:
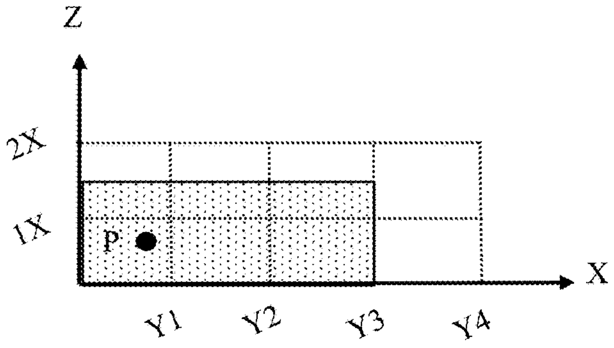

FIGS. 20A and 20B are schematic diagrams illustrating an exemplary structure of an earphone according to some embodiments of the present disclosure, and FIGS. 21A and 21B are schematic diagrams illustrating an exemplary coordinate system established based on a sound generation component according to some embodiments of the present disclosure.

Referring to FIGS. 20A and 20B, in some embodiments, the first sound receiving hole 1191 may also be disposed on the lower side LS or the front side (the connecting end CE) of the sound generation component 11. Specifically, as shown in FIG. 21A, when the first sound receiving hole 1191 is located on the front side (connection end CE) of the sound generation component 11, the first sound receiving hole 1191 may have a coordinate of 0 in the long-axis direction X of the sound generation component 11. A positional relationship of the first sound receiving hole 1191 with respect to the sound generation component 11 may be represented by a Y-Z coordinate system. The Z-axis may be the thickness direction of the sound generation component 11, which is perpendicular to both the long axis direction X and the short axis direction Y of the sound generation component 11. Similarly, as shown in FIG. 21B, when the first sound receiving hole 1191 is located at the lower side LS of the sound generation component 11, the coordinate of the first sound receiving hole 1191 in the short axis direction Y of the sound generation component 11 may be 0, and the positional relationship of the first sound receiving hole 1191 with respect to the sound generation component 11 may be represented by the X-Z coordinate system. A greater Z value represents that the first sound receiving hole 1191 is farther away from the inner side IS of the sound generation component 11; a greater X value represents that the first sound receiving hole 1191 is farther away from the front side (the connection end CE) of the sound generation component 11; a greater Y value represents that the first sound receiving hole 1191 is farther away from the lower side LS of the sound generation component 11.

When the first sound receiving hole 1191 is too close (e.g., less than 2 mm) to the inner side IS of the sound generation component 11, not only the first sound receiving hole 1191 may be blocked by the user's ear during wearing, but also the first microphone may collect a noise generated by friction between the user's ear and the sound generation component 11. Accordingly, no matter the first sound receiving hole 1191 is located on the lower side LS or the front side (the connection end CE) of the sound generation component 11, the distance between the first sound receiving hole 1191 and the inner side IS of the sound generation component 11 may not be too less. In addition, the two ears and the mouth of the human body may be regarded as three points in space, and the three points may construct an approximate isosceles triangle region. In the wearing state of the earphone 10, the sound generation component 11 needs to be provided obliquely to extend into the inner concave concha cavity, i.e., a line connecting any two points on the outer side OS of the sound generation component 11 may not point to the triangle region. If the first sound receiving hole 1191 is too close to the outer side OS of the sound generation component 11 (e.g., the distance from the outer side OS is less than 2 mm), even if the second sound receiving hole 1192 is provided on the outer side OS of the sound generation component 11, it may not be ensured that the line connecting the first sound receiving hole 1191 and second sound receiving hole 1192 points to the user's mouth. Based on this, in some embodiments, when the first sound receiving hole 1191 is disposed on the lower side LS or the front side (the connecting end CE) of the sound generation component 11, to ensure the sound reception effect of the first sound receiving hole 1191 and that the line connecting the first sound receiving hole 1191 and the second sound receiving hole 1192 points to the front region of the user, a ratio of a distance between the first sound receiving hole 1191 and the inner side IS of the sound generation component 11 in the thickness direction Z to the size of the sound generation component 11 in the thickness direction Z may be in a range of 0.25-0.7. In some embodiments, the ratio of the distance between the first sound receiving hole 1191 and the inner side IS of the sound generation component 11 in the thickness direction Z to the size of the sound generation component 11 in the thickness direction Z may be in a range of 0.25-0.65. By providing the first sound receiving hole 1191 relatively far away from the inner side IS of the sound generation component 11, the effect of the noise generated by the friction between the sound generation component 11 and the ear may be reduced. By decreasing the distance of the first sound receiving hole 1191 relative to the outer side OS of the sound generation component 11, the line connecting the first sound receiving hole 1191 and the second sound receiving hole 1192 may point to the user's mouth. In some embodiments, to make the line connecting the first sound receiving hole 1191 and the second sound receiving hole 1192 point to the user's mouth, the ratio of the distance between the first sound receiving hole 1191 and the inner side IS of the sound generation component 11 in the thickness direction Z to the size of the sound generation component 11 in the thickness direction Z may be in a range of 0.3-0.6. In some embodiments, the ratio of the distance between the first sound receiving hole 1191 and the inner side IS of the sound generation component 11 in the thickness direction Z to the size of the sound generation component 11 in the thickness direction Z may be in a range of 0.3-0.4. By further reducing the distance of the first sound receiving hole 1191 with respect to the outer side OS of the sound generation component 11, the line connecting the first sound receiving hole 1191 and the second sound receiving hole 1192 may point to the user's mouth more accurately. In some embodiments, the inner side IS of the sound generation component 11 may be curved. In such cases, the distance between the first sound receiving hole 1191 and the inner side IS of the sound generation component 11 in the thickness direction Z of the sound generation component may be equated to a distance between a center of the first sound receiving hole 1191 and a tangent plane of the inner side IS of the sound generation component 11. The tangent plane of the inner side IS of the sound generation component 11 may be a plane parallel to the long axis direction X and the short axis direction Y, and tangent to the inner side IS.

In some embodiments, the first sound receiving hole 1191 may be disposed on the ear hook 12 (e.g., a position on the ear hook 12 closest to the user's mouth), and accordingly, to ensure a directivity of the line connecting the second sound receiving hole 1192 and the first sound receiving hole 1191, when the first sound receiving hole 1191 is provided on the ear hook 12, the second sound receiving hole 1192 may be provided near a connection between the upper side US and the front side (the connection end CE) of the sound generation component 11. In some embodiments, by changing the structure or shape of the ear hook 12 of the earphone 10, a position requirement of the second sound receiving hole 1192 may also be realized to ensure that the line connecting the first sound receiving hole 1191 and the second sound receiving hole 1192 approximately points to the user's mouth and the distance between the first sound receiving hole 1191 and the second sound receiving hole 1192 satisfies the preset requirement.

In some embodiments, the second sound receiving hole 1192 may be disposed on a side of the sound generation component 11 that does not form an auxiliary cavity with the concha cavity. In some embodiments, the second sound receiving hole 1192 may be disposed on at least one of the upper side US, the lower side LS, and the outer side OS of the sound generation component 11, and both the first sound receiving hole 1191 and the second sound receiving hole 1192 may avoid components (e.g., speakers, main control circuit boards, etc.) within the housing 111 of the sound generation component 11. For example, the second sound receiving hole 1192 may be disposed on any one of the upper side US, the lower side LS, and the outer side OS of the sound generation component 11. As another example, the second sound receiving hole 1192 may be disposed on a connection between any two sides of the upper side US, the lower side LS, and the outer side OS of the sound generation component 11. In some embodiments, to make the first sound receiving hole 1191 have a relatively great distance from the second sound receiving hole 1192 while considering the directionality of the line connecting the first sound receiving hole 1191 and the second sound receiving hole 1192, the first sound receiving hole 1191 and the second sound receiving hole 1192 may be provided diagonally, for example, the first sound receiving hole 1191 may be provided in a lower left corner as shown in FIG. 11, and the second sound receiving hole 1192 may be provided in the upper right corner as shown in FIG. 11. To more clearly illustrate the distribution position of the second sound receiving hole 1192, the upper side US, the lower side LS, and the rear side RS of the sound generation component 11 are described herein for reference.

In some embodiments, the second sound receiving hole 1192 may be disposed on the outer side OS of the sound generation component 11. In some embodiments, to avoid a quality of the sound reception being affected due to a too small distance between the second sound receiving hole 1192 and the user's antihelix, a distance d6 between the second sound receiving hole 1192 and the rear side RS may be in a range of 8 mm-12 mm. In some embodiments, to further ensure a suitable distance between the second sound receiving hole 1192 and the user's antihelix so that the quality of the sound reception is not affected, the distance d6 between the second sound receiving hole 1192 and the rear side RS may be in a range of 9 mm-10 mm.

To prevent the line connecting the first sound receiving hole 1191 and the second sound receiving hole 1192 from not pointing to the user's mouth, the distance between the second sound receiving hole 1192 and the upper side US or the lower side LS of the sound generation component 11 may not be too great or too small, and a ratio of the distance between the projection of the second sound receiving hole 1102 on the sagittal plane and the projection of the upper side US of the sound generation component 11 on the sagittal plane to the distance between the projection of the sound outlet hole 112 on the sagittal plane and the projection of the upper side US of the sound generation component 11 on the sagittal plane may be in a range of 0.2-0.4. In some embodiments, to further improve the directivity of the first sound receiving hole 1191 and the second sound receiving hole 1192, the ratio of the distance between the projection of the second sound receiving hole 1192 on the sagittal plane and the projection of the upper side US of the sound generation component 11 on the sagittal plane to the distance between the projection of the sound outlet hole 112 on the sagittal plane and the projection of the upper side US of the sound generation component 11 on the sagittal plane may be in a range of 0.28-0.34. In some embodiments, a distance d5 between the projection of the second sound receiving hole 1192 on the sagittal plane to the projection of the upper side US of the sound generation component 11 on the sagittal plane may be in a range of 1 mm-3 mm, or a distance d8 between the projection of the second sound receiving hole 1192 on the sagittal plane and the projection of the lower side LS of the sound generation component 11 on the sagittal plane may be in a range of 4 mm-8 mm. In some embodiments, to make the line connecting the first sound receiving hole 1191 and the second sound receiving hole 1192 point to the user's mouth, the distance d5 between the projection of the second sound receiving hole 1192 on the sagittal plane and the projection of the upper side US on the sagittal plane may be in a range of 2 mm-2.5 mm, or the distance d8 between the projection of the second sound receiving hole 1192 on the sagittal plane and the projection of the lower side LS on the sagittal plane may be in a range of 6 mm-8 mm. For example, the distance d5 between the projection of the second sound receiving hole 1192 on the sagittal plane and the projection of the upper side US on the sagittal plane may be 3 mm, or the distance d8 between the projection of the second sound receiving hole 1192 on the sagittal plane and the projection of the lower side LS on the sagittal plane may be 8 mm. In some embodiments, different sizes of the sound generation component 11 in the short axis direction Y may correspond to different ranges of distances between the projection of the second sound receiving hole 1192 on the sagittal plane and the projection of the lower side LS/upper side US. For example, when the size of the sound generation component 11 in the short axis direction Y is 14.75 mm, the distance d5 between the projection of the second sound receiving hole 1192 on the sagittal plane and the projection of the upper side US on the sagittal plane may be 3 mm, or the distance d8 between the projection of the second sound receiving hole 1192 on the sagittal plane and the projection of the lower side LS on the sagittal plane may be 11.75 mm.

To prevent the distance between the second sound receiving hole 1192 and the first sound receiving hole 1191 from being too small, in some embodiments, a distance d7 between the second sound receiving hole 1192 and the front side (the connecting end CE) may be in a range of 8 mm-12 mm. It may be noted that, in the present disclosure, the distances from the second sound receiving hole 1192 to the upper side US, the front side (the connection end CE), the rear side RS, and the lower side LS of the sound generation component 11 may refer to the distances from a center of an opening of the second sound receiving hole 1192 on the outer surface of the housing 111 of the sound generation component to the upper side US, the front side (connection end CE), or the rear side RS of the sound generation component 11. When the side of the sound generation component 11 (e.g., the upper side US, the front side, the rear side RS, and the lower side LS) is a plane, the distance may refer to a distance from the center of the opening of the second sound receiving hole 1192 on the outer surface of the housing 111 of the sound generation component to the plane. When the side of the sound generation component 11 is a curved plane, the distance may refer to a distance from the center of the opening of the second sound receiving hole 1192 on the outer surface of the housing 111 of the sound generation component 11 to a tangent plane of the curved plane. In the present disclosure, the tangent plane corresponding to the upper side US of the sound generation component 11 may refer to a plane that is parallel to the X-Z plane (or the coordinate system) and tangent to the upper side US of the sound generation component 11 as shown in FIG. 21B. Similarly, the tangent plane corresponding to the lower side LS of the sound generation component 11 may refer to a plane parallel to the X-Z plane (or the coordinate system) and tangent to the lower side LS of the sound generation component 11 as shown in FIG. 21B, the tangent plane corresponding to the front side (the connection end CE) of the sound generation component 11 may refer to a plane parallel to the Y-Z plane (or the coordinate system) and tangent to the front side (the connection end CE) of the sound generation component 11 as shown in FIG. 21A, the tangent side corresponding to the rear side RS (the connection end CE) of the sound generation component 11 may refer to a plane parallel to the X-Z plane (or the coordinate system) and tangent to the rear side RS of the sound generation component 11 as shown in FIG. 21A.

Figure 22:
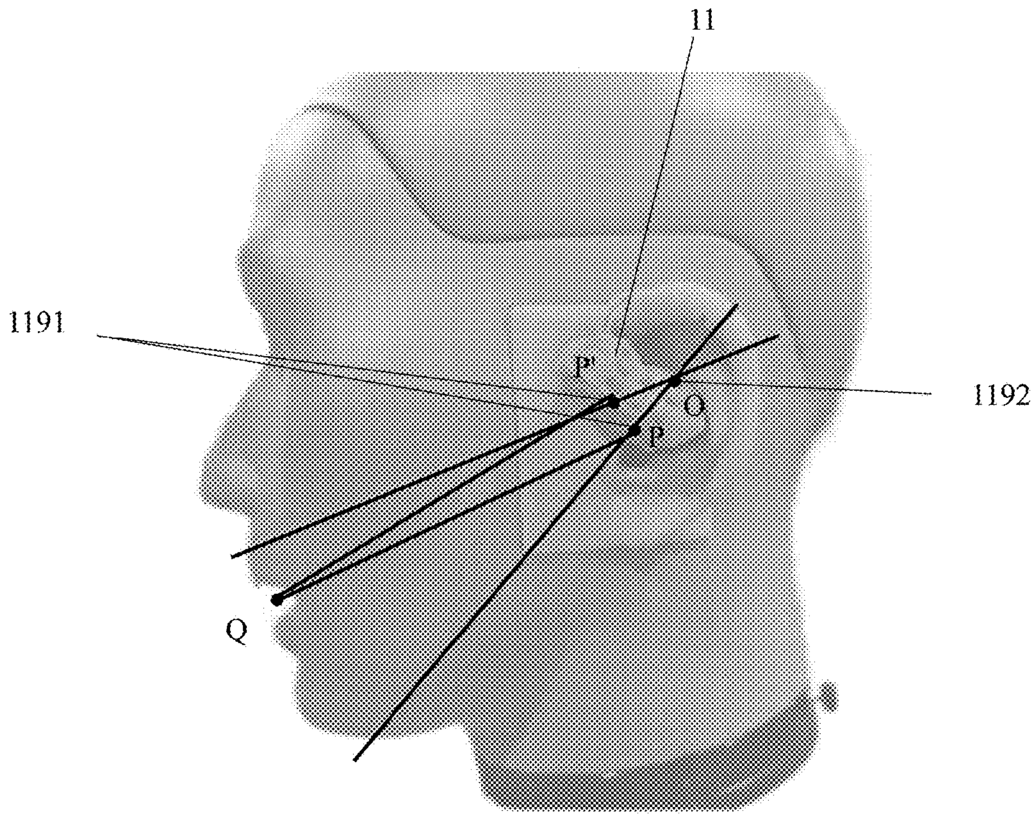
FIG. 22 is a schematic diagram illustrating an exemplary position relationship of a first sound receiving hole, a second sound receiving hole, and a mouth of a user according to some embodiments of the present disclosure.

FIG. 22 is a schematic diagram illustrating an exemplary position relationship of the first sound receiving hole, the second sound receiving hole, and the mouth of a user according to some embodiments of the present disclosure. As shown in FIG. 22, in some embodiments, a line connecting the first sound receiving hole 1191 and the second sound receiving hole 1192 may be directed to a user's mouth so that the first sound receiving hole 1191 and the second sound receiving hole 1192 may have a good sound reception effect. As shown in FIG. 22, point O represents a position of the second sound receiving hole 1192, points P and P' represent two different positions where the first sound receiving hole 1191 is disposed, and point Q represents the position of the user's mouth. In some embodiments, the angle between the line connecting the first sound receiving hole 1191 and the second sound receiving hole 1192, and the line connecting the first sound receiving hole 1191 and the user's mouth Q, may be about 150°, i.e., the angle ∠OPQ and/or ∠OP'Q may be about 150°. Merely by way of example, in some embodiments, the φOPQ or the ∠OP'Q may be between 140° and 180°, i.e., the first sound receiving hole 1191, the second sound receiving hole 1192, and the user's mouth may be located on approximately the same straight line.

According to FIG. 11, in the wearing state, the distance between the first sound receiving hole 1191 and the user's mouth (point Q in FIG. 11) may be less than the distance between the second sound receiving hole 1192 and the user's mouth, thereby facilitating the subsequent signal processing. As shown in FIG. 11, when the earphone 10 is in the wearing state, the first sound receiving hole 1191 may have a first projection point P on the sagittal plane (e.g., the T-S plane shown in FIG. 11), the second sound receiving hole 1192 may have a second projection point O on the sagittal plane, and the user's mouth may have a third projection point Q on the sagittal plane, which is used to represent a projection of the user's mouth (e.g., a lip bead). The distance PQ may be smaller than the distance OQ.

In some embodiments, the line connecting the first projection point P of the first sound receiving hole 1191 on the sagittal plane and the second projection point O of the second sound receiving hole 1192 on the sagittal plane may approximately point to the third projection point Q of the user's mouth on the sagittal plane. In such cases, a directivity algorithm may be constructed based on the sounds received by the first microphone and the second microphone such that a clearer voice of the user may be received. In some embodiments, the line PQ connecting the first projection point P and the third projection point Q may form a certain angle with the line OQ connecting the second projection point O and the third projection point Q. In some embodiments, the angle between the PQ and the OQ may be 5°-25° to further ensure the directivity of the first sound receiving hole 1191 and the second sound receiving hole 1192. In some embodiments, to ensure the directivity of the first sound receiving hole 1191 and the second sound receiving hole 1192, the angle between the PQ and the OQ may be 8°-15°. Merely by way of example, in some embodiments, the angle between PQ and OQ may be 0°, 30, 9° or 15°, etc.

Figure 23:
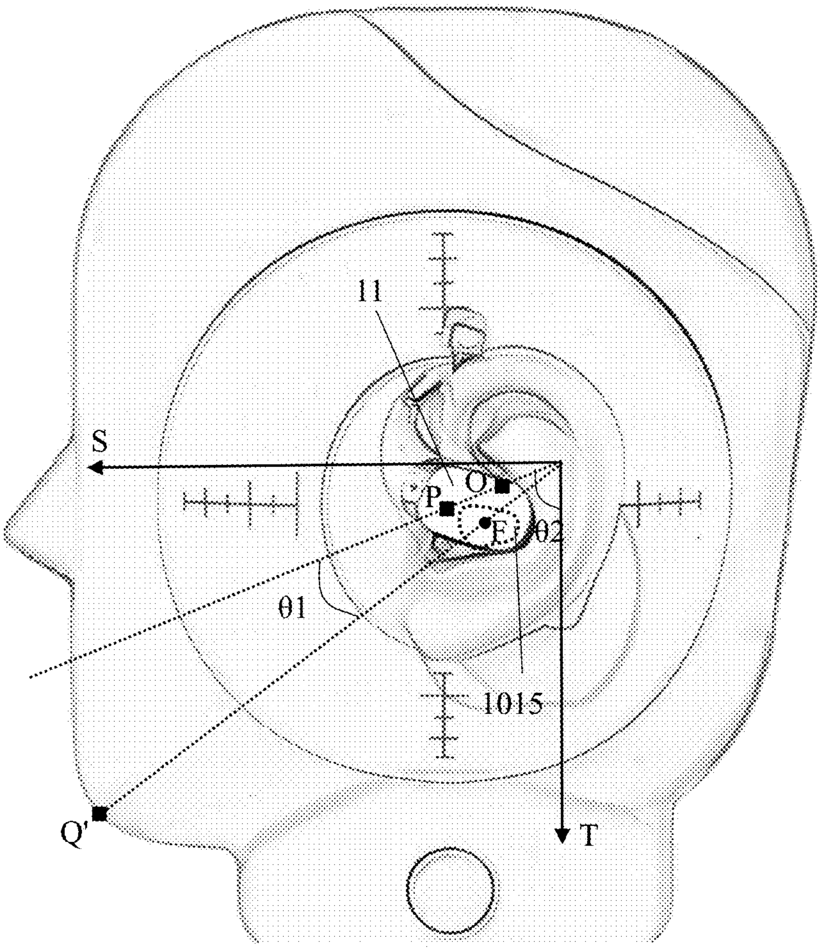
FIG. 23 is a schematic diagram illustrating an exemplary wearing state of an earphone according to some other embodiments of the present disclosure.

FIG. 23 is a schematic diagram illustrating an exemplary wearing state of an earphone according to some other embodiments of the present disclosure.

When the line connecting the first sound receiving hole 1191 and the second sound receiving hole 1192 points to the user's face (e.g., a middle region between the sagittal axis S and the vertical axis T in FIG. 23), the first microphone and the second microphone may have relatively good sound reception effects. The first microphone and the second microphone have a relatively better reception effect when the line connecting the first sound receiving hole 1191 and the second sound receiving hole 1192 points to the region between the user's mouth and an endpoint of a bottom of a lower jaw. Based on this, in some embodiments, to improve the sound reception effect of the earphone 10, the line connecting the first sound receiving hole 1191 and the second sound receiving hole 1192 may point to or approximately point to the region between the user's mouth and the endpoint of the bottom of the lower jaw. In some embodiments, the endpoint of the bottom of the lower jaw of the user refers to the point of the lower jaw of the user farthest from the user's ear.

Referring to FIG. 23, when the earphone 10 is in the wearing state, the endpoint of the bottom of the user's lower jaw may have a fifth projection point Q' on the sagittal plane, and the centroid of the projection of the opening of the ear canal of the user on the sagittal plane (e.g., the dotted region 1015 in FIG. 23) may be a point F. As at least a portion of the sound generation component 11 of the earphone 10 extends into the user's concha cavity in the wearing state, the line connecting the fifth projection point Q' and the centroid F of the projection of the opening of the ear canal of the user on the sagittal plane may reflect a relative positional relationship between the sound generation component 11 and the endpoint of the bottom of the lower jaw of the user.

Referring to FIG. 23, the first sound receiving hole 1191 may have the first projection point P on the sagittal plane, and the second sound receiving hole 1192 may have the second projection point O on the sagittal plane. In some embodiments, to make the first sound receiving hole 1191 and the second sound receiving hole 1192 have a relatively good directionality, i.e., the line connecting the first sound receiving hole 1191 and the second sound receiving hole 1192 points to the region between the user's mouth and the endpoint of the bottom of the lower jaw, an angle θ1 between the line connecting the first projection point P and the second projection point O and the line connecting the fifth projection point Q and the centroid point F of the projection of the opening of the ear canal of the user on the sagittal plane may not be greater than 45°. In some embodiments, the angle θ1 may be 6°-35°. In such cases, the line connecting the first sound receiving hole 1191 and the second sound receiving hole 1192 may point to a region near the user's mouth. In some embodiments, the angle θ1 may be 10°-25°. In such cases, the line connecting the first sound receiving hole 1191 and the second sound receiving hole 1192 may point to the region near the user's mouth more accurately.

When the line connecting the first projection point P of the first sound receiving hole 1191 on the sagittal plane and the second projection point O of the second sound receiving hole 1192 on the sagittal plane points to the region between the user's mouth and the endpoint of the bottom of the lower jaw, the first microphone and the second microphone may have relatively good sound reception effects. The distribution positions of the first projection point P and the second projection point O are further illustrated herein with the vertical axis T of the user for reference. Continuing to refer to FIG. 23, to make the line connecting the first projection point P and the second projection point O point to the region between the user's mouth and the endpoint of the bottom of the lower jaw, so as to obtain the voice of the user when he or she speaks more effectively, the line connecting the first projection point P and the second projection point O may have a corresponding critical direction, e.g., a sagittal axis S and a vertical axis T shown in FIG. 23. The reception effects of the first microphone and the second microphone when collecting the user's speech may be ensured when the line connecting the first projection point P and the second projection point O is in a coordinate system S-T. The critical direction is explained here in combination with the wearing state of the earphone 10. As shown in FIG. 23, the mouth may be located at the lower left of the ear. If the line connecting the first projection point P and the second projection point O points to the upper left, the upper, the lower right, the upper right, or the right of the ear, the sound signals obtained by the first microphone and the second microphone when the user is speaking may be extremely weak. In such cases, the line connecting the first projection point P and the second projection point O pointing to the left side of the ear may be a critical direction, and the line connecting the first projection point P and the second projection point O pointing to the lower of the ear may be another critical direction. Based on the above descriptions, it may be understood that the critical direction mentioned in the embodiment of the present disclosure may be used to represent a critical value of the directivity of the line connecting the first projection point P and the second projection point O (or the line connecting the first sound receiving hole 1191 and the second sound receiving hole 1192). For example, as shown in FIG. 23, when the line connecting the first projection point P and the second projection point O points between the two critical directions, the first microphone and the second microphone may have a relatively good directivity. The sagittal axis S and the vertical axis T of the user may be used to represent the above two critical directions. Based on this, in some embodiments, an angle θ2 between the line connecting the first projection point P and the second point O and the user's vertical axis T may be less than 90°. To make the line connecting the first projection point P and the second projection point O point to a region near the mouth or the endpoint of the bottom of the lower jaw of the user, so as to improve the reception effects of the first microphone and the second microphone when collecting the user's speech, in some embodiments, the angle θ2 may be in the range of 20°-80°. In some embodiments, the angle θ2 may be in a range of 40°-70°. In such cases, the line connecting the first projection point P and the second projection point O may point to the region of the user's mouth or the endpoint of the bottom of the lower jaw. In some embodiments, the angle θ2 may be in a range of 42°-65°. In such cases, the line connecting the first projection point P and the second projection point O may point to the mouth region of the user more accurately.

Figure 24:
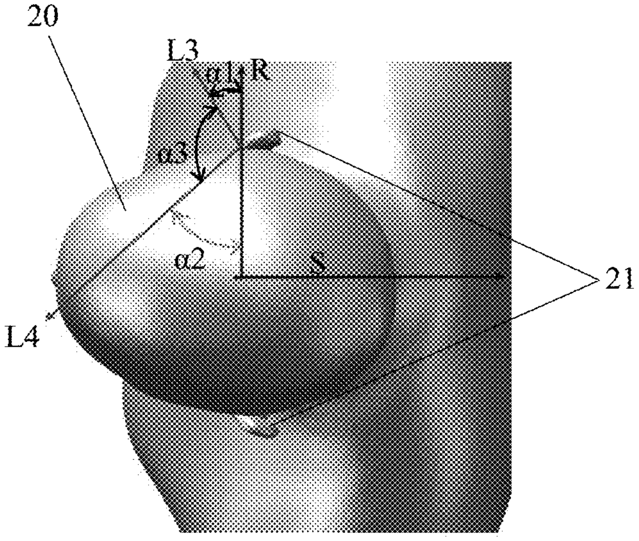
FIG. 24 is a schematic diagram illustrating an exemplary wearing state of an earphone according to some other embodiments of the present disclosure.

FIG. 24 is a schematic diagram illustrating an exemplary wearing state of an earphone according to some embodiments of the present disclosure.

To further illustrate the distribution positions of the first sound receiving hole 1191 and the second sound receiving hole 1192 in the earphone, illustrations are given herein in combination with a coronal axis R of the user. When an angle between the line connecting the first sound receiving hole 1191 and the second sound receiving hole 1192 and the coronal axis R is too small, the line connecting the first sound receiving hole 1191 and the second sound receiving hole 1192 may be approximately considered to point to the left or right side of the head, resulting in a poor sound effect when the microphone obtains the user's speech. When the angle between the line connecting the first sound receiving hole 1191 and the second sound receiving hole 1192 and the coronal axis R is too great, the line connecting the first sound receiving hole 1191 and the second sound receiving hole 1192 may point to the user's head, which also results in the poor sound effect when the microphone obtains the user's speech. To ensure that the line connecting the first sound receiving hole 1191 and the second sound receiving hole 1192 points to the front of the human face, the angle between the line connecting the first sound receiving hole 1191 and the second sound receiving hole 1192 and the coronal axis (e.g., the R-axis in FIG. 23, which is perpendicular to the sagittal plane, i.e., the S-T plane) may be in a range of −30°-−135°, so as to ensure that the line connecting the first sound receiving hole 1191 and the second sound receiving hole 1192 points to the front side of the human face. More description regarding the angle between the line connecting the first sound receiving hole 1191 and the second sound receiving hole 1192 and the coronal axis may be found in FIG. 24 and the related descriptions.

Referring to FIG. 24, FIG. 24 illustrates a relative relationship between the user's head and the corresponding coronal and sagittal axes. The reference sign 20 in FIG. 24 represents the user's head and the reference sign 21 represents the user's ear. As shown in FIG. 24, in some embodiments of the present disclosure, the direction of the coronal axis shown in FIG. 24 may be used as a reference, and rays L3 and L4 may represent critical directions of the line connecting the first sound receiving hole 1191 and the second sound receiving hole 1192. That is, the line connecting the first sound receiving hole 1191 and the second sound receiving hole 1192 may be between the rays L3 and L4 such that the line connecting the first sound receiving hole 1191 and the second sound receiving hole 1192 points to the front side of the user's face. In some embodiments, an angle α1 between the ray L3 and a positive direction of the coronal axis R may be about 30°, and an angle α2 between the ray L4 and a negative direction of the coronal axis R may be about 45°. Based on this, a range of the angle α3 may be the range of the angle between the line connecting the first sound receiving hole 1191 and the second sound receiving hole 1192 and the positive direction of the user's coronal axis R. In some embodiments, the angle α3 may be in a range of −30°-−135°. A negative value of the angle α3 represents that the line connecting the first sound receiving hole 1191 and the second sound receiving hole 1192 is biased in a negative direction of the sagittal axis S relative to the coronal axis R. In some embodiments, the angle between the line connecting the first sound receiving hole 1191 and the second sound receiving hole 1192 and the positive direction of the coronal axis R may be between −50° and −125° such that the line connecting the first sound receiving hole 1191 and the second sound receiving hole 1192 points to a region near the user's mouth. In some embodiments, the angle between the line connecting the first sound receiving hole 1191 and the second sound receiving hole 1192 and the positive direction of the user's coronal axis R may be between −90° and −115° such that the line connecting the first sound receiving hole 1191 and the second sound receiving hole 1192 points to the region of the user's mouth. When the angle between the line connecting the first sound receiving hole 1191 and the second sound receiving hole 1192 and the user's coronal axis is −90°, the line connecting the first sound receiving hole 1191 and the second sound receiving hole 1192 may be parallel to the sagittal plane. It may be noted that the angle herein is determined with a clockwise direction as the positive direction.

Figure 25:
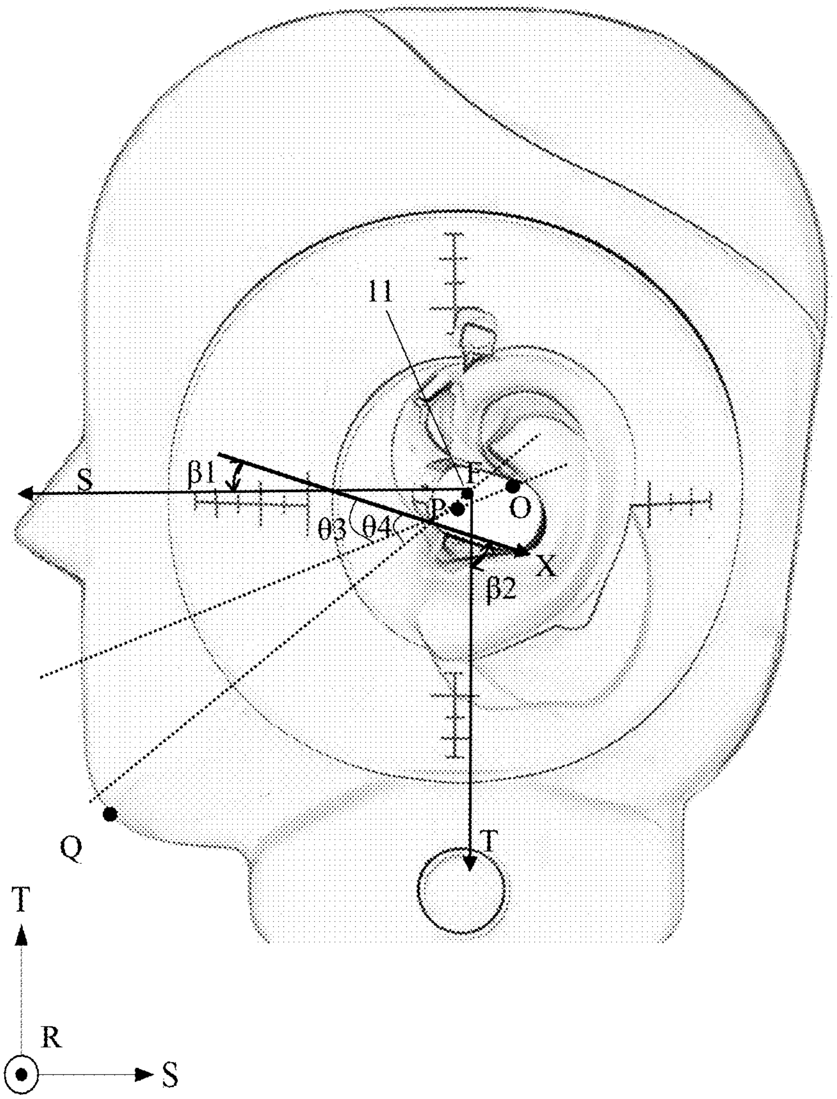
FIG. 25 is a schematic diagram illustrating an exemplary wearing state of an earphone according to some other embodiments of the present disclosure.

FIG. 25 is a schematic diagram illustrating an exemplary wearing state of an earphone according to some embodiments of the present disclosure.

Referring to FIG. 25, the first sound receiving hole 1191 may have the first projection point P on the sagittal plane, the second sound receiving hole 1192 may have the second projection point O on the sagittal plane, and an angle between a line connecting the first projection point P and the second projection point O and a long axis direction X of a projection of the sound generation component 11 on the sagittal plane may be represented as 03. It may be appreciated that a position of the sound generation component 11 with respect to an ear may be regarded as unchanged when the earphone 10 is in the wearing state. At this time, an angle θ4 between a line connecting the fifth projection point Q' of the endpoint of the bottom of the lower jaw on the sagittal plane and the centroid point F of the projection of the opening of the ear canal of the user on the sagittal plane and the long axis direction X of the projection of the sound generation component 11 on the sagittal plane may be approximated to be unchanged, and the closer the angle θ3 is to θ4, the better a directivity of the line connecting the first sound receiving hole 1191 and the second sound receiving hole 1192. Based on this, in some embodiments, sound reception effects of the first sound receiving hole 1191 and the second sound receiving hole 1192 may be adjusted by controlling the angle between the line connecting the first projection point P and the second projection point O and the long axis direction of the projection of the sound generation component 11 on the sagittal plane.

As shown in FIG. 25, the sagittal axis S and the vertical axis T may represent the critical directions of the line connecting the first projection point P and the second projection point O with respect to the long axis direction X of the projection of the sound generation component 11 on the sagittal plane, that is, when the line connecting the first projection point P and the second projection point O is in the coordinate system S-T, the reception effects when the first microphone and the second microphone collects the speech of the user may be ensured. Specifically, in some embodiments of the present disclosure, when the earphone 10 is in the wearing state, an angle 31 between the long axis direction X and the sagittal axis S may be about 20°, and an angle 32 between the long axis direction X and the vertical axis T may be about 45°. The angle θ4 may be in a range of 50°-75°. Based on this, in some embodiments, if a negative direction of the long axis direction X shown in FIG. 25 is regarded as 0°, and a counterclockwise direction is regarded as a positive direction for representing the angle between the line connecting the first projection point P and the second projection point O with respect to the long axis direction X of the projection of the sound generation component 11 on the sagittal plane, the angle θ3 may be in a range of 45°-70°. In some embodiments, the angle θ3 may be in a range of 50°-60° such that the line connecting the projection point P and the second projection point O may be more accurately directed to the region between the user's mouth and the endpoint of the bottom of the lower jaw.

Figure 26A:
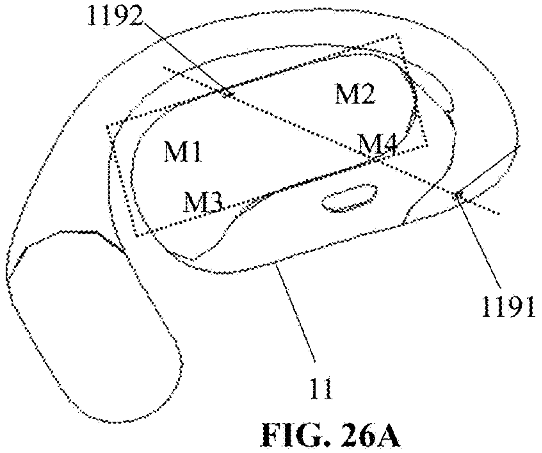
FIG. 26A is a schematic diagram illustrating an exemplary wearing state of an earphone according to some other embodiments of the present disclosure.
Figure 26B:
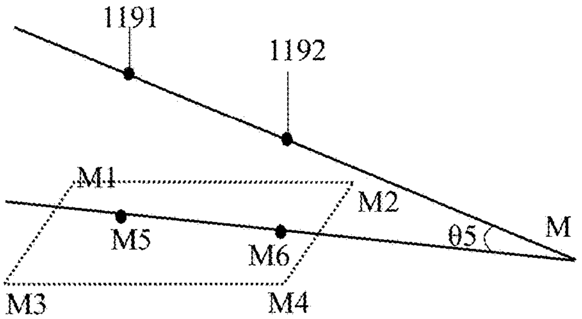
FIG. 26B is a schematic diagram illustrating an angle between a line connecting a first sound receiving hole and a second sound receiving hole and an outer side of a sound generation component according to some embodiments of the present disclosure.

FIG. 26A is a schematic diagram illustrating an exemplary wearing state of an earphone according to some embodiments of the present disclosure. FIG. 26B is a schematic diagram illustrating an angle between a line connecting a first sound receiving hole and a second sound receiving hole and an outer side of a sound generation component according to some embodiments of the present disclosure.

Referring to FIGS. 26A and 26B, in some embodiments, an angle between the line connecting the first sound receiving hole 1191 and the second sound receiving hole 1192 and the outer side OS of the sound generation component 11 may be represented as 05. In some embodiments, the outer side OS of the sound generation component 11 may be a plane. At this time, the angle between the line connecting the first sound receiving hole 1191 and the second sound receiving hole 1192 and the outer side OS may be an angle between the line connecting the first sound receiving hole 1191 and the second sound receiving hole 1192 and the plane. In some embodiments, the line connecting the first sound receiving hole 1191 and the second sound receiving hole 1192 may be a curved plane, and the angle between the line connecting the first sound receiving hole 1191 and the second sound receiving hole 1192 and the outer side OS may be an angle between the line connecting the first sound receiving hole 1191 and the second sound receiving hole 1192 and a plane tangent to the curved plane of the outer face OS. Taking the outer side OS being a plane as an example for illustration, in some embodiments, the outer side OS of the sound generation component 11 may be represented by four points M1, M2, M3, and M4 located on the outer side OS. In some embodiments, the first sound receiving hole 1191 and the second sound receiving hole 1192 may be located on the same side or on different sides of the sound generation component 11. For example, in some embodiments, the first sound receiving hole 1191 and the second sound receiving hole 1192 may both be located on the outer side OS of the sound generation component 11. For example, in some embodiments, the first sound receiving hole 1191 may be located on the front side (the connection end CE) of the sound generation component 11, and the second sound receiving hole 1192 may be located on the outer side OS of the sound generation component 11. As another example, in some embodiments, the first sound receiving hole 1191 may be located on the lower side LS of the sound generation component 11 and the second sound receiving hole 1192 may be located on the outer side OS of the sound generation component 11.

As shown in FIG. 26B, the first sound receiving hole 1191 may have a projection point M5 on the outer side OS (i.e., the plane M1M2M3M4), and the second sound receiving hole 1192 may have a projection point M6 on the outer side M1M2M3M4. The angle θ5 may refer to the angle between the line connecting the projection point M5 and the projection point M6 and the line connecting the first sound receiving hole 1191 and the second sound receiving hole 1192.

It may be understood that the angle θ5 reflects a relative position relationship between the first sound receiving hole 1191 and the second sound receiving hole 1192 in a thickness direction of the sound generation component 11, and further reflects a directivity of the line connecting the first sound receiving hole 1191 and the second sound receiving hole 1192 relative to a user's mouth. In some embodiments, to make the line connecting the first sound receiving hole 1191 and the second sound receiving hole 1192 have a relatively good directionality, thus ensuring that the first sound receiving hole 1191 and the second sound receiving hole 1192 have better sound reception effects, the angle θ5 may be controlled in a range of 10°-50°. In such cases, the line connecting the first sound receiving hole 1191 and the second sound receiving hole 1192 may be approximately directed to a region in front of the user's face such that the first microphone and the second microphone may have relatively good sound reception effects. In some embodiments, the angle θ5 may be in a range of 25°-38° such that the line connecting the first sound receiving hole 1191 and the second sound receiving hole 1192 may point to the user's mouth, thereby further improving the sound reception effects of the first microphone and the second microphone.

Figure 27:
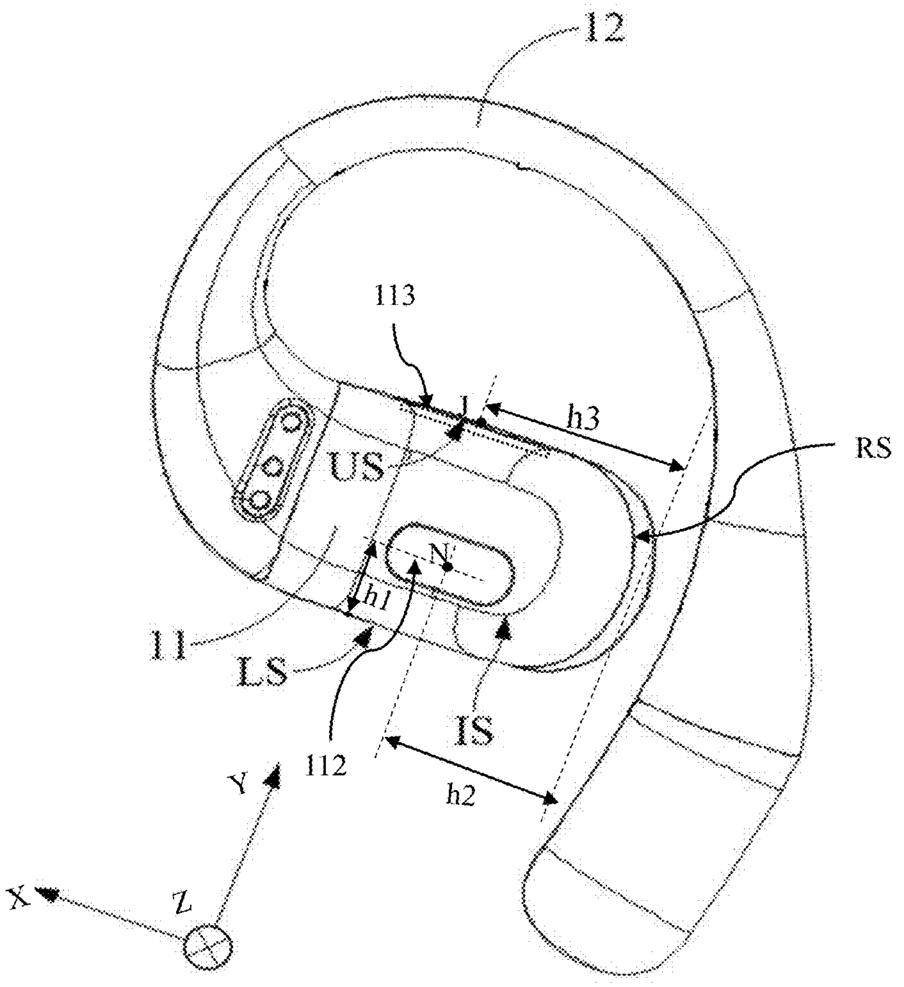
FIG. 27 is a schematic diagram illustrating a structure of the earphone illustrated in FIG. 9 facing the ear.

FIG. 27 is a schematic diagram illustrating a structure of the earphone shown in FIG. 9 facing the ear.

In some embodiments, according to FIGS. 9 and 27, to enable the projection of the sound outlet hole 112 on the sagittal plane to be partially or wholly located in the region of the concha cavity when the earphone 10 is in the wearing state, and to enhance a sound intensity at the ear canal (i.e., a listening position), the sound outlet hole 112 may be provided as close as possible to the ear canal. In some embodiments, a distance h1 between a center N of the sound outlet hole 112 and the lower side LS of the sound generation component 11 along the short axis direction Y may be in a range of 4.05 mm-6.05 mm. In some embodiments, to make the sound outlet hole 112 closer to an opening of the ear canal of the user to enhance the intensity of a sound output, the distance h1 may be in a range of 4.50 mm-5.85 mm. In some embodiments, to make the sound emitting hole 112 further closer to the opening of the ear canal, and prevent the sound outlet hole 112 from being blocked by the ear due to being too close to the lower side LS, the distance h1 may be in the range of 4.80 mm-5.50 mm. In some embodiments, the distance h1 may be in a range of 5.20 mm-5.45 mm.

In some embodiments, to make at least a portion of the sound generation component 11 extend into the concha cavity, a size of the long axis direction X of the sound generation component 11 may not be too great. To ensure that at least a portion of the sound generation component 11 extends into the concha cavity, a distance between the center N of the sound outlet hole 112 and the rear side RS of the sound generation component 11 along the long axis direction X may not be too small, otherwise all or a portion of an area of the sound outlet hole may be blocked due to a contact between the free end FE and a side wall of the concha cavity, which may reduce an effective area of the sound outlet hole 112. Accordingly, in some embodiments, a ratio of a distance between the projection of the second sound receiving hole 1192 on the sagittal plane and the projection of the rear side RS of the sound generation component 11 on the sagittal plane to a distance between the projection of the sound outlet hole 112 on the sagittal plane and the projection of the rear side RS of the sound generation component 11 on the sagittal plane may be in a range of 0.3-0.7. In some embodiments, to keep the sound outlet hole 112 unblocked and to ensure that the sound outlet hole 112 has a sufficient effective area to enhance a sound output performance, the ratio of the distance between the projection of the second sound receiving hole 1192 on the sagittal plane and the projection of the rear side RS of the sound generation component 11 on the sagittal plane to the distance between the projection of the sound outlet hole 112 on the sagittal plane and the projection of the rear side RS of the sound generation component 11 on the sagittal plane may be in a range of 0.4-0.6. In some embodiments, to further ensure that the sound outlet hole 112 has a sufficient effective area to enhance the sound output performance, the ratio of the distance between the projection of the second sound receiving hole 1192 on the sagittal plane and the projection of the rear side RS of the sound generation component 11 on the sagittal plane to the distance between the projection of the sound outlet hole 112 on the sagittal plane and the projection of the rear side RS of the sound generation component 11 on the sagittal plane may be 0.51. In some embodiments, a distance h2 between the center N of the sound outlet hole 112 and the rear side of the sound generation component 11 along the long axis direction X may be in a range of 8.15 mm-12.25 mm. In some embodiments, to make the sound outlet hole 112 have a sufficiently effective area to enhance the performance of the sound output, the distance h2 may be in a range of 8.50 mm-12.00 mm. In some embodiments, to make the sound outlet hole 112 have a sufficiently effective area, and prevent the sound outlet hole 112 from being blocked by the ear due to being too close to the free end FE, the distance h2 may be in a range of 9.25 mm-11.15 mm. In some embodiments, the distance h2 may be in the range of 9.60 mm-10.80 mm.

Figure 28:
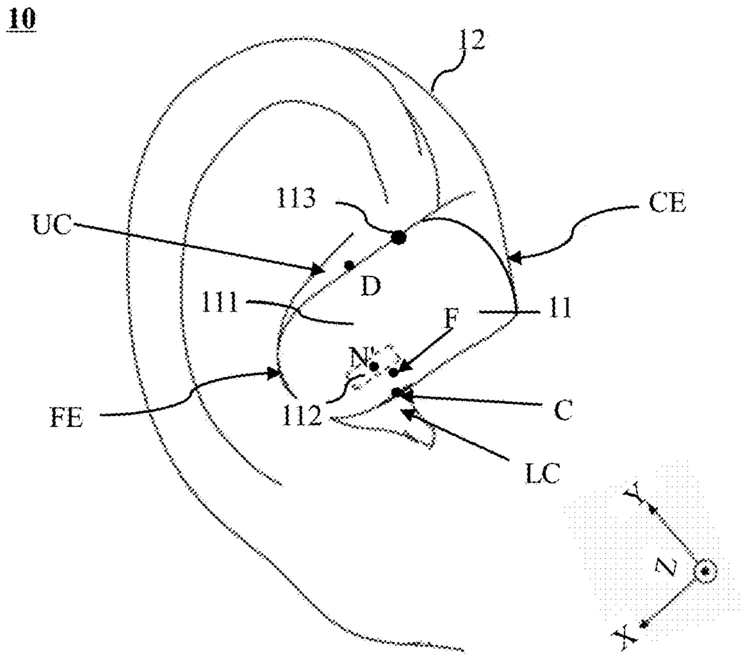
FIG. 28 is a schematic diagram illustrating a projection of an earphone on the sagittal plane when the earphone is in a wearing state according to some embodiments of the present disclosure.

FIG. 28 is a schematic diagram illustrating a projection of an earphone on a sagittal plane when the earphone is in a wearing state according to some embodiments of the present disclosure.

In some embodiments, according to FIGS. 9 and 28, to make the sound generation component 11 be worn stably on the user's ear, and to facilitate a construction of a cavity structure as shown in FIG. 5, and further to make the cavity structure have at least two leakage structures, the free end FE may abut against the concha cavity in the long axis direction X and the short axis direction Y. In such cases, the inner side IS of the sound generation component 11 may be inclined with respect to the sagittal plane, and at least a first leakage structure UC (i.e., a gap between the concha cavity and an upper boundary of the inner side IS) near a top of the head and a second leakage structure LC (i.e., a gap between the concha cavity and a lower boundary of the inner side IS) near the ear canal may be provided between the concha cavity and the inner side IS of the sound generation component 11. In such cases, a listening volume, especially at low and middle frequencies, may be enhanced, while still maintaining a cancellation effect on the far-field sound leakage, thereby enhancing an acoustic output performance of the earphone 10.

In some embodiments, when the earphone 10 is worn in the manner shown in FIG. 9, the first leakage structure UC and the second leakage structure LC formed between the inner side IS of the sound generation component 11 and the concha cavity may have certain sizes in the long axis direction X and the thickness direction Z. In some embodiments, to facilitate an understanding of positions of the first leakage structure UC and the second leakage structure LC, when the earphone 10 is in the wearing state, a mid-point between two intersections formed by the upper/lower boundaries of the inner side IS intersecting with the ear (e.g., the side wall of the concha cavity, the crus of helix) may be used as a position reference point of the first leakage structure UC and the second leakage structure LC, and a center of the opening of the ear canal may be used as the position reference point of the ear canal. In some embodiments, to facilitate the understanding of the positions of the first leakage structure UC and the second leakage structure LC, when the earphone 10 is in the wearing state, a midpoint of the upper boundary of the inner side IS may be used as a position reference point of the first leakage structure UC, and a trisection point of the lower boundary of the inner side IS near the free end FE (hereinafter referred to as a ⅓ point of the lower boundary of the inner side IS) may be taken as the position reference point of the second leakage structure LC. In the present disclosure, when a junction between the inner side IS and the upper side US and/or the lower side LS is an arc, the upper boundary of the inner side IS may refer to an intersection line between the inner side IS and the upper side US, and the lower boundary of the inner side IS may refer to an intersection line between the inner side IS and the lower side LS. In some embodiments, when one or more of the sides of the sound generation component 11

(e.g., the inner side IS, the upper side US, and/or the lower side LS) are arcs, the intersection line of two sides may refer to an intersection line between the tangent planes of the two sides that are farthest from the center of the sound generation component 11 and parallel to the short axis or the long axis of the sound generation component.

Merely by way of example, the present disclosure uses the midpoint of the upper boundary of the inner side IS and the ⅓ point of the lower boundary of the inner side IS as the position reference points of the first leakage structure UC and the second leakage structure LC, respectively. It may be known that the selected midpoint of the upper boundary of the inner side IS and the ⅓ point of the lower boundary of the inner side IS are only used as exemplary reference points to describe the positions of the first leakage structure UC and the second leakage structure LC. In some embodiments, other reference points may also be selected to describe the positions of the first leakage structure UC and the second leakage structure LC. For example, due to differences between different users' ears, when the earphone 10 is in the wearing state, the first leakage structure UC/second leakage structure LC formed may be a gap with a gradual width. At this time, the reference position of the first leakage structure UC/second leakage structure LC may be a position close to a region with the greatest gap width on the upper/lower boundary of the inner side IS. For example, the ⅓ point of the upper boundary of the inner side IS near the free end FE may be used as the position of the first leakage structure UC, and the midpoint of the lower boundary of the inner side IS may be used as the position of the second leakage structure LC.

In some embodiments, as shown in FIG. 28, the projection of the upper boundary of the inner side IS on the sagittal plane may coincide with the projection of the upper side US on the sagittal plane, and the projection of the lower boundary of the inner side IS on the sagittal plane may coincide with the projection of the lower side LS on the sagittal plane. The projection of the position reference point of the first leakage structure UC (i.e., the midpoint of the upper boundary of the inner side IS) on the sagittal plane may be a point D, and the projection of the position reference point of the second leakage structure LC (i.e., the ⅓ point of the lower boundary of the inner side IS) on the sagittal plane may be a point C. "The projection point C of the ⅓ point of the lower boundary of the inner side IS on the sagittal plane" may be the projection point of trisection point of the lower boundary of the inner side IS near the free end FE on the sagittal plane.

As shown in FIG. 28, in some embodiments, in the wearing state, the projection of the sound generation component 11 of the earphone 10 on the sagittal plane may at least partially cover the user's ear canal, but the ear canal may communicate with the outside world through the concha cavity to free the user's ear. In some embodiments, since the sound from the pressure relief hole 113 may pass through the leakage structure (e.g., the first leakage structure UC or the second leakage structure LC) into the cavity structure to cancel the sound from the sound outlet hole 112, the pressure relief hole 113 may not be too close to the leakage structure. On the premise that at least a portion of the sound generation component 11 extends into the concha cavity, the distance between the pressure relief hole 113 and the sound outlet hole 112 may be limited by the size of the sound generation component 11. Therefore, to make the earphone 10 have a high listening index throughout the entire range of frequency bands, the pressure relief hole 113 may be located as far away from the sound outlet hole 112 as possible, for example, the pressure relief hole 113 may be provided at the upper side US of the sound generation component 11. In such cases, a ratio of a distance between a projection point N' of the center N of the sound outlet hole 112 on the sagittal plane and the projection point D of the midpoint of the upper boundary of the inner side IS on the sagittal plane to the distance between the projection point N' of the center N of the sound outlet hole 112 on the sagittal plane and a projection point of the center of the pressure relief hole 113 on the sagittal plane may be in a range of 0.7-1.3.

When the relative positions of the sound outlet hole 112 and the pressure relief hole 113 are kept constant (i.e., the distance between the sound outlet hole 112 and the pressure relief hole 113 is kept constant), the greater the volume V of the cavity structure, the smaller the overall (in the full range of the frequency bands) listening index of the earphone 10. This is because due to the influence of an air-sound resonance in the cavity structure, at the resonant frequency of the cavity structure, the air-sound resonance may occur within the cavity structure and radiate outward a much louder sound than the sound of the pressure relief hole 113, resulting in a great increase of the sound leakage, and further making the listening index significantly smaller near the resonant frequency.

The greater the distance between the projection point N' of the center N of the sound outlet hole 112 on the sagittal plane and the projection point D of the midpoint of the upper boundary of the inner side IS on the sagittal plane, the greater the volume V of the cavity structure. Accordingly, in some embodiments, on the premise that the sound generation component 11 at least partially extends into the concha cavity, to enable the sound outlet hole 112 to be provided close to the ear canal and the cavity structure to have a suitable volume V such that the sound reception effect of the ear canal may be relatively good, the distance between the projection point N' of the center N of the sound outlet hole 112 on the sagittal plane and the projection point D of the midpoint of the upper boundary of the inner side IS on the sagittal plane may be in a range of 10.0 mm-15.2 mm. In some embodiments, to enable the sound outlet hole 112 to be provided further close to the ear canal and the cavity structure to have a suitable volume V to enhance the sound reception effect of the ear canal, the distance between the projection point N' of the center N of the sound outlet hole 112 on the sagittal plane and the projection point D of the midpoint of the upper boundary of the inner side IS on the sagittal plane may be in a range of 11.0 mm-14.2 mm. In some embodiments, to enable the sound outlet hole 112 to be disposed further close to the ear canal, and to prevent the sound outlet hole 112 from being blocked by the ear due to being too close to the upper boundary of the inner side IS, the distance between the projection point N' of the center N of the sound outlet hole 112 on the sagittal plane and the projection point D of the midpoint of the upper boundary of the inner side IS on the sagittal plane may be in a range of 12.0 mm-14 mm. In some embodiments, to enable the sound outlet hole 112 to be disposed further close to the ear canal, and make the cavity structure have a suitable volume V to enhance the sound reception effect of the ear canal, the distance between the projection point N' of the center N of the sound outlet hole 112 on the sagittal plane and the projection point D of the midpoint of the upper boundary of the inner side IS on the sagittal plane may be in a range of 13.0 mm-13.7 mm.

In some embodiments, as there is a tragus near the opening of the ear canal, the sound outlet hole 112 may easily be blocked by the tragus, at this time, to make the sound outlet hole 112 as close to the ear canal as possible and not be blocked, the distance between the projection point N' of the center N of the sound outlet hole 112 on the sagittal plane and the projection point D of the midpoint of the upper boundary of the inner side IS on the sagittal plane may be in a range of 2.2 mm-3.8 mm. In some embodiments, to further reduce the distance between the sound outlet hole 112 and the ear canal and prevent the sound exit hole 112 from being blocked, the distance between the projection point N' of the center N of the sound outlet hole 112 on the sagittal plane and the projection point D of the midpoint of the upper boundary of the inner side IS on the sagittal plane may be in a range of 2.4 mm-3.6 mm. In some embodiments, to further ear canal opening the sound outlet hole 112 from being blocked, the distance between the projection point N' of the center N of the sound outlet hole 112 on the sagittal plane and the projection point D of the midpoint of the upper boundary of the inner side IS on the sagittal plane may be in a range of 2.8 mm-3.2 mm.

In some embodiments, to ensure that the sound generation component 11 extends into the concha cavity and that there is a suitable gap (i.e., the leakage structure of the cavity structure) between the upper boundary of the inner side IS and the concha cavity, the distance between the projection point D of the midpoint of the upper boundary of the inner side IS and the projection point F of the center of the opening of the ear canal on the sagittal plane may be in a range of 12 mm-18 mm. In some embodiments, to make the first leakage structure UC between the upper boundary of the inner side IS and the concha cavity have a suitable size, the distance between the projection point D of the midpoint of the upper boundary of the inner side IS and the projection point F of the center of the opening of the ear canal on the sagittal plane may be in a range of 13 mm-17 mm. In some embodiments, to further make the first leakage structure UC between the upper boundary of the inner side IS and the concha cavity have a suitable size, the distance between the projection point D of the midpoint of the upper boundary of the inner side IS and the projection point F of the center of the opening of the ear canal on the sagittal plane may be in a range of 14.5 mm-15.5 mm.

In some embodiments, to ensure that the sound generation component 11 extends into the concha cavity and that there is a suitable gap (the leakage structure of the cavity structure) between the lower boundary of the inner side IS and the concha cavity, the distance between the projection point C of the ⅓ point of the lower boundary of the inner side IS on the sagittal plane and the projection point F of the center of the opening of the ear canal on the sagittal plane may be in a range of 1.7 mm-2.7 mm. In some embodiments, to make the second leakage structure LC between the lower boundary of the inner side IS and the concha cavity have a suitable size, the distance between the projection point C of the ⅓ point of the lower boundary of the inner side IS on the sagittal plane and the projection point F of the center of the opening of the ear canal on the sagittal plane may be in a range of 1.9 mm-2.5 mm. In some embodiments, to further make the second leakage structure LC between the lower boundary of the inner side IS and the concha cavity have the suitable size, the distance between the projection point C of the ⅓ point of the lower boundary of the inner side IS on the sagittal plane and the projection point F of the center of the opening of the ear canal on the sagittal plane may be in a range of 2.1 mm-2.3 mm.

In some embodiments, the greater the distance between the projection point N' of the center N of the sound outlet hole 112 on the sagittal plane and the projection point C of the ⅓ point of the lower boundary of the inner side IS on the sagittal plane, the greater the volume V of the cavity structure. Therefore, under the premise that the sound generation component 11 at least partially extends into the concha cavity, to enable the sound outlet hole 112 to be close to the ear canal, and to make the cavity structure have a suitable volume V, so that the sound reception effect in the ear canal is relatively good, in some embodiments, the distance between the projection point N' of the center N of the sound outlet hole 112 on the sagittal plane and the projection point C of the ⅓ point of the lower boundary of the inner side IS on the sagittal plane may be in a range of 3.5 mm-5.6 mm. In some embodiments, to make the cavity structure have the suitable volume V, the distance between the projection point N' of the center N of the sound outlet hole 112 on the sagittal plane and the projection point C of the ⅓ point of the lower boundary of the inner side IS on the sagittal plane may be in a range of 3.9 mm-5.2 mm. In some embodiments, to further enable the sound outlet hole 112 to be disposed close to the ear canal and make the cavity structure have the suitable volume V such that the sound reception effect of the ear canal is relatively good, the distance between the projection point N' of the center N of the sound outlet hole 112 on the sagittal plane and the projection point C of the ⅓ point of the lower boundary of the inner side IS on the sagittal plane may be in a range of 4.5 mm-4.6 mm.

According to FIGS. 5, 9, and 27, when a user wears the earphone 10, by setting the housing 111 of the sound generation component 11 to at least partially extend into the concha cavity, the cavity jointly surrounded by the inner side IS and the concha cavity of the sound generation component 11 may be regarded as the cavity structure 41 as shown in FIG. 5. The gap formed between the inner side IS and the concha cavity (e.g., the first leakage structure UC formed between the inner side IS and the concha cavity near the top of the head, and the second leakage structure LC formed between the inner side IS and the ear near the ear canal) may be considered to be the leakage structure 42 as shown in FIG. 5. The sound outlet hole 112 provided on the inner side IS may be considered as a point sound source inside the cavity structure 41 as shown in FIG. 5, and the pressure relief hole 113 provided on the other sides of the sound generation component 11 (e.g., the upper side US and/or the lower side LS) may be considered as the point sound source outside the cavity structure 41 as shown in FIG. 5. In such cases, when the earphone 10 is in a wearing manner in which the earphone 10 at least partially extends into the concha cavity, i.e., in the wearing manner as shown in FIG. 9, for the listening effect, a majority of the sound radiated by the sound outlet hole 112 may reach the ear canal directly or by reflection, which results in a significant increase in the volume of the sound reaching the ear canal, especially the listening volume at the middle and low frequencies. Meanwhile, only a relatively small portion of the sound with a phase opposite to that of the sound from the sound outlet hole 112 radiated by the pressure relief hole 113 may enter the concha cavity through the gaps (the first leakage structure UC and the second leakage structure LC), and the relatively small portion of the sound radiated by the pressure relief hole 113 may have a weak cancellation effect with the sound radiated by the sound outlet hole 112. In such cases, the volume of the sound reaching the ear canal will be significantly increased, especially at the low and middle frequencies. For the sound leakage, the sound outlet hole 112 may output sound to the outside world through the gap and cancel with the sound generated by the pressure relief hole 113 in the far field, thereby ensuring a sound leakage reduction effect.

To make the sound generation component 11 at least partially extend into the concha cavity, the size of the long axis of the sound generation component 11 may not be too long. To ensure that the sound generation component 11 at least partially extends into the concha cavity, the distance between the pressure relief hole 113 and the rear side RS of the sound generation component 11 may not be too short, otherwise a whole or a portion of an area of the pressure relief hole 113 may be blocked in the long axis direction X due to a contact between the free end FE and the wall side of the concha cavity, which may reduce an effective area of the pressure relief hole 113. Accordingly, in some embodiments, a ratio of the distance between the projection of the second sound receiving hole 1192 on the sagittal plane and the projection of the rear side RS of the sound generation component 11 on the sagittal plane to the distance between the projection of the pressure relief hole 113 on the sagittal plane and the projection of the rear side RS of the sound generation component 11 on the sagittal plane may be between 0.70-0.95. In some embodiments, to make the pressure relief hole 113 have a suitable distance from the rear side RS to avoid the pressure relief hole 113 from being blocked, the ratio of the distance between the projection of the second sound receiving hole 1192 on the sagittal plane and the projection of the rear side RS of the sound generation component 11 on the sagittal plane to the distance between the projection of the pressure relief hole 113 on the sagittal plane and the projection of the rear side RS of the sound generation component 11 on the sagittal plane may be between 0.77-0.93. In some embodiments, a distance h3 between a center point J of the pressure relief hole 113 and the rear side RS may be in a range of 8.60 mm-15.68 mm. In some embodiments, to further prevent the pressure relief hole 113 from being blocked, the distance h3 may be in a range of 10.44 mm-15.68 mm. In some embodiments, to further prevent the pressure relief hole 113 from being blocked while ensuring that the pressure relief hole 113 has a sufficiently great area, the distance h3 may be in a range of 11.00 mm-14.55 mm. In some embodiments, to further make the pressure relief hole 113 have a sufficiently large area, the distance h3 between the center point J of the pressure relief hole 113 and the rear side RS is in the range of 12.15 mm-13.25 mm.

Further, to avoid that all or a portion of the area of the pressure relief hole 113 is blocked in the Z direction so that the effective area of the pressure relief hole 113 is reduced, the distance between the center point J of the pressure relief hole 113 and the inner side IS of the sound generation component 11 along the Z direction may not be too small. In some embodiments, a ratio of the distance between the pressure relief hole 113 and the inner side IS to the size of the sound generation component 11 along the thickness direction (Z-direction) may be 0.40-0.85. In some embodiments, to make the pressure relief hole 113 have a relatively great effective area, the ratio of the distance between the pressure relief hole 113 and the inner side IS to the size of the sound generation component 11 along the thickness direction (Z-direction) may be 0.5-0.7. In some embodiments, a distance between the center point J of the pressure relief hole 113 and the inner side IS of the sound generation component 11 along the Z-direction may be in a range of 4.24 mm-6.38 mm. In some embodiments, to make the pressure relief hole 113 have a relatively great effective area, the distance between the center point J of the pressure relief hole 113 and the inner side IS of the sound generation component 11 along the Z-direction may be in a range of 4.50 mm-5.85 mm. In some embodiments, to further avoid the pressure relief hole 113 from being blocked, the distance between the center point J of the pressure relief hole 113 and the inner side IS of the sound generation component 11 along the Z-direction may be in a range of 4.80 mm-5.50 mm. In some embodiments, to further avoid the pressure relief hole 113 from being blocked, and to ensure that the pressure relief hole 113 has a sufficiently great effective area, the distance between the center point J of the pressure relief hole 113 and the inner side IS of the sound generation component 11 along the Z-direction may be in a range of 5.20 mm-5.55 mm.

In some embodiments, to improve the acoustic output of the earphone 10, i.e., to increase the intensity of the sound at the near-field listening position while reducing the volume of the sound leakage in the far-field, a baffle may be provided between the sound outlet hole 112 and the pressure relief hole 113.

Figure 29:
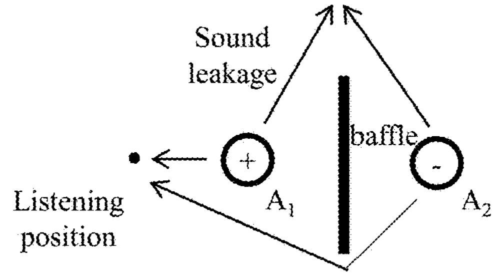
FIG. 29 is a schematic diagram illustrating an exemplary distribution of a baffle disposed between two sound sources of a dipole sound source according to some embodiments of the present disclosure.

FIG. 29 is a schematic diagram illustrating an exemplary distribution of a baffle disposed between two sound sources of a dipole sound source according to some embodiments of the present disclosure. As shown in FIG. 29, when the baffle is provided between the point source A1 and the point sound source A2, in a near field, a sound wave of the point sound source A2 needs to bypass the baffle to interfere with the sound wave of the point sound source A1 at a listening position, which is equivalent to increasing a sound path from the point sound source A2 to the listening position. Therefore, assuming that the point sound source A1 and the point sound source A2 have the same amplitude, compared with a situation without the baffle, an amplitude difference between the sound waves of the point sound source A1 and the point sound source A2 at the listening position may increase, thus reducing a degree of cancellation of the two sound waves at the listening position and increasing a sound volume at the listening position. In the far field, as the sound waves generated by the point sound source A1 and the point sound source A2 may interfere in a greater spatial range without bypassing the baffle (similar to the situation without the baffle), the sound leakage in the far field may not increase significantly compared to the situation without the baffle. Therefore, a baffle structure around one of the point sound sources A1 and A2 may significantly increase the sound volume of the near-field listening position without significantly increasing the sound volume of the far-field sound leakage.

Figure 30:
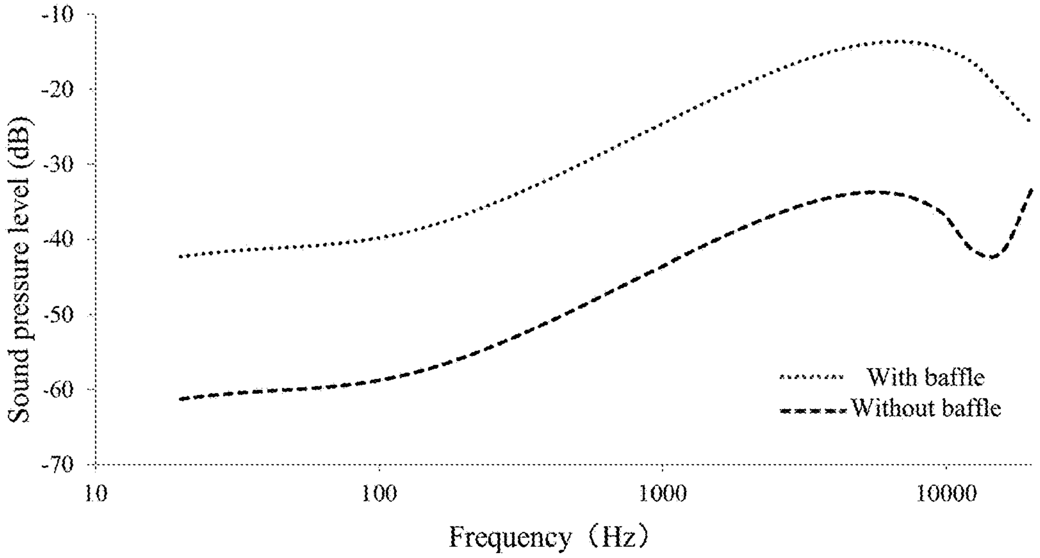
FIG. 30 is a diagram illustrating sound leakage indexes of a dipole sound source with and without a baffle between two sound sources of the dipole sound source according to some embodiments of the present disclosure.

FIG. 30 is a diagram illustrating sound leakage indexes of a dipole sound source with and without a baffle between two sound sources of the dipole sound source according to some embodiments of the present disclosure. After adding the baffle between the two point sound sources, in a near-field, it may be equivalent to increasing the distance between the two point sound sources. The sound volume at a listening position in the near-field may be equivalent to being generated by a two-point sound source with a greater distance, and the listening volume in the near-field may be significantly increased compared to the situation without the baffle. In the far field, a sound field of the two-point sound source may be less affected by the baffle, and the sound leakage may be equivalent to being generated by the two-point sound source with a relatively small distance. Therefore, as shown in FIG. 30, after adding the baffle, the leakage index may be much smaller than that in the situation without the baffle, i.e., at the same listening volume, the sound leakage in the far-field in the situation with the baffle may be smaller than the sound leakage in the far-field in the situation without the baffle, and a sound leakage reduction ability in the situation with the baffle may be significantly enhanced.

Figure 31:
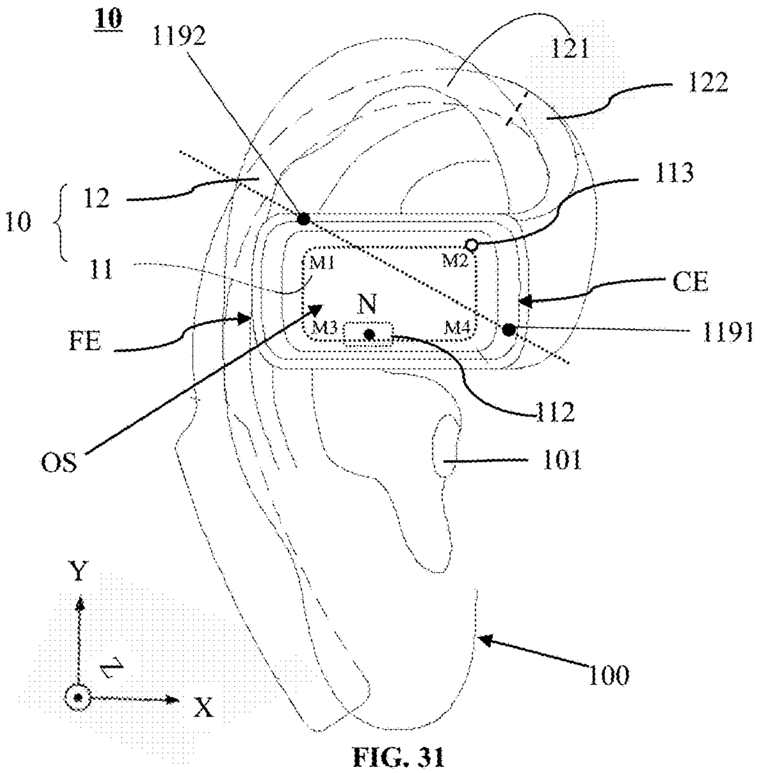
FIG. 31 is a schematic diagram illustrating an exemplary wearing state of an earphone according to some embodiments of the present disclosure.
Figure 32:
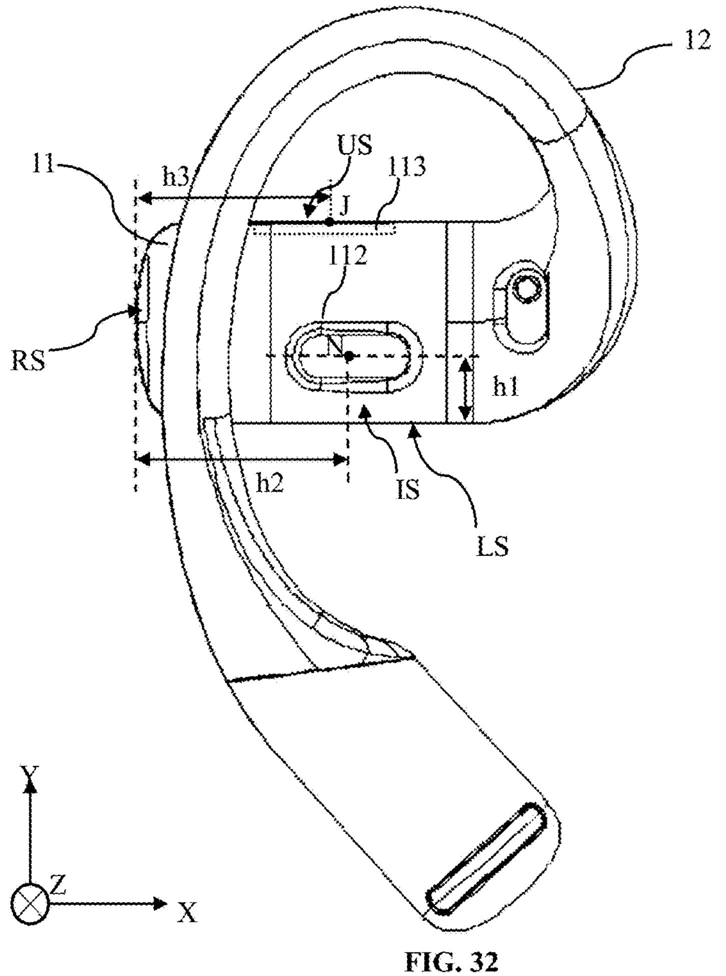
FIG. 32 is a schematic diagram illustrating a structure of the earphone illustrated in FIG. 31 facing the ear.

FIG. 31 is a schematic diagram illustrating an exemplary wearing state of an earphone according to some embodiments of the present disclosure. FIG. 32 is a schematic diagram illustrating a structure of the earphone illustrated in FIG. 31 facing the ear.

The earphone 10 shown in FIG. 31 may have a structure similar to the earphone 10 shown in FIG. 9, with the main difference that the sound generation component 11 of earphone 10 shown in FIG. 31 at least partially covers the region of the antihelix 105 (located in a triangular fossa, an upper antihelix crus, a lower antihelix crus, or an antihelix, for example, a long axis direction X of the sound generation component 11 may be set horizontally or approximately horizontally as shown in the dotted box 11C shown in FIG. 2, wherein the free end FE of the sound generation component 11 may be oriented toward the back of the head). In some embodiments, similarly, to ensure that the first microphone and the second microphone have good sound reception effects, the line connecting the first sound receiving hole 1191 and the second sound receiving hole 1192 may be directed to the user's mouth in the wearing state.

In some embodiments, in the wearing state in which at least a portion of the sound generation component 11 covers an antihelix region of the user (hereinafter referred to as a second wearing state), the first sound receiving hole 1191 may be disposed at a position on the earphone 10 close to the mouth, so as to improve the sound reception effect when the first microphone collects the sound from the user's mouth. In some embodiments, the first sound receiving hole 1191 may be disposed on the second portion 122 of the ear hook 12 or on the sound generation component 11. For example, the first sound receiving hole 1191 may be disposed near a connection between the second portion 122 of the ear hook 12 and the sound generation component 11. In the present disclosure, the first sound receiving hole 1191 being provided near the connection between the second portion 122 of the ear hook 12 and the sound generation component 11 may be understood as a minimum distance between the first sound receiving hole 1191 and the connection may not be greater than 4 mm. In some embodiments, a position relationship between the first sound receiving hole 1191 and the second portion 122 of the ear hook as well as the sound generation component 11 may be represented by a distance between the projection of the first sound receiving hole 1191 on the sagittal plane and a projection of the connection on the sagittal plane. For example, in some embodiments, the minimum distance between the projection of the first sound receiving hole 1191 on the sagittal plane and the projection of the connection on the sagittal plane may not be greater than 4 mm. When the user wears the earphone, the sound generation component 11 may be closer to the user's mouth, and to improve the sound reception effect of the first microphone, in some embodiments, the minimum distance between the projection of the first sound receiving hole 1191 on the sagittal plane and the projection of the connection on the sagittal plane may not be greater than 3 mm. In some embodiments, the first sound receiving hole 1191 may also be disposed at a connection between the sound generation component 11 and the second portion 122 of the ear hook, where the first sound receiving hole 1191 may be closer to the user's mouth, and the first microphone may have a better sound reception effect. In some embodiments, the sound generation component 11 and the second portion 122 of the ear hook may be independent structures, and the two may be connected through splicing, embedding, inserting, etc. The connection between the second portion 122 of the ear hook 12 and the sound generation component 11 may refer to a connection gap between the two. A projection of the connection between the sound generation component 11 and the second portion 122 of the ear hook 12 on the sagittal plane may be a projection of the connection gap between the two on the sagittal plane. In some embodiments, providing the first sound receiving hole 1191 near the connection between the sound generation component 11 and the second portion 122 of the ear hook 12 (e.g., the first sound receiving hole 1191 may be provided on the second portion of the ear hook 122) may ensure that the first sound receiving hole 1191 is close to the user with occupying an internal cavity space of the sound generation component 11, which facilitates an installation of a transducer and a routing of internal wiring, thereby effectively improving production efficiency.

Similar to the wearing state in which at least a portion of the sound generation component 11 extends into the user's concha cavity, when the earphone 10 is in the wearing state in which at least a portion of the sound generation component 11 covers the user's antihelix region, the first sound receiving hole 1191 and the second sound receiving hole 1192 may also need to have a certain spacing for subsequent signal processing. And, as the earphone 10, in a wearing state in which at least a portion of the sound generation component 11 covers the antihelix region of the user, the at least a portion of the sound generation component 11 may abut against an inner wall (e.g., at an inner contour 1014) of the user's auricle. On the premise of ensuring that the first sound receiving hole 1191 is provided in a position close to the user's mouth and that there needs to be a certain spacing between the first sound receiving hole 1191 and the second sound receiving hole 1192, the second sound receiving hole 1192 may be close to the inner contour 1014, which causes that when the sound waves generated by the user speech or the external sound waves are transmitted to the inner contour 1014, the inner contour 1014 may reflect the sound waves, especially in a frequency range of 3 kHz-4 kHz, causing the sound received by the second microphone to be louder relative to the sound received by the first microphone, affecting the subsequent noise reduction and sound reception effect. Based on the above problem, in some embodiments, the noise reduction and sound reception effect of the earphone may be ensured by adjusting the distance between the first sound receiving hole 1191 and the second sound receiving hole 1192, and the distance between the second sound receiving hole 1192 and the inner contour of the auricle 1014 of the user's auricle to ensure the noise reduction and sound reception effect of the earphone.

Figure 33:
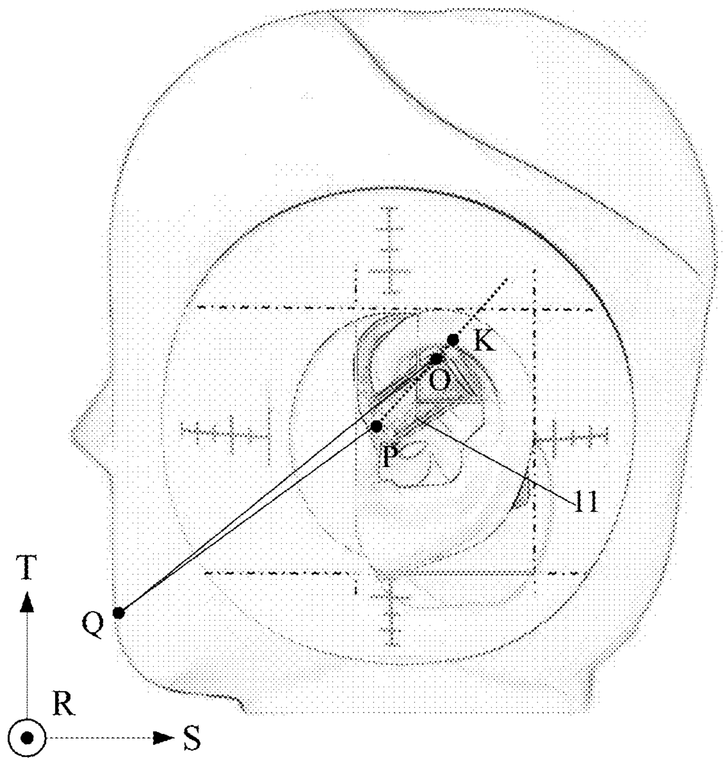
FIG. 33 is a schematic diagram illustrating an exemplary wearing state of an earphone according to some other embodiments of the present disclosure.

FIG. 33 is a schematic diagram illustrating an exemplary wearing state of an earphone according to some embodiments of the present disclosure.

As shown in FIG. 33, when the earphone 10 is in a second wearing state, the first sound receiving hole 1191 may have the first projection point P on the sagittal plane (e.g., the T-S plane shown in FIG. 33), the second sound receiving hole 1192 may have the second projection point O on the sagittal plane. An extension of a line connecting the first projection point P and the second projection point O may have an intersection K with a projection of the inner contour 1014 of the user's auricle on the sagittal plane. In some embodiments, to facilitate a clearer description of the positional relationship of the first sound receiving hole 1191, the second sound receiving hole 1192, and the inner contour 1014 of the user's auricle, a distance between the second sound receiving hole 1192 and the inner contour 1014 of the auricle may be represented by the distance between a first distance OK between the second projection point O and the intersection K. The distance between the first sound receiving hole 1191 and the second sound receiving hole 1192 may be represented by a second distance OP between the first projection point P and the second projection point O of the second sound receiving hole 1192 on the sagittal plane.

In some embodiments, considering that when the second sound receiving hole 1192 is relatively close to the inner contour 1014 of the auricle, the sound waves generated by the user's speech or the external sound waves, when transmitted to the inner contour 1014 of the auricle, may be reflected by the inner contour 1014 of the auricle, especially in the frequency range of 3 kHz-8 kHz, which causes the sound received by the second microphone to be louder relative to the sound received by the first microphone, affecting the subsequent noise reduction effect and the sound reception effect. In addition, due to a limited size of the sound generation component 11 and the need to ensure a relatively great distance between the first sound receiving hole 1191 and the second sound receiving hole 1192, when the second sound receiving hole 1192 is far from the inner contour 1014 of the auricle, the distance between the first sound receiving hole 1191 and the second sound receiving hole 1192 may be relatively small, which may affect a subsequent signal processing.

FIGS. 34A-34D are schematic diagrams illustrating frequency response curves corresponding to different distances between a second projection point O and an intersection point K according to some embodiments of the present disclosure.

Figure 34A:
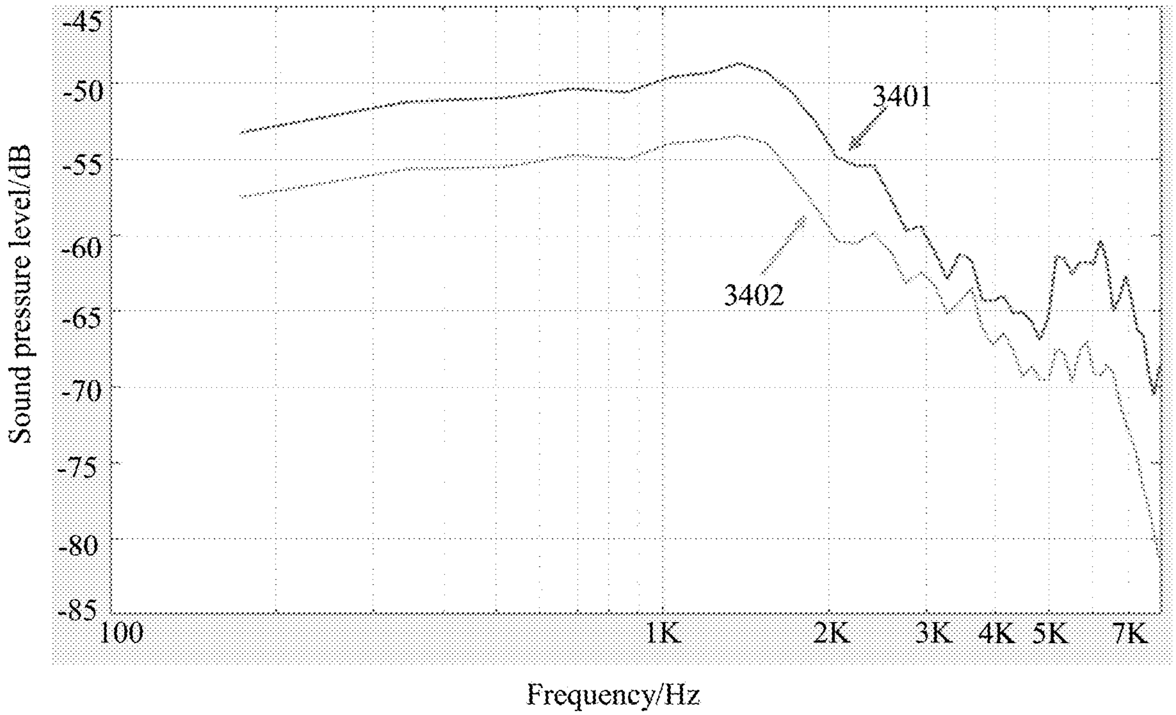
FIGS. 34A-34D are schematic diagrams illustrating frequency response curves corresponding to different distances between a second projection point O and an intersection point K according to some embodiments of the present disclosure.

Referring to FIG. 34A, curves 3401 and 3402 are curves illustrating frequency responses of the first microphone and the second microphone, respectively, when the second distance OP is 20 mm and the first distance OK is 8 mm. The second sound receiving hole 1192 may be disposed on the upper side US of the sound generation component 11. According to FIG. 34A, when the second sound receiving hole 1192 is disposed on the upper side US of the sound generation component 11 and the first distance OK is 8 mm, the sound reception effect of the first microphone may be better than the sound reception effect of the second microphone in all frequency bands, the responses of the first microphone and the second microphone to the sound may be relatively consistent, and an overall sound reception situation is relatively satisfactory.

Figure 34B:
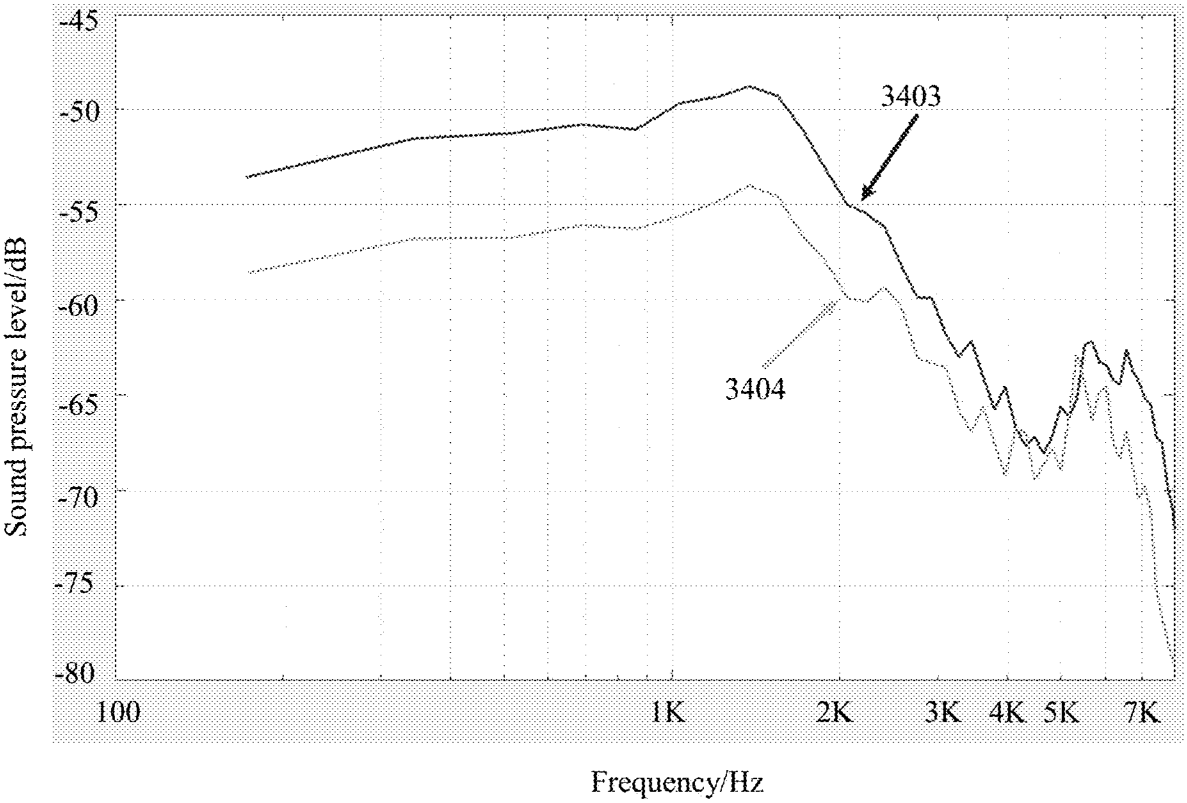

Referring to FIG. 34B, curves 3403 and 3404 are curve diagrams illustrating the frequency responses of the first microphone and the second microphone, respectively, when the second distance OP is 20 mm and the first distance OK is 6 mm. Similar to FIG. 34A, the second sound receiving hole 1192 may be located on the upper side US of the sound generation component 11. According to FIG. 34B, when the second sound receiving hole 1192 is located on the upper side US of the sound generation component 11 and the first distance OK is 6 mm, a difference in amplitudes of the sound receptions of the first microphone and the second microphone in the frequency band above 4 k may be small such that an effect of the whole microphone assembly in picking up the speech from the user's mouth may be affected, and the high-frequency portion may be missing.

Figure 34C:
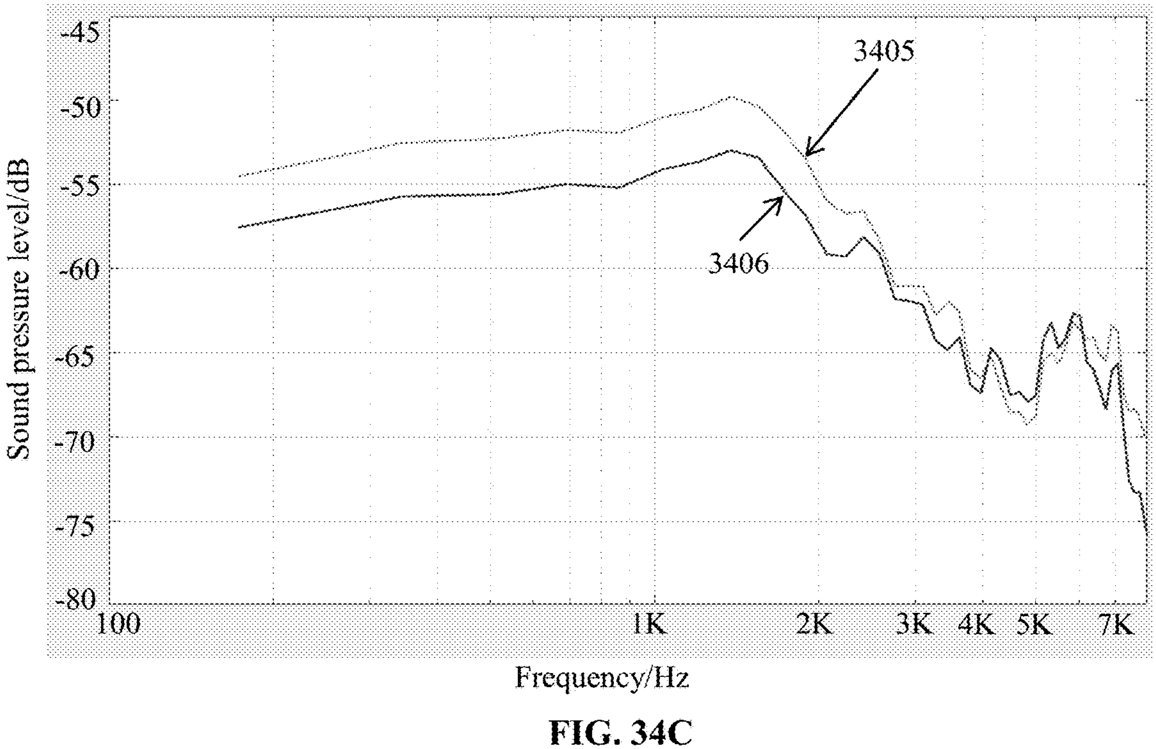

Referring to FIG. 34C, curves 3405 and 3406 are curve diagrams illustrating the frequency responses of the first microphone and the second microphone, respectively, when the second distance OP is 20 mm and the first distance OK is 4 mm. Similar to FIGS. 34A and 34B, the second sound receiving hole 1192 may be located on the upper side US of the sound generation component 11. According to FIG. 34C, when the second sound receiving hole 1192 is located on the upper side US of the sound generation component 11 and the first distance OK is 4 mm, the difference in the amplitudes of the sound receptions of the first microphone and the second microphone in the 2.2 k-4 k frequency band may be significantly reduced, and the speech frequency band with a good sound reception may be further narrowed.

Figure 34D:
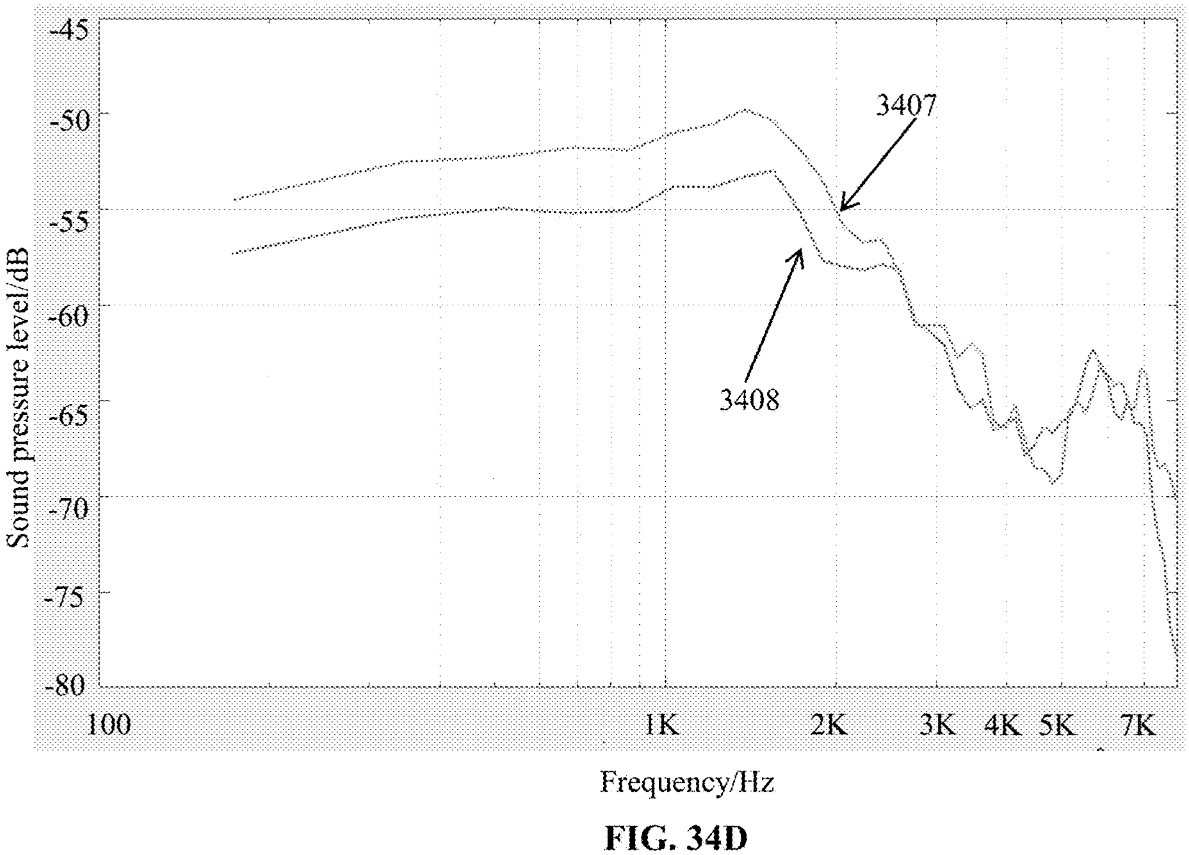

Referring to FIG. 34D, curves 3407 and 3408 are curves illustrating the frequency responses of the first microphone and the second microphone, respectively, when the second distance OP is 20 mm and the first distance OK is 2 mm. Similar to FIGS. 34A-34C, the second sound receiving hole 1192 may be located on the upper side US of the sound generation component 11. According to FIG. 34D, when the second sound receiving hole 1192 is located on the upper side US of the sound generation component 11 and the first distance OK is 2 mm, the amplitudes of the sound receptions of the first microphone and the second microphone in the frequency band above 2.2 kHz may have no difference such that the effect of the microphone assembly in picking up the speech from the user's mouth may be more seriously affected.

In some embodiments, to ensure that the first microphone and the second microphone have relatively good sound reception effects and noise reduction effects, the first distance OK may be in a range of 2 mm-10 mm. For example, to reduce the reflection effect of the inner contour 1014 of the auricle on the sound waves, and to improve the sound reception effects of the first microphone and the second microphone, the distance between the second sound receiving hole 1192 and the inner contour 1014 of the auricle may be increased. In some embodiments, the first distance OK may be in a range of 4 mm-10 mm. To further reduce the reflection effect of the inner contour 1014 of the auricle on the sound waves, and to further improve the reception effects of the first microphone and the second microphone, the distance between the second sound receiving hole 1192 and the inner contour 1014 of the auricle may be further increased. In some embodiments, the first distance OK may be in a range of 6 mm-10 mm. When the second sound receiving hole 1192 is provided far away from the inner contour 1014 of the auricle, the reflection of the sound waves by the inner contour 1014 of the auricle may hardly affect the second sound receiving hole 1192. In some embodiments, the first distance OK may be in a range of 8 mm-10 mm.

It may be noted that the above description is mainly directed to the situation in which the second sound receiving hole 1192 is located on the upper side of the sound generation component 11. When the second sound receiving hole 1192 is disposed on the outer side of the sound generation component 11, as the second sound receiving hole 1192 is basically on the same plane with the user's helix, a distance between the second projection point O and the intersection point C may has no significant effect on the reception effect of the second microphone. At this time, the user's helix may not be significantly higher than the position of the second sound receiving hole 1192.

In some embodiments, to ensure that the first microphone and the second microphone in the earphone 10 have relatively good sound reception effects and noise reduction effect in the second wearing state, a ratio of the second distance OP to the first distance OK may be in a range of 1.8-4.4. To reduce the influence of the inner contour of the auricle on the second microphone, the distance between the second sound receiving hole 1192 and the inner contour of the auricle, as well as the distance between the first sound receiving hole 1191 and the second sound receiving hole 1192 may be increased so as to facilitate the subsequent signal processing. In some embodiments, a ratio of the second distance OP to the first distance OK may be in a range of 2.5-3.8. In some embodiments, when the wearing position of the earphone remains unchanged, to further reduce the influence of the antihelix on the second microphone, the distance between the second sound receiving hole 1192 and the antihelix may be increased, and the distance between the first sound receiving hole 1191 and the second sound receiving hole 1191 may be increased so as to facilitate the subsequent signal processing. In some embodiments, the ratio of the second distance OP to the first distance OK may be in a range of 2.8-3.5. Based on considerations of reducing the influence of the antihelix on the second microphone and facilitating the subsequent signal processing, the distance between the second sound receiving hole 1192 and the antihelix may be further increased, and the distance between the first sound receiving hole 1191 and the second sound receiving hole 1192 may be further increased. In some embodiments, the ratio of the second distance OP to the first distance OK may be in a range of 3.0-3.3.

If the distance between the first sound receiving hole 1191 and the second sound receiving hole 1192 is too small, the difficulty of processing the low-frequency signals may increase (mainly because phase differences of the low-frequency signals may be very small), making it difficult to realize a precise operation. Therefore, the distance between the first sound receiving hole 1191 and the second sound receiving hole 1192 may not be too small. To ensure the portability of the earphone 10 and the comfort of the user when wearing the earphone 10, the size of the sound generation component 11 may not be too great, and accordingly, the distance between the first sound receiving hole 1191 and the second sound receiving hole 1192 may be limited by the size of the sound generation component 11. In some embodiments, considering the limitation of the size of the sound generation component 11 and to make the first microphone and the second microphone have better reception effects to facilitate the subsequent signal processing, the distance between the first sound receiving hole 1191 and the second sound receiving hole 1192 may be in a range of 10 mm-50 mm. In some embodiments, the distance between the first sound receiving hole 1191 and the second sound receiving hole 1192 may be reflected by the distance between the first projection point P and the second projection point O. That is, the second distance between the first projection point P and the second projection point O may be in a range of 10 mm-50 mm. More descriptions regarding the distance between the first sound receiving hole 1191 and the second sound receiving hole 1192 can be found elsewhere in the present disclosure, such as FIG. 11 and the counterparts, which are not repeated herein.

Continuing to refer to FIG. 33, in the wearing state, the distance between the first sound receiving hole 1191 and the user's mouth (referring to point Q in FIG. 33) may be less than the distance between the second sound receiving hole 1192 and the user's mouth to facilitate the subsequent signal processing. As shown in FIG. 33, when the earphone 10 is in the wearing state, the first sound receiving hole 1191 may have the first projection point P on the sagittal plane (e.g., the T-S plane shown in FIG. 33), the second sound receiving hole 1192 may have the second projection point O on the sagittal plane, and the third projection point Q may be used to represent a projection of the user's mouth (e.g., a lip bead) on the sagittal plane. The user's mouth may have the third projection point Q on the sagittal plane, and a distance PQ may be less than a distance OQ.

In some embodiments, the line connecting the first projection point P of the first sound receiving hole 1191 on the sagittal plane and the second projection point O of the second sound receiving hole 1192 on the sagittal plane may approximately point to the third projection point Q of the user's mouth on the sagittal plane. In such cases, a directivity algorithm may be constructed based on the sounds received by the first microphone and the second microphone so that a clearer voice of the user may be received. In some embodiments, the line PQ connecting the first projection point P and the third projection point Q may form a certain angle with respect to the line OQ connecting the second projection point O and the third projection point Q. To ensure the directivity of the first sound receiving hole 1191 and the second sound receiving hole 1192, an angle between PQ and OQ may be smaller than 30°. In some embodiments, to further ensure the directivity of the first sound receiving hole 1191 and the second sound receiving hole 1192, the angle between the PQ and the OQ may be 0°-25°. In some embodiments, to further ensure the directivity of the first sound receiving hole 1191 and the second sound receiving hole 1192, the angle between the PQ and the OQ may be 5°-20°. For example, in some embodiments, the angle between PQ and OQ may be 0°, 30, 9° or 15°, etc.

Figure 35:
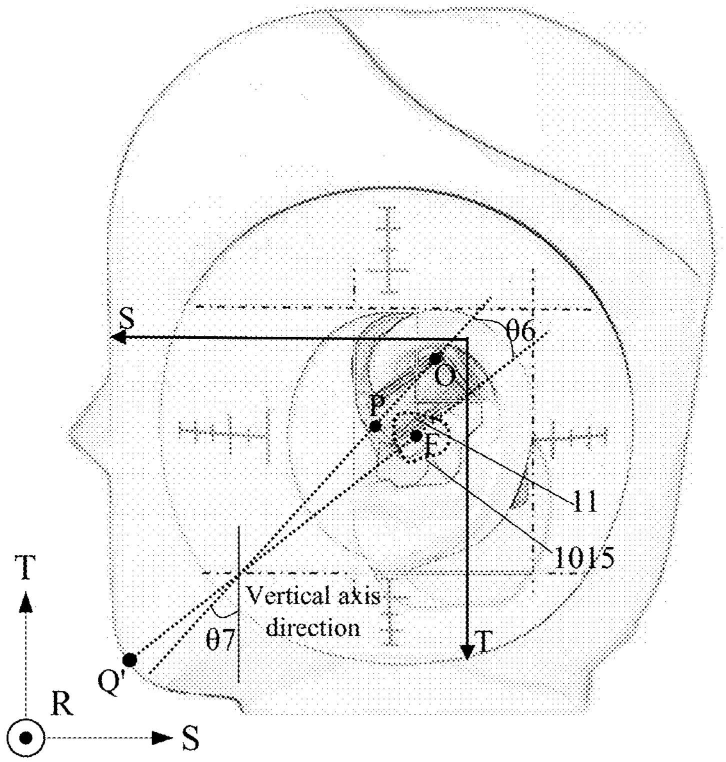
FIG. 35 is a schematic diagram illustrating an exemplary wearing state of an earphone according to some other embodiments of the present disclosure.

FIG. 35 is a schematic diagram illustrating an exemplary wearing state of an earphone according to some embodiments of the present disclosure.

Referring to FIG. 35, when the earphone 10 is in a second wearing state, an endpoint of a bottom of a lower jaw of a user may have a fifth projection point Q' on a sagittal plane of the user, and a centroid of the projection of the opening of the ear canal of the user on the sagittal plane (e.g., dashed region 1015 of FIG. 35) may be point F. A line formed by the fifth projection point Q and the centroid point F of the projection of the opening of the ear canal of the user on the sagittal plane may reflect, to some extent, a relative position of the sound generation component 11 relative to the endpoint of the bottom of the lower jaw of the user.

Continuing to refer to FIG. 35, the first sound receiving hole 1191 may have the first projection point P on the sagittal plane, and the second sound receiving hole 1192 may have the second projection point O on the sagittal plane. In some embodiments, to make the first sound receiving hole 1191 and the second sound receiving hole 1192 have a relatively good directionality, i.e., the line connecting the first sound receiving hole 1191 and the second sound receiving hole 1192 point to the region between the user's mouth and the endpoint of the bottom of the lower jaw of the user, an angle θ6 between the line connecting the first sound receiving hole 1191 and the second sound receiving hole 1192 and the line connecting the fifth projection point Q and the centroid point F may not be greater than 45°. In some embodiments, when the earphone 10 is in the second wearing state, the angle θ6 may be in a range of 6°-35° such that the line connecting the first sound receiving hole 1191 and the second sound receiving hole 1192 may point to a region near the user's mouth. In some embodiments, the angle θ6 may be in a range of 10°-25° such that the first sound receiving hole 1191 and the second sound receiving hole 1192 may point to the region near the user's mouth more accurately.

Continuing to refer to FIG. 35, the sagittal axis S and the vertical axis T may represent critical directions of the line connecting the first sound receiving hole 1191 and the second sound receiving hole 1192, i.e., in some embodiments of the present disclosure, to ensure the sound reception effects of the first microphone and the second microphone when collecting the user's speech, the direction of the line connecting the first sound receiving hole 1191 and the second sound receiving hole 1192 may be between the sagittal axis S and the vertical axis T. The line connecting the first projection point P and the second projection point O and the user's vertical axis may form an angle θ7. The angle θ7 may reflect the directionality of the line connecting the first sound receiving hole 1191 and the second sound receiving hole 1192, based on this, in some embodiments, to ensure the sound reception effects of the first sound receiving hole 1191 and the second sound receiving hole 1192, the angle θ7 may be in a range of 20°-80° such that the line connecting the first projection point P and the second projection point O may point to the endpoint of the bottom of the lower jaw or the user's mouth. In some embodiments, the angle θ7 may be in a range of 40°-70° such that the line connecting the first projection point P and the second projection point O may point to the region of the endpoint of the bottom of the lower jaw of the user or the user's mouth. In some embodiments, the angle θ7 may be in a range of 42°-65° such that the line connecting the first projection point P and the second projection point O may point to the user's mouth more accurately.

Figure 36:
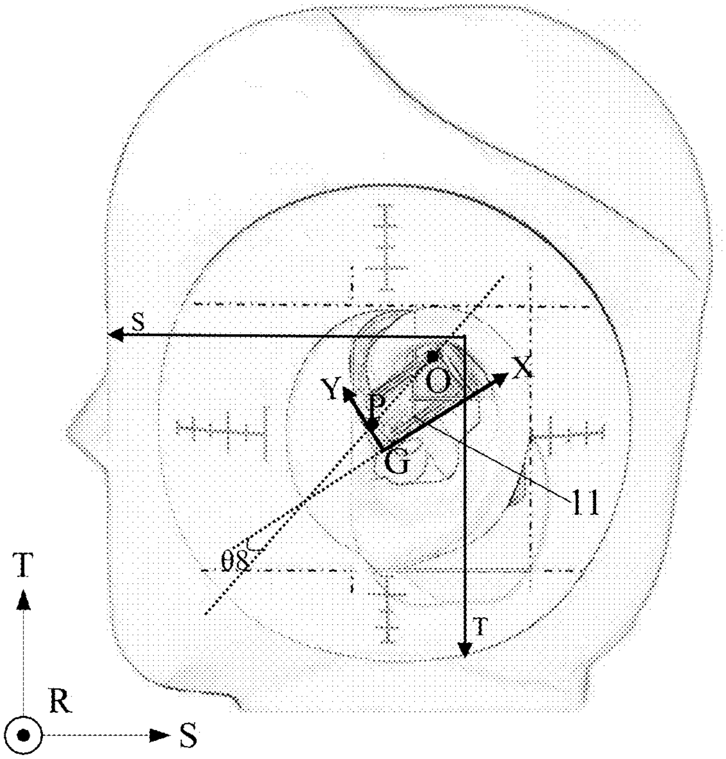
FIG. 36 is a schematic diagram illustrating an exemplary wearing state of an earphone according to some other embodiments of the present disclosure.

FIG. 36 is a schematic diagram illustrating an exemplary wearing state of an earphone according to some embodiments of the present disclosure.

Referring to FIG. 36, a projection of the sound generation component 11 on the sagittal plane may include a long axis direction X and a short axis direction Y. The long axis direction X may refer to a length extension direction of the sound generation component 11 and the short axis direction Y may refer to a height (or width) extension direction of the sound generation component 11. When the earphone 10 is in a second wearing state, the first sound receiving hole 1191 may have the first projection point P on the sagittal plane, and the second sound receiving hole 1192 may have the second projection point O on the sagittal plane. An angle between a line connecting the first projection point P and the second projection point O and the long axis direction X of the projection of the sound generation component 11 on the sagittal plane may be expressed as θ8. In some embodiments, sound reception effects of the first sound receiving hole 1191 and the second sound receiving hole 1192 may be controlled by controlling the angle θ8.

As shown in FIG. 36, the sagittal axis S and the vertical axis T may represent critical directions of the line connecting the first projection point P and the second projection point O with respect to the long axis direction X of the projection of the sound generation component 11 on the sagittal plane, i.e., in some embodiments of the present disclosure, the direction of the line connecting the first projection point P and the second projection point O may be between the sagittal axis S and the vertical axis T, so as to ensure the reception effect when the first microphone and the second microphone collects the user's speech. In some embodiments, a negative direction of the long axis direction X shown in FIG. 36 may be 0°, with a counterclockwise direction as positive, for representing the angle θ8. Specifically, in some embodiments of the present disclosure, to make the first microphone and the second microphone have better reception effects, the angle θ8 may be between −45° and 45°. In some embodiments, the angle θ8 may be in a range of −25°-−30° such that the line connecting the first projection point P and the second projection point O may point to a region between a user's mouth and an endpoint of the bottom of the lower jaw of the user. In some embodiments, the angle θ8 may be in a range of −20°-25° such that the line connecting the first projection point P and the second projection point O may point more precisely to the region between the user's mouth and the endpoint of the bottom of the lower jaw of the user. It may be noted that in some embodiments, when the earphone 10 is in the wearing state shown in FIG. 31, the upper side US, or the lower side LS of the sound generation component 11 may be approximately parallel to a horizontal direction, at which time the angle θ8 may be in a range of 0-90°.

Similar to the wearing state in which at least a portion of the sound generation component 11 extends into the concha cavity of the user as shown in FIG. 9, in some embodiments, when the earphone 10 is in a wearing state in which at least a portion of the sound generation component 11 covers the antihelix region of the user, to ensure a relatively good directivity of the first sound receiving hole 1191 and the second sound receiving hole 1192, the angle between the line connecting the first sound receiving hole 1191 and the second sound receiving hole 1192 and the coronal axis of the user (e.g., the R-axis in FIG. 36, which is perpendicular to the sagittal plane, i.e., the S-T-plane) may be in a range of −30°-−135°. In some embodiments, the angle between the line connecting the first sound receiving hole 1191 and the second sound receiving hole 1192 relative to the sagittal axis may be in a range of −50°-−125° such that the line connecting the first sound receiving hole 1191 and the second sound receiving hole 1192 points to a region near right and left sides of the user's mouth. In some embodiments, the angle between the line connecting the first sound receiving hole 1191 and the second sound receiving hole 1192 relative to the coronal axis may be in a range of −90°-−115° such that the line connecting the first sound receiving hole 1191 and the second sound receiving hole 1192 points to the region of the user's mouth. In some embodiments, when the angle between the line connecting the first sound receiving hole 1191 and the second sound receiving hole 1192 and the coronal axis of the user is −90°, the line connecting the first sound receiving hole 1191 and the second sound receiving hole 1192 may be parallel to the sagittal plane.

In some embodiments, when the earphone 10 is in the wearing state as shown in FIG. 31, a coordinate system may be established based on the long axis direction X, the short axis direction Y, and the thickness direction Z of the sound generation component 11, and positions of the first sound receiving hole 1191 and/or the second sound receiving hole 1192 relative to the sound generation component 11 may be represented by the coordinates in the coordinate system. For example, a distance between the first sound receiving hole 1191 and/or the second sound receiving hole 1192 and the inner side IS of the sound generation component 11 may be represented by a Z value in the coordinate system, a distance between the first sound receiving hole 1191 and/or the second sound receiving hole 1192 and a front side (the connection end CE) of the sound generation component 11 may be represented by an X value in the coordinate system, and a distance between the first sound receiving hole 1191 and/or the second sound receiving hole 1192 and the lower side LS of the sound generation component 11 may be represented as a Y value in the coordinate system. In some embodiments, a greater Z value in this coordinate system may indicate that the first sound receiving hole 1191 is farther away from the inner side IS of the sound generation component 11; a greater X value may indicate that the first sound receiving hole 1191 is farther away from the front side (the connection end CE) of the sound generation component 11; and a greater Y value may indicate that the first sound receiving hole 1191 the farther away from the lower side LS of the sound generation component 11.

Similar to the wearing state in which at least a portion of the sound generation component 11 extends into the user's concha cavity as shown in FIG. 9, in some embodiments, when the earphone 10 is in the wearing state as shown in FIG. 31, to provide a better sound reception effect of the first microphone, a ratio of the distance between the first projection point P of the first sound receiving hole 1191 on the sagittal plane and the projection of the front side of the sound generation component 11 (the connection end CE) on the sagittal plane in the long axis direction X to a size of the projection of the sound generation component 11 on the sagittal plane along the long axis direction X may not be greater than 0.75, i.e., when the sound generation component 11 is divided into 4 equal portions along the long axis direction X, the first projection point P may be located in a region of X≤3. To make the first sound receiving hole 1191 close to the user's mouth to improve the sound reception effect of the first microphone, in some embodiments, the ratio of the distance between the first projection point P of the first sound receiving hole 1191 on the sagittal plane and the projection of the front side of the sound generation component 11 (the connection end CE) on the sagittal plane in the long axis direction X to the size of the projection of the sound generation component 11 on the sagittal plane along the long axis direction X may not be greater than 0.5. In some embodiments, to make the first sound receiving hole 1191 closer to the user's mouth to improve the sound reception effect of the first microphone, the ratio of the distance between the first projection point P of the first sound receiving hole 1191 on the sagittal plane and the projection of the front side of the sound generation component 11 (the connection end CE) on the sagittal plane along the long axis direction X to the size of the projection of the sound generation component 11 on the sagittal plane along the long axis direction X may not be greater than 0.3. In some embodiments, to make the first sound receiving hole 1191 closer to the user's mouth to improve the sound reception effect of the first microphone, the ratio of the distance between the first projection point P of the first sound receiving hole 1191 on the sagittal plane and the projection of the front side of the sound generation component 11 (the connection end CE) on the sagittal plane along the long axis direction X to the size of the projection of the sound generation component 11 on the sagittal plane along the long axis direction X may not be greater than 0.2. By providing the first sound receiving hole 1191 close to the front side (the connection end CE) of the sound generation component 11, the position of the second sound receiving hole 1192 may have more options to ensure that the second sound receiving hole 1192 is capable of maintaining a specific spacing from the first sound receiving hole 1191 and that the second sound receiving hole is located as far away from the antihelix as possible. Based on the above considerations, in some embodiments, the ratio of the distance between the first projection point P of the first sound receiving hole 1191 on the sagittal plane and the projection of the front side of the sound generation component 11 (the connection end CE) on the sagittal plane along the long axis direction X to the size of the projection of the sound generation component 11 on the sagittal plane along the long axis direction X may not be greater than 0.1. In some embodiments, the first sound receiving hole 1191 may also be disposed on the front side (the connection end CE) of the sound generation component 11 such that the first sound receiving hole 1191 may be closer to the user's mouth in the horizontal direction, and the first microphone may have a better sound reception effect.

In some embodiments, to make the first microphone have a relatively good reception effect, a ratio of the distance between the first projection point P of the first sound receiving hole 1191 on the sagittal plane and the projection of the lower side of the sound generation component 11 on the sagittal plane along the short axis direction Y to a size of the projection of the sound generation component 11 on the sagittal plane along the short axis direction Y may not be greater than 0.5, i.e., when the sound generation component is divided into 4 equal parts along the short axis direction Y, the first projection point P may be located in a region of Y≤2. In some embodiments, to make the first sound receiving hole 1191 closer to the user's mouth and to improve the sound reception effect of the first microphone, in some embodiments, the ratio of the distance between the first projection point P of the first sound receiving hole 1191 on the sagittal plane and the projection of the lower side LS of the sound generation component 11 on the sagittal plane along the short axis direction Y to the size of the projection of the sound generation component 11 on the sagittal plane along the short axis direction Y may not be greater than 0.4. In some embodiments, the ratio of the distance between the first projection point P of the first sound receiving hole 1191 on the sagittal plane and the projection of the lower side LS of the sound generation component 11 on the sagittal plane along the short axis direction Y to the size of the projection of the sound generation component 11 on the sagittal plane along the short axis direction Y may not be greater than 0.3. By providing the first sound receiving hole 1191 close to the lower side LS of the sound generation component, the position of the second sound receiving hole 1192 may have more options to ensure that the second sound receiving hole 1192 maintains a specific spacing with the first sound receiving hole 1191 and that the line connecting the first sound receiving hole 1191 and the second sound receiving hole 1192 points to the user's mouth more accurately. Based on the above considerations, in some embodiments, the ratio of the distance between the first projection point P of the first sound receiving hole 1191 on the sagittal plane and the projection of the lower side LS of the sound generation component 11 on the sagittal plane along the short axis direction Y to the size of the projection of the sound generation component 11 on the sagittal plane along the short axis direction Y may not be greater than 0.1. In some embodiments, the first sound receiving hole 1911 may be disposed on the lower side LS of the sound generation component 11 such that the first sound receiving hole 1191 is closer to the user's mouth in the vertical direction, and the first microphone has a better sound reception effect.

When the first sound receiving hole 1191 is provided at a position close to the lower side LS of the sound generation component 11, the second sound receiving hole 1192 may be provided at a position close to the upper side US of the sound generation component 11 to increase the distance between the first sound receiving hole 1191 and the second sound receiving hole 1192, which increases a difference in signals received by the first sound receiving hole 1191 and the second sound receiving hole 1192, makes the line connecting the first sound receiving hole 1191 and the second sound receiving hole 1192 point toward the user's mouth, thereby improving the sound reception effect. In some embodiments, a ratio of the distance between the second projection point O of the second sound receiving hole 1192 on the sagittal plane and the projection of the upper side US of the sound generation component 11 on the sagittal plane along the short axis direction Y to the size of the projection of the sound generation component 11 on the sagittal plane along the short axis direction Y may not be greater than 0.3, i.e., when the sound generation component 11 is divided into 10 equal portions along the short axis direction Y, the second projection point O may be located in a region of Y≥7. In some embodiments, to make the second sound receiving hole 1192 farther away from the user's mouth compared to the first sound receiving hole 1191, so as to ensure a sufficient distance between the first sound receiving hole 1191 and the second sound receiving hole 1192, and make the line connecting the first sound receiving hole 1191 and the second sound receiving hole 1192 point more accurately to the user's mouth to improve the sound reception effect, in some embodiments, the ratio of the distance between the second projection point O of the second sound receiving hole 1192 on the sagittal plane and the projection of the upper side US of the sound generation component 11 on the sagittal plane along the short axis direction Y to the size of the projection of the sound generation component 11 on the sagittal plane along the short axis direction Y may not be greater than 0.27. In some embodiments, the second sound receiving hole 1912 may be disposed on the upper side US of the sound generation component 11 such that the second sound receiving hole 1192 may have a greater spacing from the first sound receiving hole 1191 in the vertical direction, and the line connecting the first sound receiving hole 1191 and the second sound receiving hole 1192 may point to the user's mouth more accurately, and the sound reception effect may be better.

Similar to the wearing state in which at least a portion of the sound generation component 11 extends into the user's concha cavity, in some embodiments, when the earphones 10 is in the wearing state in which at least a portion of the sound generation component 11 covers the user's antihelix region, the first sound receiving hole 1191 may be located at the lower side LS or the front side (the connection end CE) of the sound generation component 11. In some embodiments, considering that when the first sound receiving hole 1191 is too close to the inner side of the sound generation component 11 (e.g., less than 2 mm), the first sound receiving hole 1191 may be blocked by the user's ear during wearing, and the first microphone may collect a noise generated by friction between the user's ear and the sound generation component 11. On the other hand, when the first sound receiving hole 1191 is located at the lower side LS or the front side (the connection end CE) of the sound generation component 11, the farther the distance from the first sound receiving hole 1191 to the inner side IS of the sound generation component 11, the smaller a sound volume of sound received by the first sound receiving hole 1191 from the user's mouth. Accordingly, in some embodiments, to ensure both the sound reception effect of the first sound receiving hole 1191 and the sound volume of the sound received from the user's mouth, a ratio of a distance between the first sound receiving hole 1191 and the inner side IS of the sound generation component 11 along the thickness direction Z of the sound generation component to a size of the sound generation component 11 along the thickness direction Z may be in a range of 0.25-0.7. For example, in some embodiments, the ratio of the distance between the first sound receiving hole 1191 and the inner side IS of the sound generation component 11 along the thickness direction Z of the sound generation component to the size of the sound generation component 11 along the thickness direction Z may be in a range of 0.25-0.65. By providing the first sound receiving hole 1191 at a relatively far distance with respect to the inner side IS of the sound generation component 11, the influence of the noise generated by friction between the sound generation component 11 and the ear may be reduced, and by reducing the distance between the first sound receiving hole 1191 and the outer side OS of the sound generation component 11, the line connecting the first sound receiving hole 1191 and the second sound receiving hole 1192 may point to the user's mouth. In some embodiments, the ratio of the distance between the first sound receiving hole 1191 and the inner side IS of the sound generation component 11 along the thickness direction Z of the sound generation component to the size of the sound generation component 11 along the thickness direction Z may be in a range of 0.3-0.65. By further reducing the distance between the first sound receiving hole 1191 and the outer side OS of the sound generation component 11, the line connecting the first sound receiving hole 1191 and the second sound receiving hole 1192 may point more accurately to the user's mouth.

Referring to FIG. 36, in some embodiments, the projection (or an extension of the projection) of the front side (the connection end CE) of the sound generation component 11 on the sagittal plane and the projection (or the extension of the projection) of the lower side LS of the sound generation component 11 on the sagittal plane may have an intersection G. The greater the distance between the first projection point P of the first sound receiving hole 1191 on the sagittal plane and the intersection point G, the greater the distance between the first projection point P and the user's mouth, and the worse the sound reception effect of the first microphone. Accordingly, in some embodiments, to improve the sound reception effect of the first microphone, the distance between the first projection point P and the intersection G may not be greater than 5 mm. In some embodiments, the distance between the first projection point P and the fourth projection point G may not be greater than 3 mm. To improve the sound reception effect of the first microphone, the first sound receiving hole 1191 may be disposed at a position on the sound generation component 11 closer to the user's mouth. In some embodiments, the distance between the first projection point and the fourth projection point may not be greater than 2 mm such that the first sound receiving hole 1191 may be closer to the user's mouth to further enhance the sound reception effect of the first microphone.

Similar to the wearing state in which at least a portion of the sound generation component 11 extends into the user's concha cavity, in some embodiments, when the earphone 10 is in the wearing state in which at least a portion of the sound generation component 11 covers the antihelix region of the user, the second sound receiving hole 1192 may be disposed on a side of the sound generation component 11 that does not form an auxiliary cavity with the antihelix of the user. For example, the second sound receiving hole 1192 may be disposed on the upper side US, the lower side LS, the outer side OS, etc. of the sound generation component 11. In some embodiments, the second sound receiving hole 1192 may be disposed on the outer side OS of the sound generation component 11. In some embodiments, to prevent the line connecting the first sound receiving hole 1191 and the second sound receiving hole 1192 from not being able to point to the user's mouth, the distance between the second sound receiving hole 1192 and the upper side US or the lower side LS of the sound generation component 11 may not be too great or too small, and a ratio of the distance between the projection of the second sound receiving hole 1192 on the sagittal plane and the upper side US of the sound generation component 11 on the sagittal plane to the distance between the projection of the sound outlet hole 112 on the sagittal plane to the projection of the upper side US of the sound generation component 11 on the sagittal plane may be 0.3-0.6. In some embodiments, to further enhance the directivity of the first sound receiving hole 1191 and the second sound receiving hole 1192, the ratio of the distance between the projection of the second sound receiving hole 1192 on the sagittal plane and the upper side US of the sound generation component 11 on the sagittal plane to the distance between the projection of the sound outlet hole 112 on the sagittal plane to the projection of the upper side US of the sound generation component 11 on the sagittal plane may be 0.40-0.52. In some embodiments, to avoid that the distance between the second sound receiving hole 1192 and the user's auricle is too small, which affects the quality of the sound reception of the earphone 10, the distance between the second sound receiving hole 1192 and the upper side US of the sound generation component 11 may be in a range of 1 mm-3 mm, and the distance between the second sound receiving hole 1192 and the rear side RS (the free end FE) may be in a range of 8 mm-12 mm. In some embodiments, to ensure a sufficient distance between the second sound receiving hole 1192 and the auricle of the user so as to ensure the quality of the sound reception of the earphone 10, the distance between the second sound receiving hole 1192 and the upper side US may be in a range of 2 mm-2.5 mm, and the distance between the second sound receiving hole 1192 and the rear side RS may be in a range of 9 mm-10 mm. In some embodiments, to ensure that the second sound receiving hole 1192 has sufficient distance from the user's auricle to ensure the quality of the sound reception of the earphone 10, the distance between the second sound receiving hole 1192 and the upper side US may be 2.47 mm, and the distance between the second sound receiving hole 1192 and the rear side RS may be 9.96 mm. Similarly, to avoid that the distance between the second sound receiving hole 1192 and the first sound receiving hole 1191 is too small, in some embodiments, the distance between the second sound receiving hole 1192 and the front side (the connection end CE) may be 8 mm-12 mm. In some embodiments, to avoid the distance between the second sound receiving hole 1192 and the first sound receiving hole 1191 from being too small, the distance between the second sound receiving hole 1192 and the front side (the connection end CE) may be 8.5 mm-12 mm. In some embodiments, to ensure a sufficient distance between the second sound receiving hole 1192 and the first sound receiving hole 1191, the distance between the second sound receiving hole 1192 and the lower side LS may be 4 mm-8 mm. In some embodiments, to ensure a sufficient distance between the second sound receiving hole 1192 and the first sound receiving hole 1191, the distance between the second sound receiving hole 1192 and the lower side LS may be 6 mm-8 mm. It may be noted that, in the present disclosure, the distances from the second sound receiving hole 1192 to the upper side, the front side, the rear side, or the lower side of the sound generation component 11 may refer to a distance between a center of an opening of the second sound receiving hole 1192 on the housing of the sound generation component 11 and the upper side US, the front side (the connection end CE), or the rear side RS of the sound generation component 11. When the side of the sound generation component 11 (e.g., the upper side US, the front side, the rear side RS, and the lower side LS) is a plane, the distance may refer to the distance between the center of the opening of the second sound receiving hole 1192 on the outer surface of the housing of the sound generation component 11 and the plane. When the side of the sound generation component 11 is a curved plane, the distance may refer to the distance between the center of the opening of the second sound receiving hole 1192 on the outer surface of the housing of the sound generation component 11 and a tangent plane of the curved plane.

Figure 37:
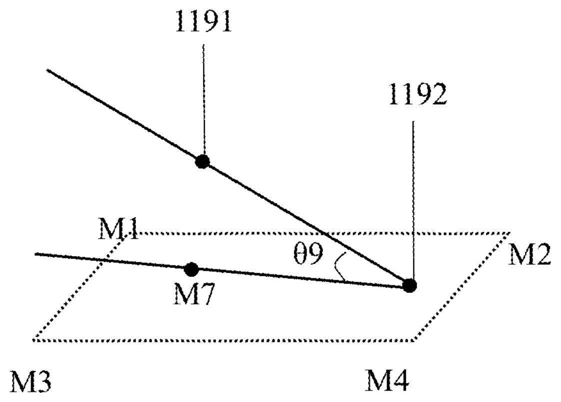
FIG. 37 is a schematic diagram illustrating an angle between a line connecting a first sound receiving hole and a second sound receiving hole and an outer side of a sound generation component according to some embodiments of the present disclosure.

FIG. 37 is a schematic diagram illustrating an angle between a line connecting a first sound receiving hole and a second sound receiving hole and an outer side of a sound generation component according to some embodiments of the present disclosure.

Referring to FIGS. 31 and 37, in some embodiments, when the earphone 10 is in a wearing manner as shown in FIG. 31, an angle between a line connecting the first sound receiving hole 1191 and the second sound receiving hole 1192 and the outer side OS of the sound generation component 11 may be represented as 09. In some embodiments, the outer side OS of the sound generation component 11 may be a plane, and the angle between the line connecting the first sound receiving hole 1191 and the second sound receiving hole 1192 and the outer side OS may be the angle between the line connecting the first sound receiving hole 1191 and the second sound receiving hole 1192 and the plane. In some embodiments, the line connecting the first sound receiving hole 1191 and the second sound receiving hole 1192 may be a curved plane, and the angle between the line connecting the first sound receiving hole 1191 and the second sound receiving hole 1192 and the outer side OS may be the angle between the line connecting the first sound receiving hole 1191 and the second sound receiving hole 1192 and a plane tangent to the curved plane of the outer side OS. Taking the outer side OS being a plane as an example, in some embodiments, the outer side OS of the sound generation component 11 may be represented by four points M1, M2, M3, and M4 disposed on the outer side OS. In some embodiments, the first sound receiving hole 1191 and the second sound receiving hole 1192 may be located on the same side or on different sides of the sound generation component 11. For example, the first sound receiving hole 1191 and the second sound receiving hole 1192 may be disposed on the outer side OS of the sound generation component 11. As another example, the first sound receiving hole 1191 may be located on the front side (the connection end CE) of the sound generation component 11, and the second sound receiving hole 1192 may be located on the outer side OS of the sound generation component 11. As a further example, in some embodiments, the first sound receiving hole 1191 may be disposed on the lower side LS of the sound generation component 11 and the second sound receiving hole 1192 may be located on the outer side OS of the sound generation component 11.

As shown in FIG. 37, in some embodiments, the first sound receiving hole 1191 may have a projection point M7 on the outer side OS (the plane M1M2M3M4), and the second sound receiving hole 1192 may be located on the outer side OS of the sound generation component 11 (i.e. located within the plane M1M2M3M4). The angle θ9 may refer to the angle between a line connecting the projection point M7 and the second sound receiving hole 1192 and a line connecting the first sound receiving hole 1191 and the second sound receiving hole 1192. In some embodiments, when the second sound receiving hole 1192 is not disposed on the outer side OS of the sound generation component 11, the second sound receiving hole 1192 may have a projection point M8 (not shown in the figure) on the outer side OS (plane M1M2M3M4), and the angle θ9 may refer to the angle formed by the line connecting the projection points M7 and M8 and the line connecting the first sound receiving hole 1191 and the second sound receiving hole 1192.

It may be understood that the angle θ9 may reflect a relative position relationship between the first sound receiving hole 1191 and the second sound receiving hole 1192 in the thickness direction of the sound generation component 11, and may further reflect the directivity of the line connecting the first sound receiving hole 1191 and the second sound receiving hole 1192 relative to the user's mouth. Based on this, in some embodiments, to make the line connecting the first sound receiving hole 1191 and the second sound receiving hole 1192 have a relatively good directionality so as to ensure that the first sound receiving hole 1191 and the second sound receiving hole 1192 have a relatively good sound reception effect, the angle θ9 may be in a range of 0°-60° such that the line connecting the first sound receiving hole 1191 and the second sound receiving hole 1192 may point to a region in front of the user's face, so as to enable the first microphone and the second microphone to have a relatively good sound reception effect. For example, in some embodiments, the angle θ9 may be in a range of 10°-40° such that the line connecting the first sound receiving hole 1191 and the second sound receiving hole 1192 may point approximately to the region near the right and left sides of the user's mouth, thereby improving the sound reception effects of the first microphone and the second microphone. In some embodiments, the angle θ9 may be in a range of 25°-38° such that the line connecting the first sound receiving hole 1191 and the second sound receiving hole 1192 may point approximately to the region around the user's mouth, thereby improving the sound reception effects of the first microphone and second microphone.

In some embodiments, to improve a fitness of the earphone 10 to the ear 100 and to improve the stability of the wearing of the earphone 10, the inner side IS of the housing 111 may be pressed on a surface of the ear 100 (e.g., the antihelix 105) to increase a resistance preventing the earphone 10 from falling off the ear 100.

In some embodiments, combining FIGS. 31 and 32, when the earphone 10 is pressed to the ear 100, to prevent the sound outlet hole 112 on the inner side IS from being blocked by an ear tissue, the projection of the sound outlet hole 112 on the sagittal plane may partially or wholly coincide with a projection of an inner concave structure (e.g., the cymba conchae 103) on the sagittal plane. In some embodiments, as the cymba conchae 103 is communicated with the concha cavity 102 and the ear canal is inside the concha cavity 102, when at least a portion of the projection of the sound outlet hole 112 on the sagittal plane is located within the cymba conchae 103, the sound output from the sound outlet hole 112 may reach the ear canal without obstruction, resulting in a relatively high volume received by the ear canal. In some embodiments, a long axis size of the sound generation component 11 may not be too long since too long a long axis size of the sound generation component 11 may make the projection of the free end FE on the sagittal plane exceed the projection of the ear on the sagittal plane thereby affecting the fitting effect between the sound generation component 11 and the ear. Therefore, the long axis size of the sound generation component 11 may be designed to make the projection of the free end FE on the sagittal plane not exceed the projection of the helix 107. In some embodiments, when the projection of the free end FE on the sagittal plane does not exceed the projection of the helix 107 on the sagittal plane, to make at least a portion of the projection of the sound outlet hole 112 on the sagittal plane to be within the cymba conchae 103, i.e. in an actual wearing, at least a portion of the sound outlet hole 112 may face the cymba conchae 103, a ratio of the distance between the projection of the second sound receiving hole 1192 on the sagittal plane and the rear side RS of the sound generation component 11 on the sagittal plane to the distance between the projection of the sound outlet hole 112 on the sagittal plane and the projection of the rear side RS of the sound generation component 11 on the sagittal plane may be in a range of 0.6-0.9. In some embodiments, to make at least a portion of the projection of the sound outlet hole 112 on the sagittal plane within the cymba conchae 103, the ratio of the distance between the projection of the second sound receiving hole 1192 on the sagittal plane and the rear side RS of the sound generation component 11 on the sagittal plane to the distance between the projection of the sound outlet hole 112 on the sagittal plane and the projection of the rear side RS of the sound generation component 11 on the sagittal plane may be in a range of 0.8-0.84. In some embodiments, to make at least a portion of the projection of the sound outlet hole 112 on the sagittal plane within the cymba conchae 103, the distance h2 between the center N of the sound outlet hole 112 and the rear side RS of the sound generation component 11 along the long axis direction X may be in a range of 9.5 mm-15.0 mm. In some embodiments, when the free end FE on the sagittal plane does not exceed the projection of the helix 107 on the sagittal plane, to increase an area of the projection of the sound outlet hole 112 on the sagittal plane within the cymba conchae 103, so as to increase an area of the sound outlet hole 112 that is not blocked by the ear tissues and increase an effective sound outlet area of the sound outlet hole 112, thereby improving a sound outlet performance, the distance h2 may be in a range of 10.5 mm-14.0 mm. In some embodiments, to prevent the sound outlet hole 112 from being blocked by ear tissues and to improve the sound output performance, the distance h2 may be in a range of 11.0 mm-13.5 mm. In some embodiments, to make the sound outlet hole 112 at least partially face the cymba conchae 103, and to ensure the sound outlet performance of the sound outlet hole 112, the distance h2 may be in a range of 11.5 mm-13.0 mm. In some embodiments, to further make the sound outlet hole 112 at least partially face the cymba conchae 103 and to ensure the sound outlet performance of the sound outlet hole 112, the distance h2 may be in a range of 12.0 mm-12.5 mm.

It may be known that as the sound outlet hole 112 and the pressure relief hole 113 are provided on the housing 111 and each side wall of the housing 111 has a certain thickness, each of the sound outlet 112 and the pressure relief hole 113 may be a hole with a certain depth. At this time, the sound outlet 112 and the pressure relief hole 113 may each have an inner opening and an outer opening. For ease of description, in the present disclosure, the center O of the sound outlet hole 112 described above and below may refer to the centroid of the outer opening of the sound outlet hole 112. In some embodiments, the rear side RS of the earphone may be curved to improve aesthetics and wearing comfort of the earphone. When the rear side RS is a curved plane, the distance between a position (e.g., the center N of the sound outlet hole 112) and the rear side RS may refer to a distance between the position and a tangent plane of the rear side RS that is farthest away from the center of the sound generation component and parallel to the short axis of the sound generation component.

In some embodiments, combining FIG. 32, to enhance the sound intensity of the sound outlet hole 112 in the ear canal (i.e., the listening position), the sound outlet hole 112 may be provided at a position relatively close to the ear canal, i.e., the sound outlet hole 112 may be relatively close to the lower side LS of the sound generation component 11 in the short axis direction Y. In some embodiments, the distance h1 between the center N of the sound outlet hole 112 and the lower side LS of the sound generation component 11 along the short axis direction Y may be in a range of 2.3 mm-3.6 mm. In some embodiments, to make the sound outlet hole 112 further closer to the opening of the ear canal of the user to enhance the intensity of the sound output, the distance h1 may be in a range of 2.7 mm-3.2 mm. In some embodiments, to make the sound outlet hole 112 further closer to the opening of the ear canal of the user, so as to enhance the intensity of the sound output, the distance h1 may be in a range of 2.9 mm-3.0 mm.

In some embodiments, the sound outlet hole 112 may be considered as the point sound source A1 shown in FIG. 29, the pressure relief hole 113 may be considered as the point sound source A2 shown in FIG. 29, and the ear canal may be considered as the listening position shown in FIG. 29. At least a portion of the housing and/or at least a portion of the auricle of the sound generation component 11 may be regarded as the baffle as shown in FIG. 29 to increase the difference in acoustic paths from the sound outlet hole 112 and the pressure relief hole 113 to the ear canal, which increases the intensity of sound at the ear canal and maintain a far-field sound leakage reduction effect. When the earphone 10 adopts the structure shown in FIG. 31, i.e., when at least a portion of the housing 111 is disposed at the antihelix 105, in terms of the listening effect, the sound waves of the sound outlet hole 112 may directly reach the ear canal, at which time the sound outlet hole 112 may be disposed at a position on the inner side IS near the lower side LS, and the pressure relief hole 113 may be disposed at a position away from the sound outlet hole 112, e.g., the pressure relief hole 113 may be disposed on the outer side OS or the upper side US at a position away from the sound outlet hole 112. The sound waves of the pressure relief hole 113 need to bypass the outer side of the sound generation component 11 to interfere with the sound waves of the sound outlet hole 112 at the ear canal. In addition, the upwardly-convex and downwardly-concave structures on the auricle (e.g., the antihelix, the tragus, etc., in a propagation path) may increase the sound path of the sound from the pressure relief hole 113 to the ear canal. Thus, the sound generation component 11 itself and/or at least a portion of the auricle may be equivalent to the baffle between the sound outlet hole 112 and the pressure relief hole 113. The baffle increases the sound path between the pressure relief hole 113 and the ear canal and decreases the intensity of the sound waves of the pressure relief hole 113 in the ear canal, thereby reducing the extent of cancellation between the sounds from the sound outlet hole 112 and the pressure relief hole 113, resulting in an increase of the sound volume in the ear canal. In terms of the sound leakage effect, since neither the sound waves generated by the sound outlet hole 112 nor the pressure relief hole 113 needs to bypass the sound generation component 11 to interfere over a great spatial range (similar to the situation without the baffle), there may be no significant increase in the sound leakage. Thus, by setting the sound outlet hole 112 and the pressure relief hole 113 in suitable positions, the sound volume at the ear canal may be significantly increased without a significant increase in the sound volume of the sound leakage.

In some embodiments, as the sound outlet hole 112 is provided close to the ear canal, the pressure relief hole 113 may be provided as far away from the sound outlet hole 112 as possible, so that the cancellation effect of the sounds from the pressure relief hole 113 and the sound outlet hole 112 at the listening position (i.e., the ear canal) is weakened, thereby increasing the sound volume at the listening position. Thus, when the sound outlet hole 112 is provided close to the lower side LS and the connection end CE, the pressure relief hole 113 may be provided close to the rear side RS, so that the distance between the sound outlet hole 112 and the pressure relief hole 113 may be as great as possible. In some embodiments, to make the distance between the sound outlet hole 112 and the pressure relief hole 113 as great as possible, the ratio of the distance between the projection of the second sound receiving hole 1192 on the sagittal plane and the rear side RS of the sound generation component 11 on the sagittal plane to the distance between the projection of the pressure relief hole 113 on the sagittal plane and the projection of the rear side RS of the sound generation component 11 on the sagittal plane may be in a range of 0.85-0.95. In some embodiments, to ensure a relatively great distance between the sound outlet hole 1192 and the pressure relief hole 113, the ratio of the distance between the projection of the second sound receiving hole 1192 on the sagittal plane and the rear side RS of the sound generation component 11 on the sagittal plane to the distance between the projection of the pressure relief hole 113 on the sagittal plane and the projection of the rear side RS of the sound generation component 11 on the sagittal plane may be 0.93. In some embodiments, when the projection of the free end FE on the sagittal plane does not exceed the projection of the helix 107 on the sagittal plane, the distance h3 between the center J of the pressure relief hole 113 and the rear side RS may be in a range of 8.60 mm-12.92 mm. In some embodiments, the distance h3 may be in a range of 9.60 mm-11.92 mm. In some embodiments, when the earphone 10 is in the wearing state, the free end FE may contact the ear (e.g., the helix 107), resulting in a portion of the upper side US and/or the lower side LS being blocked by the ear. To avoid the pressure relief hole 113 on the lower side LS or the upper side US from being blocked by the ear 100 thereby affecting the acoustic performance of the earphone 10, the distance h3 may be in a range of 10.10 mm-11.42 mm. In some embodiments, to avoid the pressure relief hole 113 from being blocked, so as to ensure the acoustic performance of the earphone 10, the distance h3 may be in a range of 10.30 mm-1.12 mm. In some embodiments, to further avoid the pressure relief hole 113 from being blocked, so as to ensure the acoustic performance of the earphone 10, the distance h3 may be in a range of 10.60 mm-11.82 mm.

In order to increase the sound path from the pressure relief hole 113 to the ear canal, the size of the earphone 10 in the thickness direction Z may be increased, thereby increasing a sound generation efficiency (i.e., the listening volume at the listening position) of the earphone 10. Furthermore, the pressure relief hole 113 may be provided away from the inner side IS, thereby further increasing the sound path from the pressure relief hole 113 to the ear canal, thereby increasing the sound generation efficiency of the earphone 10. In addition, the overall size of the sound generation component 11 may not be too great (e.g., the size of the sound generation component 11 in the Z direction may not be too great), otherwise, the overall mass of the earphone 10 may increase, which affects the user's comfort when wearing the earphone. In some embodiments, to further increase the sound path between the pressure relief hole 113 and the ear canal, a ratio of the distance between the pressure relief hole 113 and the inner side IS to the size of the sound generation component 11 in the thickness direction (the Z direction) may be 0.40-0.90. In some embodiments, to further increase the sound path between the pressure relief hole 113 and the ear canal to increase the sound generation efficiency of the earphone 10, the ratio of the distance between the pressure relief hole 113 and the inner side IS to the size of the sound generation component 11 along the thickness direction (the Z direction) may be in a range of 0.5-0.8. In some embodiments, the distance between the center J of the pressure relief hole 113 and the inner side IS may be in a range of 4.24 mm-7.96 mm. In some embodiments, to further increase the sound path from the pressure relief hole 113 to the ear canal to increase the acoustic efficiency of the earphone 10, the distance between the center J of the pressure relief hole 113 and the inner side IS may be 4.43 mm-7.96 mm. In some embodiments, to further increase the sound path between the pressure relief hole 113 and the ear canal to improve the sound generation efficiency of the earphone 10, the distance between the center J of the pressure relief hole 113 and the inner side IS may be in a range of 5.43 mm-6.96 mm. In some embodiments, in the wearing state, to enable the projection of the pressure relief hole 113 on the horizontal plane to be less or not coincide with the projection of the ear 100 on the horizontal plane, so that the sound output from the pressure relief hole 113 may radiate outward more effectively instead of being transmitted to the ear canal or being transmitted to the ear canal after being reflected or refracted by a portion of the structure of the ear 100 (e.g., the auricle), the pressure relief hole 113 may be provided far away from the inner side IS. In this way, the sound path between the pressure relief hole 113 and the ear canal may also be further increased, thereby improving the sound generation efficiency of the earphone 10. In some embodiments, the distance between the center J of the pressure relief hole 113 and the inner side IS may be in a range of 5.63 mm-7.96 mm. In some embodiments, to allow the sound output from the pressure relief hole 113 to radiate outward more effectively, the distance between the center J of the pressure relief hole 113 and the inner side IS may be in a range of 6.25 mm-7.56 mm.

In some embodiments, in the wearing state in which at least a portion of the sound generation component 11 extends into the concha cavity as shown in FIG. 9 and/or the wearing state in which at least a portion of the sound generation component 11 covers the antihelix region as shown in FIG. 31, for the first sound receiving hole 1191 which plays a dominating role in sound reception, to reduce the interference of the speaker to the first microphone, the first microphone may be disposed near an acoustic zero point (e.g., a region where the leakage sound between the sound outlet hole 112 and the pressure relief hole 113 is canceled out), so that the magnitude of the sound pressure of the sound outlet hole 112 at the position of the sound outlet hole 1191 is close to the magnitude of the sound pressure of the pressure relief hole 113 at the position of the sound outlet hole 1191, so that the outputs of the sound outlet hole 112 and the pressure relief hole 113 may cancel each other at the position of the first sound receiving hole 1191. But since in a structure design, the distance between the sound output hole 112 and the first sound receiving hole 1191 may not be the same as the distance between the pressure relief hole 113 and the first sound receiving hole 1191, the sound pressures of the sound output hole 112 and the pressure relief hole 113 may not be the same.

In the sound output hole 112 and the pressure relief hole 113, the sound output from the hole closer to the first sound receiving hole 119 may be less lossy when transmitted to the first sound receiving hole 1191, and the sound output from the hole farther away from the first sound receiving hole 119 may be more lossy when transmitted to the first sound receiving hole 1191. To make the magnitude of the sound pressure output from the sound output hole 112 close to the magnitude of the sound pressure output from the pressure relief hole 113 at the first sound receiving hole 1191 after the transmission loss, so as to achieve an effect of superposition and cancellation, in some embodiments, in the sound output hole 112 and the pressure relief hole 113, the sound pressure output from the hole closer to the first sound receiving hole 1191 may be smaller than the sound pressure output from the hole farther away from the first sound receiving hole 1191.

In some embodiments, the acoustic resistance of a hole may have an impact on the output of the hole. The greater the acoustic resistance of the hole, the lower the acoustic pressure of the output. In the sound outlet hole 112 and the pressure relief hole 113, the acoustic resistance of the hole closer to the first sound receiving hole 1191 may be greater than the acoustic resistance of the hole farther away from the first sound receiving hole 1191 so that the acoustic pressure output by the hole closer to the first sound receiving hole 1191 is smaller than the sound pressure output by the hole farther away from the first sound receiving hole 1191, so that the sound pressure output from the hole closer to the first sound receiving hole 1191 and the sound pressure output from the hole farther away from the first sound receiving hole 1191 are superimposed at the first sound receiving hole 1191 to cancel each other.

In some embodiments, the area of the hole may affect the acoustic resistance of the hole. The smaller the area of the hole, the greater the acoustic resistance of the hole. In the sound outlet hole 112 and the pressure relief hole 113, the area of the hole closer to the first sound receiving hole 1191 may be smaller than the area of the hole farther from the first sound receiving hole 1191 so that the sound pressure output from the hole closer to the first sound receiving hole 1191 is smaller than the sound pressure output from the hole farther away from the first sound receiving hole 1191, so that the sound pressure output from the hole farther away from the first sound receiving hole 1191 superimposes and cancel the sound pressure output from the hole closer to the first sound receiving hole 1191.

In some embodiments, the acoustic resistance of the hole may be adjusted by providing an acoustic resistance net at the hole. In some embodiments, an acoustic resistance net may be provided at both the sound outlet hole 112 and the pressure relief hole 113. In the sound outlet hole 112 and the pressure relief hole 113, the acoustic resistance of the acoustic resistance net at the hole closer to the first sound receiving hole 1191 may be greater than the acoustic resistance of the acoustic resistance net at the hole farther away from the first sound receiving hole 1191 such that the sound pressure of the hole closer to the first sound receiving hole 1191 may be smaller than the sound pressure of the hole farther from the first sound receiving hole 1191. As a result, the sound pressures of the two holes are superimposed and canceled at the first sound receiving hole 1191.

Having thus described the basic concepts, it may be rather apparent to those skilled in the art that the foregoing detailed disclosure is intended to be presented by way of example only and is not limiting. Although not explicitly stated here, those skilled in the art may make various modifications, improvements, and amendments to the present disclosure. These modifications, improvements, and amendments are suggested in the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be appropriately combined.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

Some embodiments use numbers to describe the number of components, attributes, and it may be understood that such numbers used in the description of the embodiments are modified in some examples by the modifiers "about", "approximately", or "substantially". Unless otherwise noted, the terms "about," "approximately," or "substantially" indicates that a ±20% variation in the stated number is allowed. Correspondingly, in some embodiments, the numerical parameters used in the present disclosure and the claims are approximations, which change depending on the desired characteristics of individual embodiments. In some embodiments, the numerical parameters should consider the specified number of valid digits and utilize a general digit retention method. While the numerical domains and parameters used to confirm the breadth of their ranges in some embodiments of the present disclosure are approximations, in specific embodiments such values are set to be as precise as possible within a feasible range.

For each patent, patent application, patent application disclosure, and other material cited in this application, such as articles, books, specifications, publications, documents, etc., the entire contents of which are hereby incorporated herein by reference. Except for application history documents that are inconsistent with or create a conflict with the contents of the present disclosure, and except for documents that limit the broadest scope of the claims of the present disclosure that are presently or hereafter appended to the present disclosure. It should be noted that to the extent that the descriptions, definitions, and/or use of terms in the materials appurtenant to the present disclosure are inconsistent with or conflict with the content of what is set forth herein, the descriptions, definitions, and/or use of terms in the present disclosure shall prevail.

At last, it should be understood that the embodiments described in the present disclosure are merely illustrative of the principles of the embodiments of the present disclosure. Other modifications that may be employed may be within the scope of the present disclosure. Accordingly, embodiments of the present disclosure are not limited to that precisely as shown and described. The specific embodiments described in the present disclosure are only exemplary, and one or more technical features in the specific embodiments are optional or additional, and do not constitute essential technical features of the inventive concept of the present disclosure.

What is claimed is:

1. An earphone, comprising:

a sound generation component, including a transducer and a housing accommodating the transducer, the housing being provided with a sound outlet hole and a pressure relief hole, the sound outlet hole being provided on an inner side of the housing facing an auricle of a user, and the pressure relief hole being provided on a side of the housing other than the inner side;

an ear hook, configured to place the sound generation component near an ear canal of the user without blocking the ear canal in a wearing state; and a microphone assembly, at least including a first microphone and a second microphone, the first microphone or the second microphone being provided in the sound generation component or the ear hook, the sound generation component or the ear hook being provided with a first sound receiving hole and a second sound receiving hole corresponding to the first microphone and the second microphone, respectively;

wherein a difference between a distance from a projection of the first sound receiving hole on a sagittal plane of the user to a projection of the sound outlet hole on the sagittal plane and a distance from the projection of the first sound receiving hole on the sagittal plane to a projection of the pressure relief hole on the sagittal plane is less than 6 mm, and any one of a distance from a projection of the second sound receiving hole on the sagittal plane to the projection of the sound outlet hole on the sagittal plane or a distance from the projection of the second sound receiving hole on the sagittal plane to the projection of the pressure relief hole on the sagittal plane is not less than 7 mm.

2. The earphone of claim 1, wherein an absolute value of a difference between the distance from the projection of the second sound receiving hole on the sagittal plane to the projection of the sound outlet hole on the sagittal plane and the distance from the projection of the second sound receiving hole on the sagittal plane to the projection of the pressure relief hole on the sagittal plane is less than 6 mm.

3. The earphone of claim 1, wherein at least a portion of the sound generation component extends into a concha cavity of the user.

4. The earphone of claim 3, wherein an extension of a line connecting the projection of the first sound receiving hole on the sagittal plane and the projection of the second sound receiving hole on the sagittal plane has an intersection with a projection of an antihelix of the user on the sagittal plane, and a distance from the projection of the second sound receiving hole on the sagittal plane to the intersection is a first distance, the first distance being in a range of 2 mm-10 mm.

5. The earphone of claim 4, wherein a distance from the projection of the first sound receiving hole on the sagittal plane to the projection of the second sound receiving hole on the sagittal plane is a second distance, and a ratio of the second distance to the first distance is in a range of 1.8-4.4.

6. The earphone of claim 5, wherein the second distance is in a range of 10 mm-50 mm.

7. The earphone of claim 3, wherein the second sound receiving hole is located on an outer side of the sound generation component, and a ratio of a distance between the projection of the second sound receiving hole on the sagittal plane and a projection of an upper side of the sound generation component on the sagittal plane to a distance between the projection of the sound outlet hole on the sagittal plane and the projection of the upper side of the sound generation component on the sagittal plane is in a range of 0.2-0.4; and a ratio of a distance between the projection of second sound receiving hole on the sagittal plane and a projection of a rear side of the sound generation component on the sagittal plane to a distance between the projection of the sound outlet hole on the sagittal plane to the projection of the rear side of the sound generation component on the sagittal plane is in a range of 0.3-0.7.

8. The earphone of claim 3, wherein a shape of a projection of the sound generation component on the sagittal plane includes a long axis direction and a short axis direction, and a ratio of a distance between the projection of the second sound receiving hole on the sagittal plane and a projection of an upper side of the sound generation component on the sagittal plane in the short axis direction to a size of the projection of the sound generation component in the short axis direction is not greater than 0.25.

9. The earphone of claim 3, wherein a ratio of a distance between the projection of the second sound receiving hole on the sagittal plane and a projection of a rear side of the sound generation component on the sagittal plane to a distance from the projection of the pressure relief hole on the sagittal plane to the projection of the rear side of the sound generation component on the sagittal plane is in a range of 0.70-0.95; wherein the sound generation component has a thickness direction that is perpendicular to the sagittal plane, a ratio of a distance from the pressure relief hole to the inner side to a size of the sound generation component along the thickness direction is in a range of 0.40-0.85.

10. The earphone of claim 1, wherein at least a portion of the sound generation component covers an antihelix region of the user.

11. The earphone of claim 10, wherein an extension of a line connecting the projection of the first sound receiving hole on the sagittal plane of the user and the projection of the second sound receiving hole on the sagittal plane has an intersection with a projection of an inner contour of the auricle on the sagittal plane, and a distance between the projection of the second sound receiving hole on the sagittal plane and the intersection point is a first distance, the first distance being in a range of 2 mm-10 mm.

12. The earphone of claim 11, wherein a distance between the projection of the first sound receiving hole on the sagittal plane and the projection of the second sound receiving hole on the sagittal plane is a second distance, a ratio of the second distance to the first distance is in a range of 1.8-4.4.

13. The earphone of claim 12, wherein the second distance is in a range of 10 mm-50 mm.

14. The earphone of claim 10, wherein the second sound receiving hole is located on an outer side of the sound generation component, a ratio of a distance between the projection of the second sound receiving hole on the sagittal plane and a projection of an upper side of the sound generation component on the sagittal plane to a distance between the projection of the sound outlet hole on the sagittal plane and the projection of the upper side of the sound generation component on the sagittal plane being in a range of 0.3-0.6, and a ratio of a distance between the projection of the second sound receiving hole on the sagittal plane and a projection of a rear side of the sound generation component on the sagittal plane to a distance between the projection of the sound outlet hole on the sagittal plane and the projection of the rear side of the sound generation component on the sagittal plane is in a range of 0.6-0.9.

15. The earphone of claim 10, wherein a shape of a projection of the sound generation component on the sagittal plane includes a long axis direction and a short axis direction, and a ratio of a distance between the projection of the second sound receiving hole on the sagittal plane and a projection of an upper side of the sound generation component on the sagittal plane in the short axis direction to a size of the projection of the sound generation component in the short axis direction is not greater than 0.3.

16. The earphone of claim 10, wherein a ratio of a distance between the projection of the second sound receiving hole on the sagittal plane and a projection of a rear side of the sound generation component on the sagittal plane to a distance between the projection of the pressure relief hole on the sagittal plane and the projection of the rear side of the sound generation component on the sagittal plane is in a range of 0.85-0.95; wherein the sound generation component has a thickness direction that is perpendicular to the sagittal plane, and a ratio of a distance between the pressure relief hole and the inner side to a size of the sound generation component along the thickness direction is in a range of 0.40-0.90.

17. The earphone of claim 3, wherein the pressure relief hole is provided on an upper side of the housing.

18. The earphone of claim 17, wherein, a sound pressure output from one of the sound outlet hole and the pressure relief hole that is closer to the first sound receiving hole is less than a sound pressure output from the other of the sound outlet hole and the pressure relief hole that is farther away from the first sound receiving hole.

19. The earphone of claim 17, wherein an area of one of the sound outlet hole and the pressure relief hole that is closer to the first sound receiving hole is less than the area of the other of the sound outlet hole and the pressure relief hole that is farther away from the first sound receiving hole.

20. The earphone of claim 17, wherein each of the first sound receiving hole and the second sound receiving hole is provided with an acoustic resistance net, and a sound resistance of the acoustic resistance net provided at one of the sound outlet hole and the pressure relief hole that is closer to the first sound receiving hole is greater than a sound resistance of the acoustic resistance net provided at the other of the sound outlet hole and the pressure relief hole that is farther away from the first sound receiving hole.

* * * * *